US009298498B2

(12) United States Patent  (10) Patent No.: US 9,298,498 B2
Gosalia et al.  (45) Date of Patent: Mar. 29, 2016

(54) BUILDING A RUN LIST FOR A COPROCESSOR BASED ON RULES WHEN THE COPROCESSOR SWITCHES FROM ONE CONTEXT TO ANOTHER CONTEXT

(75) Inventors: Anuj B. Gosalia, Redmond, WA (US); Steve Pronovost, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1226 days.

(21) Appl. No.: 12/172,910

(22) Filed: Jul. 14, 2008

(65) Prior Publication Data

US 2008/0301687 A1  Dec. 4, 2008

Related U.S. Application Data

(62) Division of application No. 10/763,778, filed on Jan. 22, 2004, now Pat. No. 7,421,694.

(60) Provisional application No. 60/448,402, filed on Feb. 18, 2003, provisional application No. 60/448,399, filed on Feb. 18, 2003, provisional application No. 60/448,440, filed on Feb. 18, 2003, provisional application No. 60/474,513, filed on May 29, 2003.

(51) Int. Cl.
*G06F 9/46* (2006.01)
*G06F 9/48* (2006.01)
*G06F 9/50* (2006.01)
*G06F 9/30* (2006.01)
*G06F 9/54* (2006.01)

(52) U.S. Cl.
CPC .......... *G06F 9/4843* (2013.01); *G06F 9/30087* (2013.01); *G06F 9/5016* (2013.01); *G06F 9/461* (2013.01); *G06F 9/544* (2013.01); *G06F 9/546* (2013.01); *Y02B 60/142* (2013.01); *Y02B 60/144* (2013.01)

(58) Field of Classification Search
CPC ... G06F 9/4825; G06F 9/4881; G06F 9/4843; G06F 9/3877; G06F 9/50
See application file for complete search history.

(56) References Cited

U.S. PATENT DOCUMENTS 4,713,748 A  12/1987 Magar et al.
5,016,161 A  5/1991 Van Loo et al.
(Continued)

FOREIGN PATENT DOCUMENTS

EP  0475421  3/1992
JP  2-12523 A  1/1990
(Continued)

OTHER PUBLICATIONS

Peris et al. ("Deterministic scheduling for transactional multithreaded replicas", IEEE, 2000, pp. 164-173).*
Ike , "Basic Lecture on IA-64 Processor", 1st Edition, Ohmsha, Ltd., Aug. 25, 2000, 77-79 and 106-107, translated pp. 1-12.*
Burgess, P. et al., "BED: A Multithreaded Kernel for Embedded Systems", *Proceedings of the IFAC Workshop on Real Time Programming*, Jun. 22-24, 1994, 133-138.
Macedonia, M., "The GPC enters Computing's Mainstream", *Computer*, 2003, 36(10), 106-108.
(Continued)

*Primary Examiner* — Abdullah Al Kawsar
*Assistant Examiner* — Caroline H Arcos
(74) *Attorney, Agent, or Firm* — Sunah Lee; Kate Drakos; Micky Minhas

(57) ABSTRACT

Techniques for minimizing coprocessor "starvation," and for effectively scheduling processing in a coprocessor for greater efficiency and power. A run list is provided allowing a coprocessor to switch from one task to the next, without waiting for CPU intervention. A method called "surface faulting" allows a coprocessor to fault at the beginning of a large task rather than somewhere in the middle of the task. DMA control instructions, namely a "fence," a "trap" and a "enable/disable context switching," can be inserted into a processing stream to cause a coprocessor to perform tasks that enhance coprocessor efficiency and power. These instructions can also be used to build high-level synchronization objects. Finally, a "flip" technique is described that can switch a base reference for a display from one location to another, thereby changing the entire display surface.

16 Claims, 30 Drawing Sheets

(56) References Cited

U.S. PATENT DOCUMENTS

| | | | |
|---|---|---|---|
| 5,058,037 A | 10/1991 | Kageyama et al. | |
| 5,113,180 A | 5/1992 | Gupta et al. | |
| 5,220,653 A | 6/1993 | Miro | 718/107 |
| 5,247,674 A | 9/1993 | Kogure | 711/170 |
| 5,371,514 A | 12/1994 | Lawless et al. | |
| 5,437,017 A | 7/1995 | Moore et al. | |
| 5,696,927 A | 12/1997 | MacDonald et al. | 711/207 |
| 5,742,797 A | 4/1998 | Celi et al. | 345/548 |
| 5,748,468 A | 5/1998 | Notenboom et al. | |
| 5,760,789 A | 6/1998 | Inoue | |
| 5,761,506 A | 6/1998 | Angle et al. | |
| 5,777,629 A | 7/1998 | Baldwin | 345/506 |
| 5,790,804 A | 8/1998 | Osborne | |
| 5,794,037 A | 8/1998 | Young | |
| 5,797,115 A * | 8/1998 | Fuller | 702/186 |
| 5,826,079 A * | 10/1998 | Boland et al. | 718/102 |
| 5,852,443 A | 12/1998 | Kenworthy | |
| 5,864,512 A | 1/1999 | Buckelew et al. | |
| 5,864,713 A | 1/1999 | Terry | 710/52 |
| 5,896,141 A | 4/1999 | Blaho et al. | 345/541 |
| 5,918,050 A | 6/1999 | Rosenthal et al. | 718/108 |
| 5,930,827 A | 7/1999 | Sturges | 711/170 |
| 6,023,738 A | 2/2000 | Priem et al. | 710/23 |
| 6,049,329 A | 4/2000 | Zetts et al. | |
| 6,049,857 A | 4/2000 | Watkins | 711/207 |
| 6,061,711 A | 5/2000 | Song et al. | |
| 6,065,071 A | 5/2000 | Priem et al. | 710/22 |
| 6,065,089 A * | 5/2000 | Hickerson et al. | 710/266 |
| 6,069,638 A | 5/2000 | Porterfield | 345/568 |
| 6,070,002 A | 5/2000 | Hagemark et al. | |
| 6,075,546 A | 6/2000 | Hussain et al. | |
| 6,081,854 A | 6/2000 | Priem et al. | 710/37 |
| 6,092,127 A | 7/2000 | Tausheck | |
| 6,222,564 B1 | 4/2001 | Sturges | 345/542 |
| 6,252,600 B1 | 6/2001 | Kohli et al. | 345/219 |
| 6,272,516 B1 | 8/2001 | Angle et al. | |
| 6,295,602 B1 | 9/2001 | Weissman et al. | |
| 6,317,134 B1 | 11/2001 | Hagemark et al. | |
| 6,331,857 B1 | 12/2001 | Hussain et al. | |
| 6,349,320 B1 * | 2/2002 | Emberton et al. | 718/100 |
| 6,380,942 B1 | 4/2002 | Hussain et al. | |
| 6,437,788 B1 | 8/2002 | Milot et al. | 345/552 |
| 6,446,186 B1 | 9/2002 | Priem et al. | 711/206 |
| 6,477,612 B1 | 11/2002 | Wang | 711/2 |
| 6,480,952 B2 * | 11/2002 | Gorishek et al. | 712/227 |
| 6,493,837 B1 * | 12/2002 | Pang et al. | 714/45 |
| 6,496,912 B1 | 12/2002 | Fields et al. | 711/170 |
| 6,496,916 B1 | 12/2002 | Fadavi-Ardekani et al. | |
| 6,518,973 B1 * | 2/2003 | Blythe | 345/564 |
| 6,525,739 B1 | 2/2003 | Gurumoorthy et al. | 345/566 |
| 6,600,493 B1 | 7/2003 | Sethi et al. | 345/543 |
| 6,604,156 B1 | 8/2003 | Slivkoff et al. | |
| 6,650,333 B1 | 11/2003 | Baldwin | 345/531 |
| 6,691,180 B2 | 2/2004 | Priem et al. | 710/23 |
| 6,704,871 B1 | 3/2004 | Kaplan et al. | 713/192 |
| 6,708,273 B1 | 3/2004 | Ober et al. | 713/189 |
| 6,782,432 B1 | 8/2004 | Nelson et al. | |
| 6,798,421 B2 | 9/2004 | Baldwin | 345/557 |
| 6,859,208 B1 | 2/2005 | White | 345/542 |
| 6,871,343 B1 | 3/2005 | Yoshikawa | |
| 6,947,051 B2 | 9/2005 | Gosalia | 345/543 |
| 7,137,126 B1 | 11/2006 | Coffman et al. | |
| 7,234,144 B2 | 6/2007 | Wilt et al. | 709/321 |
| 7,421,694 B2 | 9/2008 | Gosalia et al. | |
| 7,673,304 B2 | 3/2010 | Gosalia et al. | |
| 2002/0013795 A1 | 1/2002 | Dresevie et al. | |
| 2002/0046229 A1 * | 4/2002 | Yutaka et al. | 709/102 |
| 2002/0118202 A1 | 8/2002 | Baldwin | |
| 2003/0140179 A1 | 7/2003 | Wilt et al. | |
| 2003/0208521 A1 * | 11/2003 | Brenner et al. | 709/103 |
| 2004/0187122 A1 | 9/2004 | Gosalia et al. | |
| 2004/0187135 A1 | 9/2004 | Pronovost | 718/100 |
| 2004/0231000 A1 | 11/2004 | Gosalia | 345/568 |
| 2005/0168472 A1 | 8/2005 | Gosalia | 345/568 |

FOREIGN PATENT DOCUMENTS

| | | | |
|---|---|---|---|
| JP | 3-12768 A | | 1/1991 |
| JP | 3-202941 A | | 9/1991 |
| JP | 4-299389 | | 10/1992 |
| JP | 4-311233 A | | 11/1992 |
| JP | 5-135147 | | 1/1993 |
| JP | 7-234821 A | | 9/1995 |
| JP | 7-271344 | | 10/1995 |
| JP | 10-69353 A | | 3/1998 |
| JP | 10-207723 | | 7/1998 |
| JP | 10-294834 A | | 11/1998 |
| JP | 2000-215068 A | | 8/2000 |
| JP | 2000-285246 | | 10/2000 |
| JP | 2001-92657 A | | 4/2001 |
| JP | 2001-521219 | | 11/2001 |
| JP | 2002-183750 A | | 6/2002 |
| JP | 2002-529850 | | 9/2002 |
| WO | WO 99/21089 | | 4/1999 |
| WO | WO 00/28418 | | 5/2000 |
| WO | WO 02/09083 | | 1/2002 |

OTHER PUBLICATIONS

Petrot, F. et al., "Lightweight Implementation of the POSIX Threads API for an On-Chip MIPS Multiprocessor with VCI Interconnect", *Proceedings Design, Automation and Test in Europe Conference and Exhibition*, Mar. 3-7, 2003, Suppl. 51-56.

Intel Corp, "Accelerated Graphics Port Interface Specification, Revision 1.0," Jul. 1996, 1-161.

Martin, K.E. et al., "Direct Rendering Infrastructure, Low-Level Design Document," dri.sourceforge.net/doc/design_low_level.html, May 1999, 1-18.

Owen, J. et al., "A Multiple Direct Rendering Architecture for 3D," dri.sourceforge.net/doc/design_low_level.html, Sep. 1998, 1-10.

Torvalds, L. et al., "Excerpt from the Linux Kernel, version 2.4.20," kernel.org/pub/linux/kernel/v2.4/linux-2.4.20.tar.bz2, Nov. 2002, 1-87.

Kane, J. et al., "18 Graphics Cards Quick on the Draw", *BYTE/NSTL Lab Report*, Feb. 1996, 142-151.

Musiari, F., "μPD7220 Graphic Display Controller I° Parte", *Elettronica OGGI*, 1982, 105-111.

Wong, W., "Optimizing Graphics Performance for Portable Computers", *Wescon Conference Record*, Anaheim Convention Center, Nov. 17-19, 1992, 121-123.

United States Patent and Trademark Office: Non-Final Office Action dated Jan. 25, 2008, U.S. Appl. No. 10/777,797, 18 pages.

United States Patent and Trademark Office: Non-Final Office Action dated Jan. 14, 2008, U.S. Appl. No. 11/089,856, 10 pages.

United States Patent and Trademark Office: Non-Final Office Action dated Feb. 22, 2005, U.S. Appl. No. 10/748,362, 8 pages.

United States Patent and Trademark Office: Final Office Action dated Aug. 23, 2006, U.S. Appl. No. 10/779,272, 19 pages.

United States Patent and Trademark Office: Non-Final Office Action dated Mar. 22, 2006, U.S. Appl. No. 10/779,272, 23 pages.

Final rejection dated Aug. 23, 2006 in re. U.S. Appl. No. 10/779,272, 16 pages.

Final rejection dated Oct. 7, 2008 in re. U.S. Appl. No. 11/089,856, 9 pages.

Balasubramaniam et al., "What is a File Synchronizer?", CSCI Technical Report, Apr. 22, 1998, 1-21.

Norway Patent Application No. 20040829 : Norwegian Search Report, Jun. 2, 2010, 2 pages.

Giné et al., "MemTo: A Memory Monitoring Tool for a Linux Cluster", LNCS 2131, © Springer-Verlag Berlin Heidelberg, 2001, pp. 225-232.

Kirk et al., "SMART (Strategic memory Allocation for Real-Time) Cache Design Using the MIPS R3000", IEEE, 1989, pp. 229-237.

Search Report Issued in European Patent Application No. 12004595.0, Mailed Date: Jan. 11, 2016, 12 Pages.

Extended European Search Report Received For European Patent Application No. 12004596.8, Mailed Date: Jan. 13, 2016, 8 Pages.

* cited by examiner

Exemplary algorithm
PROCESS A: Submit (irql passive, rendering thread context)
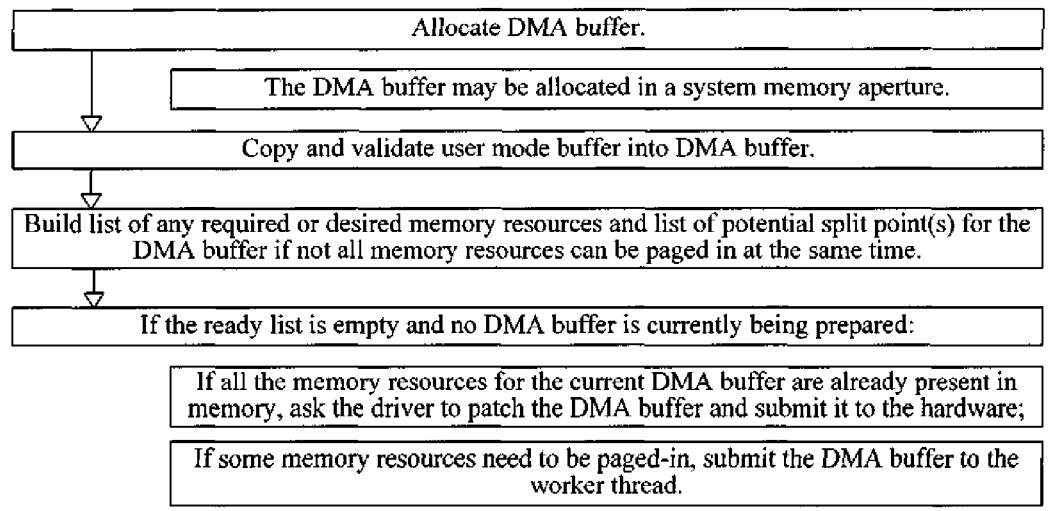
PROCESS B: Quantum expires (irql device, any thread context)
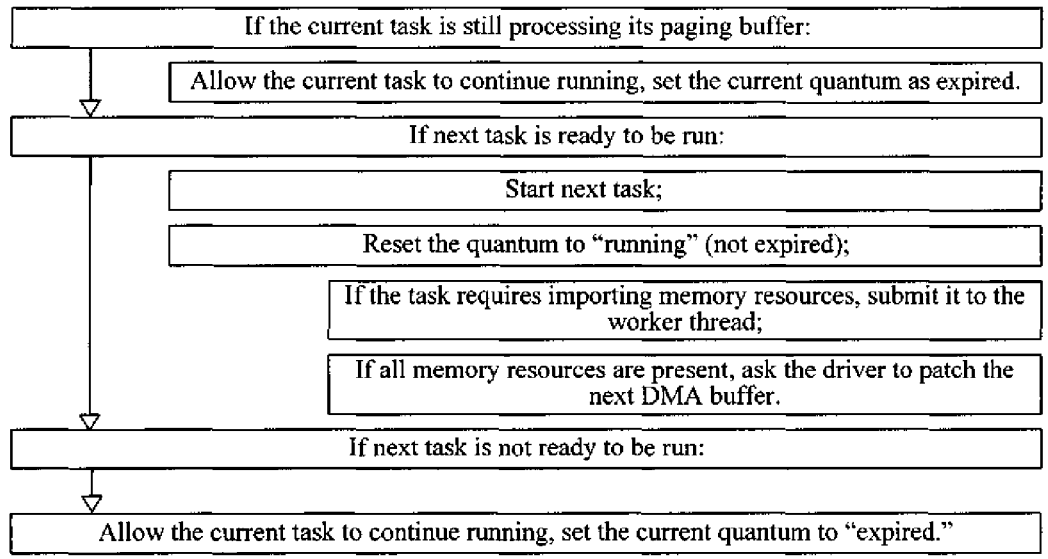
FIGURE 4 A

*PROCESS A: Submit (IROL passive, rendering thread context)*
If no DMA buffer is being prepared or is ready for execution.
If all the memory resources for the current DMA buffer are already present in memory,
If the coprocessor is idle, give the DMA buffer to the coprocessor.
Else insert the DMA buffer in the ready-to-execute slot.
If some memory resources need to be paged in, submit the DMA buffer to the paging thread.
Else, insert the DMA buffer at the end of the list for the current context.

*PROCESS B: Quantum expires (IROL device, any thread context)*
If the current task is still processing its paging buffer,
Allow the current task to continue running.
Set the current quantum as expired.
Else, if next DMA buffer is ready to be run,
Reset the current priority of the current context to its base priority.
Move the current context to the end of the queue for its priority.
Submit next DMA buffer to the coprocessor.
Reset the quantum as being running (not expired).
Choose the next DMA buffer to execute.
If the DMA buffer requires paging, submit it to the paging thread.
Else, all memory resources are already present; just insert the DMA buffer in the ready slot.
Else, the next task isn't ready to be run;
Allow the current task to continue running.
Set the current quantum as expired.

*PROCESS C: Task finishes (IROL device, any thread context)*
If next DMA buffer is ready to be run,
Submit next DMA buffer to the coprocessor.
Reset the quantum as being running (not expired).
Choose the next DMA buffer to execute.
If the DMA buffer requires paging, submit it to the paging thread.
Else, all memory resources are already present; just insert the DMA buffer in the ready slot.
Else, the next task isn't ready;
If the paging thread is currently working on the next DMA buffer, boost the priority of the worker thread temporarily so it finishes its work as soon as possible.

FIGURE 12 A

*PROCESS D: Paging thread (IRQL passive, system thread)*
Set current eviction policy to first policy.
Ask the memory manager to page in the resource list.
If all the resource were paged in successfully,
    Move the paging buffer and DMA buffer to the ready-to-execute slot.
    If the quantum of the current DMA buffer is expired
        Submit next DMA buffer to the coprocessor.
        Reset the quantum as being running (not expired).
        Choose the next DMA buffer to execute.
        If the DMA buffer requires paging, submit it to the paging thread.
        Else, all memory resources are already present, just insert the DMA buffer in the ready slot;
Else if the memory manager failed because the paging buffer is full
    Wait until the current DMA buffer's quantum end or finishes.
    Submit the paging buffer to the coprocessor.
    Wait until the paging buffer is done.
    Go back asking the memory manager to paged-in the remaining of the resource list.
Else if the memory manager failed because there isn't enough available resource
    If we've passed the last eviction policy
        Undo the resource move, or run the paging buffer.
        Reject the DMA buffer.
        We're done.
    Else if the current eviction policy is above application interference.
        If the DMA buffer hasn't been split yet.
        Split the DMA buffer at the closest point to the current paged-in resources.
        If no more resources are needed
            Move the paging buffer and split DMA buffer to the ready-to-execute slot.
            Move the remaining DMA buffer back to the head of the ready queue for the context.
        If the quantum of the current DMA buffer is expired,
            Submit next DMA buffer to the coprocessor.
            Reset the quantum as being running (not expired).
            Choose the next DMA buffer to execute.
            If the DMA buffer requires paging, submit it to the paging thread.
            Else, all memory resources are already present; just insert the DMA buffer in the ready slot;.
    Ask VidMm to mark candidate for eviction using the current policy.
    If VidMm returns an error saying no memory could be marked with the current policy,
        Increase the eviction policy.
        Go back to the start of the eviction policy check.
    Else, some memory was marked.
        Go back to trying to page in the resources.

FIGURE 12 B

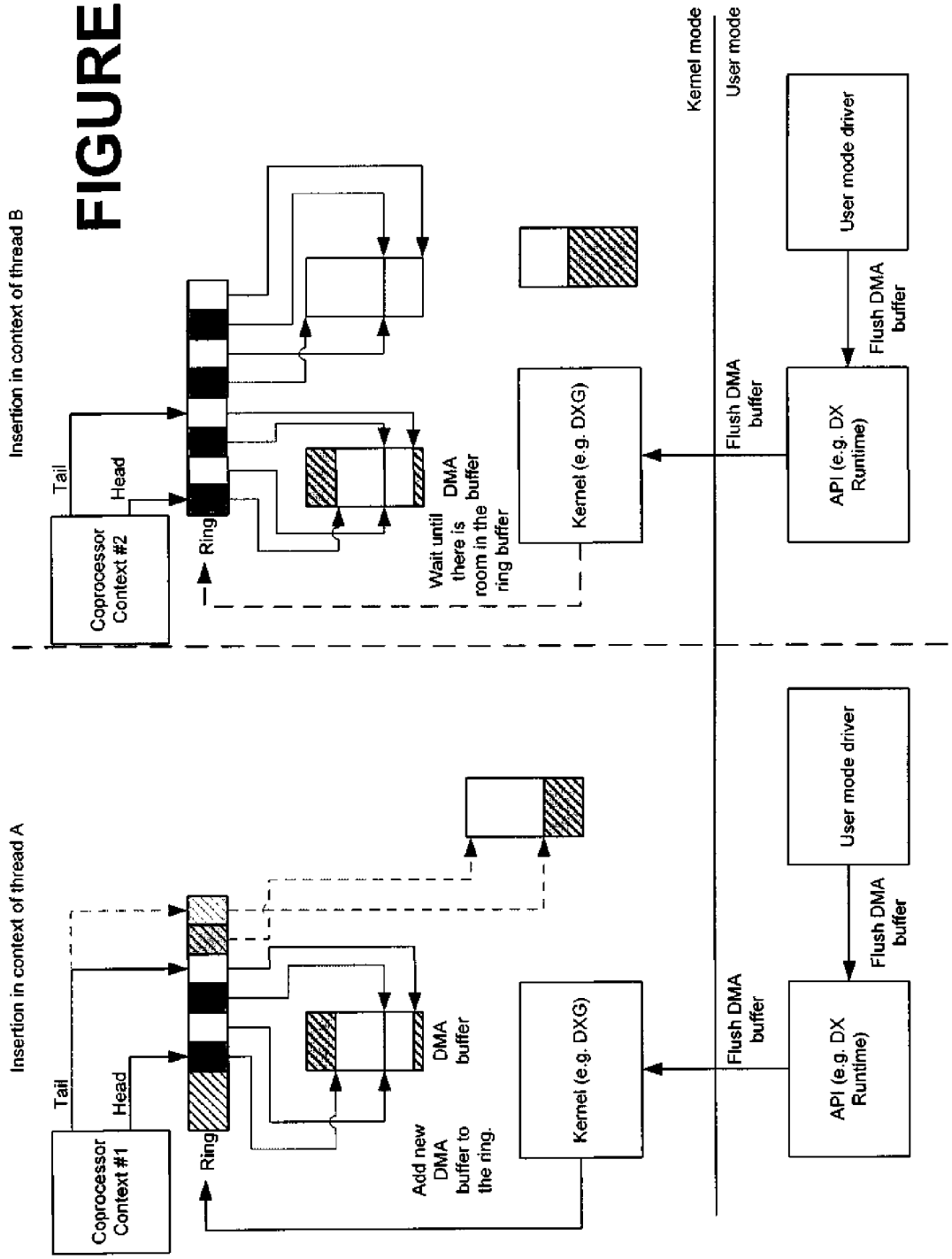

*PROCESS A: Submit (IRQL passive, rendering thread context, coprocessor Context mutex held)*
Acquire the VIDMM_lock.
Process the list of resources given, and update the usage information about allocations in this process.
Release the VIDMM lock.
Take the scheduler lock.
Call the driver to insert the current DMA buffer into the ring.
If the driver succeeded.
   If the context was idle.
      Insert the context back in the ready list at the tail of the queue for its current priority.
      If there is no context transfer pending and the current context is lower priority than the current context.
         Call the driver to context switch to this context.
         Signal that a context switch is pending.
   Release the scheduler lock.
If the driver failed, the ring was full.
   Wait on an event that will be signaled when room becomes available.
   After the wait, go back to acquiring the scheduler lock.
If there is enough room left in the DMA buffer for another submission.
   Return to user mode with the current DMA buffer.
Acquire a new DMA buffer from the context's pool.
If DMA pool couldn't give another buffer at this time
   Wait on an event that will be signaled when a DMA buffer is inserted back into the pool.
   When the wait is over, go back to trying to get a new DMA buffer.
Return the new DMA buffer to user mode.

*PROCESS B: Context switch done (IRQL device, any thread context)*
Take the scheduler lock.
   If a higher priority context is now ready for execution.
      Call the driver to context switch to the highest priority context.
   Else
      Signal that no context switch is currently pending.
Release the scheduler lock

*PROCESS C: Quantum expires (IRQL device, any thread context)*
Take the scheduler lock.
Reset the current priority of the context to its base priority.
Insert the context back at the end of the queue for its current priority.
If no context switches are currently pending.
   Ask the driver to do a context switch to the highest priority context.
Release the scheduler lock.

FIGURE 17 A

*PROCESS D: Task finishes (IROL device, any thread context)*
  Take the scheduler lock.
  Ask the driver whether the context is really empty.
  If the context is really empty.
    Reset the current priority of the context to its base priority.
    Insert the context in the idle list.
  If the context wasn't really empty.
    If no context switches are currently pending.
      Ask the driver to do a context switch to the highest priority context.
  Release the scheduler lock.

*PROCESS E: Page Fault (IROL device, any thread context)*
  Take the scheduler lock.
  Remove the context from the ready list.
  Insert the context in the in page list as an atomic operation.
  If in page thread currently sleeping.
    Queue a DPC to signal to wakeup the worker thread.
  If no context switch are currently pending.
    Ask the driver to do a context switch to the highest priority context.
  Release the scheduler lock.

*PROCESS F: Fault resolved (IROL device, any thread context)*
  Take the scheduler lock.
  Remove the context from the in page list.
  Insert the context back in the ready list for its current priority.
  If co context switches are currently pending, and the current context is higher priority than the currently running context.
    Ask the driver to do a context switch to the highest priority context.
  Release the scheduler lock.

FIGURE 17 B

*PROCESS G: In page worker thread*
Go through the list of contexts in the inpage queue. Pick up the highest priority one.
Ask the driver for the list of resources required to make forward progress on the context.
Take the VIDMM lock.
Find a location for each of the allocations required for forward progress.
Invalidate the virtual address or handle for the allocation getting evicted.
Ask the driver to fill a DMA buffer with the memory transfer commands necessary to bring the required allocations to their selected spots.
Release the VIDMM lock.
Submit the VidMm context as a regular coprocessor context.
If the list of contexts is empty, sleep until an item gets added.
Go back to the beginning of the loop.

*PROCESS H: Periodic timer (passive level, system thread context)*
Take the scheduler lock.
Increase the current priority of each context.
Release the scheduler lock.

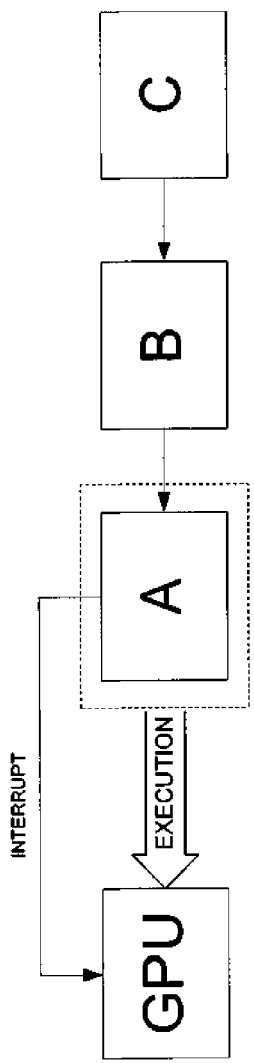

When A completes (e.g., because its time slice is up or because of a page fault), an interrupt is raised to the coprocessor. Then A is moved to the back of the run list. Advantageously, the coprocessor can begin working on B immediately.

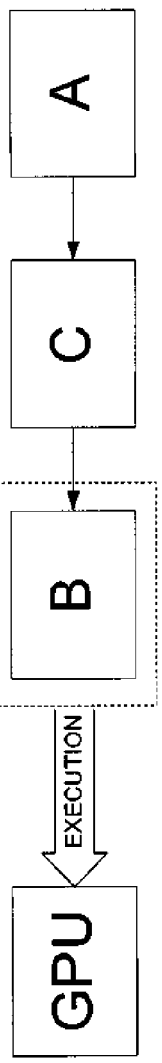

When a low priority thread D is started, it is appended to the run list.

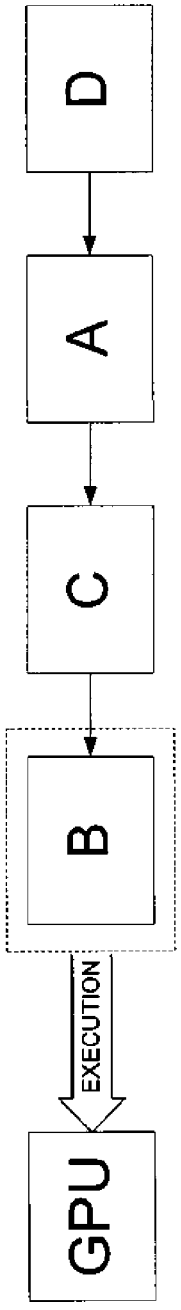

In some embodiments, if D is high priority, it may inserted into the run list based on its priority (i.e., not necessarily at the end)

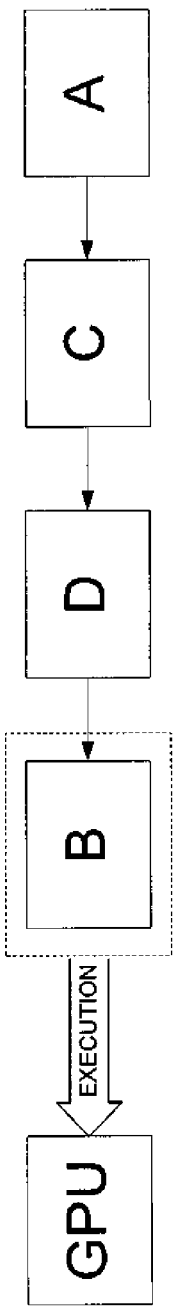

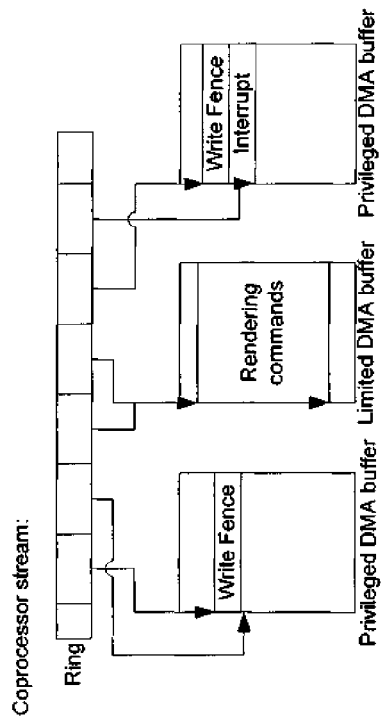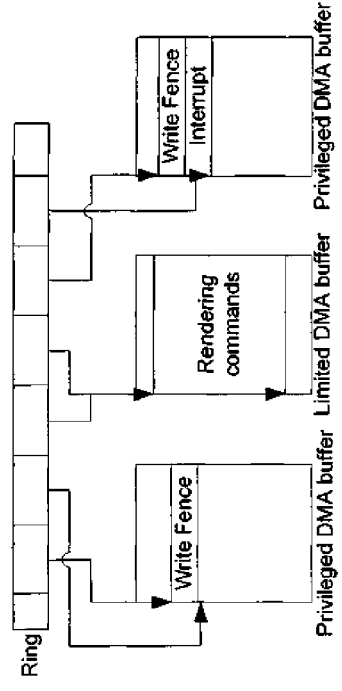
FIGURE 24

BUILDING A RUN LIST FOR A COPROCESSOR BASED ON RULES WHEN THE COPROCESSOR SWITCHES FROM ONE CONTEXT TO ANOTHER CONTEXT

CROSS-REFERENCE TO RELATED APPLICATION

This application is a divisional of U.S. application Ser. No. 10/763,778 filed Jan. 22, 2004 entitled "System and Methods for Enhancing Performance of a Coprocessor" which claims the benefit of U.S. Provisional Application No. 60/448,402, filed Feb. 18, 2003, entitled "GPU Scheduler Overview;" U.S. Provisional Application No. 60/448,399, filed Feb. 18, 2003, entitled "Video Memory Management Architecture Specification;" U.S. Provisional Application No. 60/448,440, filed Feb. 18, 2003, entitled "Video Memory Management Rectangular Heap;" and U.S. Provisional Application No. 60/474,513, filed May 29, 2003, entitled "Multithreaded Kernel for GPU."

This application is related to co-pending U.S. application Ser. No. 10/763,777, filed on Jan. 22, 2004, entitled "Multi-threaded Kernel for Graphics Processing Unit."

FIELD OF THE INVENTION

The present invention relates to computer processors, and more particularly to hardware and software for scheduling processing of coprocessors.

BACKGROUND OF THE INVENTION

Many computer systems now include coprocessors, for example, graphics processing units (GPUs). In some cases, a coprocessor may reside on the system's motherboard with a central processing unit (CPU), such as a microprocessor, and in other systems a coprocessor may reside on a separate graphics card. A coprocessor often accesses supplemental memory, for example, video memory, in performing its processing tasks. Current coprocessors are often optimized to perform three-dimensional graphics calculations to support applications such as games and computer aided design (CAD). While current computer systems and coprocessors perform adequately when running a single graphically intensive application, they may experience problems when running multiple graphically intensive applications.

One reason for this is the typical coprocessor's inability to efficiently schedule its workload. Current coprocessors typically implement cooperative multitasking, which is a type of multitasking wherein an application currently controlling the coprocessor must relinquish control to other applications. If the application fails to relinquish control, it can effectively "hog" a coprocessor. While this has not been a significant concern when running a single graphically intensive program, the problem of hogging the coprocessor can become more serious when multiple applications attempt to use a coprocessor.

While the problem of apportioning processing between operations has been addressed in the context of a CPU, where sophisticated scheduling of multiple operations has become necessary, scheduling in coprocessors has not been effectively addressed. This is because the coprocessor, in present day systems, is generally seen as a resource to divert calculation-heavy and time consuming operations away from the CPU, providing the CPU with more processing time for other functions. Such calculation-heavy operations are often graphics operations, which are known to require significant processing power.

One problem that arises if tasks are scheduled for a coprocessor is the possibility of coprocessor "starvation." Starvation occurs when the coprocessor is not busy, and therefore processing resources of a computer system are not being used effectively. For this and other reasons, systems and methods for enhancing the performance of a coprocessor by minimizing coprocessor starvation, as well as allowing for other scheduling efficiencies, are desired.

SUMMARY OF THE INVENTION

This invention provides various techniques, that can be used in tandem or individually, for minimizing coprocessor "starvation," and for effectively scheduling the processing in a coprocessor for greater efficiency and power. In this regard, a run list is provided by a Central Processing unit ("CPU") allowing a coprocessor to switch immediately, on the occurrence of a switching event such as a page fault or task completion, from one task to the next, without waiting for CPU intervention. In addition to the run list, a method called "surface faulting" allows a coprocessor to fault at the beginning of a large task, such as rendering a surface, rather than somewhere in the middle of the surface after significant processing resources have been spent. Further, DMA control instructions, namely a "fence," a "trap" and a "enable/disable context switching," are provided that can be inserted into a processing stream to cause a coprocessor to perform tasks that enhance coprocessor efficiency and power. These instructions can also be used to build high-level synchronization objects, as will be described in greater detail below. Finally, a "flip" technique is described that can switch a base reference for a display from one location to another, thereby changing the entire display surface. Situations where these techniques can be beneficially employed, in addition to further description of these and other aspects of the invention, are provided below.

BRIEF DESCRIPTION OF THE DRAWINGS

FIG. 12(A) and FIG. 12(B) provide an exemplary representation of a sequence of actions capable of implementing the advanced scheduling model.

FIG. 16 is an illustration of multiple contexts, each with its own DMA ring, that can be processed simultaneously when surface-level faulting is implemented in conjunction with the present invention.

FIG. 17(A), FIG. 17(B), and FIG. 17(C) provide a pseudocode algorithm describing the operation of the invention in conjunction with the components of FIG. 16, including various additional features that may prove useful.

FIG. 18 is a diagram conceptually representing the use of a run list in accordance with the present invention.

FIG. 24 is an exemplary technique for synchronizing access to resources to ensure that two or more processors can use valid content while rendering.

DETAILED DESCRIPTION OF ILLUSTRATIVE EMBODIMENTS

Figure 1:
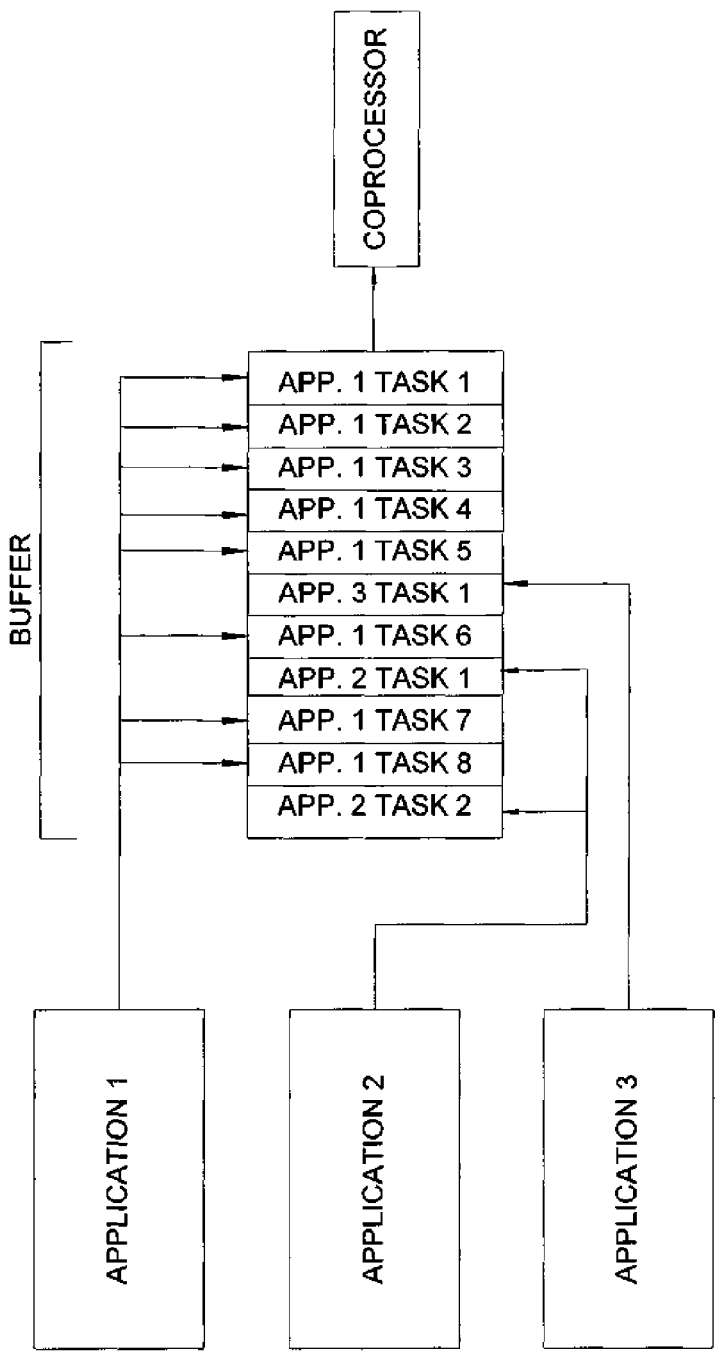
FIG. 1 is a conceptual illustration of a prior art approach to scheduling processing for a coprocessor.
Figure 2:
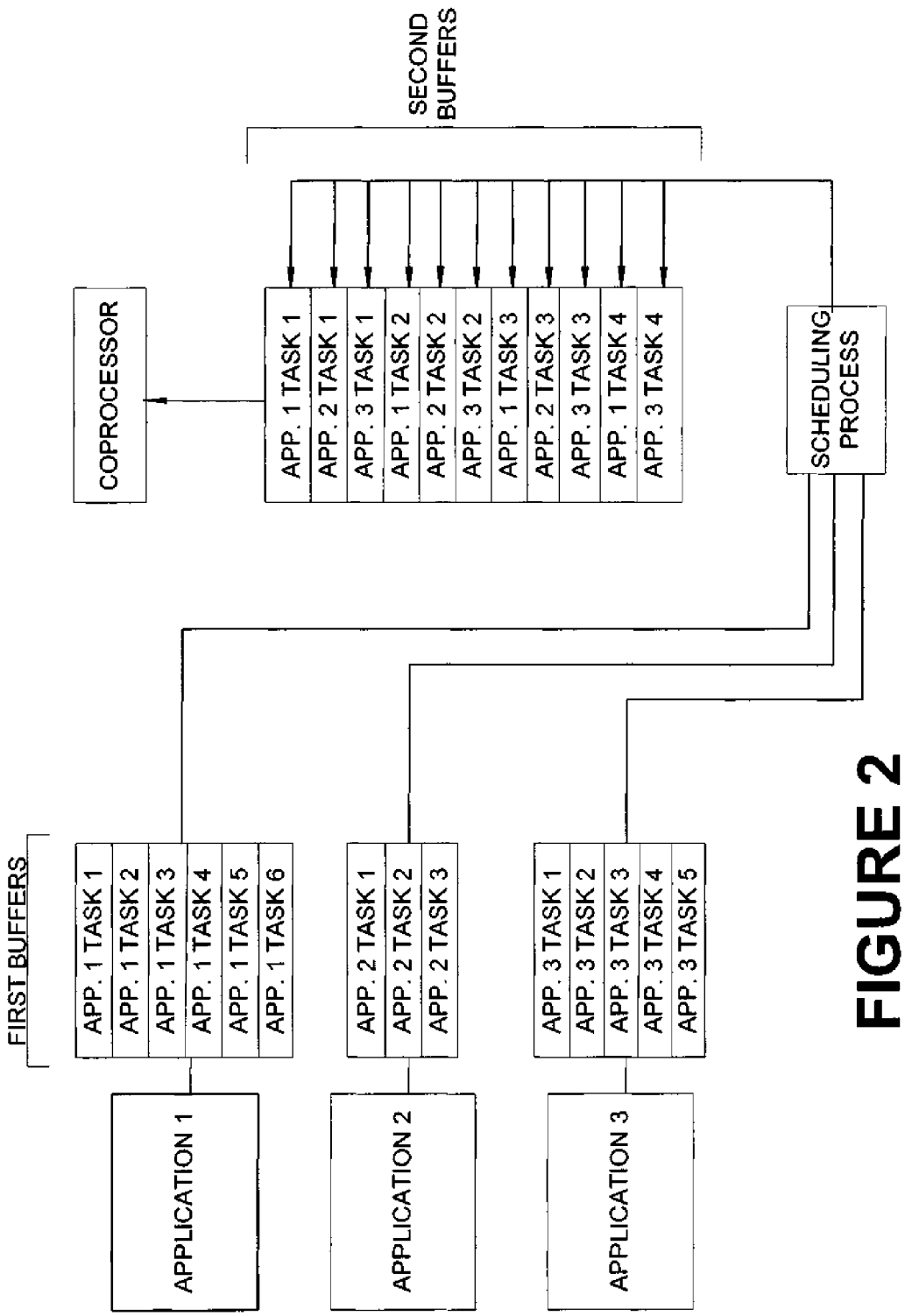
FIG. 2 is an exemplary illustration of a coprocessor scheduling improvement in accordance with the present invention.

Several of the improvements accomplished by the present invention can be conceptually illustrated through a comparison of FIG. 1 and FIG. 2. FIG. 1 represents a typical prior art approach to task scheduling for a coprocessor. A buffer is provided which can be accessed by various applications, e.g., Application 1, Application 2, and Application 3. The applications can load tasks for the coprocessor into a buffer, and those tasks can be processed by the coprocessor after previously submitted tasks are completed. As illustrated, this approach leaves open a potential "hogging" of the coprocessor. In FIG. 1, App. 1 is hogging the coprocessor. App. 1 has requested that the coprocessor work on seven tasks, while the other two applications combined have requested work on only three tasks. In situations like these where multiple applications need the coprocessor, a system such as that provided by FIG. 2 may provide improved functionality.

FIG. 2 illustrates a system and method, in accordance with the present invention, whereby each application, e.g., Application 1, Application 2, and Application 3 can maintain its own buffer, namely, the "first buffers" of FIG. 2. These buffers (which will later be referred to as "command buffers") are submitted to a scheduling process that can determine when the various tasks will be delivered to the coprocessor. As illustrated in FIG. 2, the scheduling process has, in this case, inserted tasks into "second buffers." For simplicity, the "second buffers" of FIG. 2 have been illustrated as a single buffer. In practice, however, several buffers may be required to carry out the function of the "second buffers" in FIG. 2. The second buffers of FIG. 2 have divided tasks for delivery to the coprocessor such that Application 1 can no longer hog coprocessor resources. The scheduling process has allowed Application 1 a first task on the coprocessor, then Application 2, then Application 3, and then Application 1 again, etc.

While implementation of the system and method illustrated conceptually in FIG. 2 is more complex than FIG. 2 demonstrates, the improvements disclosed herein are generally directed towards supporting the basic concept as illustrated in FIG. 2. Turning now to a more detailed description of embodiments of the invention, the following term definitions are provided for easy reference:

Command buffer—A buffer built by a user mode driver. This buffer may be a regular pageable memory allocated in the context of the rendering application.

DMA buffer—"Direct Memory Access" buffer. A buffer built by a kernel mode driver. This buffer may be based on the content of a command buffer. It is, in general, allocated from a kernel pageable memory and only visible to the kernel. In this regard, pages may lock and map through an aperture before the coprocessor can read from it.

Paging buffer—A buffer built by a kernel mode driver. This buffer can be used to page in, evict, and move memory resources needed for a particular DMA buffer. Paging buffers may be configured to run immediately prior to their DMA buffer counterpart.

Ring buffer—This is a coprocessor-context—specific buffer. Directions to DMA buffers may be inserted into this buffer. In this regard, a coprocessor can fetch commands to execute from such a ring buffer. A ring buffer generally contains redirection instructions that instruct the coprocessor to start reading commands from a DMA buffer and then return to the ring buffer once the DMA buffer has been completely processed.

Supplemental memory—Memory that is generally dedicated for use by a coprocessor and need not be part of the physical system memory. It may be, for example, local video memory that resides on a graphics card. It may also other coprocessor-readable memory, such as memory mapped through a system memory aperture. This memory typically does not exist in integrated or UMA graphics devices. This memory is not accessed via a GART like page table based aperture System memory aperture—This is a subset of physical system memory. It may be visible to the coprocessor via a GART-like page table based aperture. The CPU may be able to access the physical system memory independent of the system memory aperture. Some examples that are conceptually similar are Accelerated Graphics Port ("AGP") memory, Peripheral Component Interconnect ("PCI") Express memory or Unified Memory Architecture ("UMA") memory when such memory is accessed via an aperture.

Figure 3:
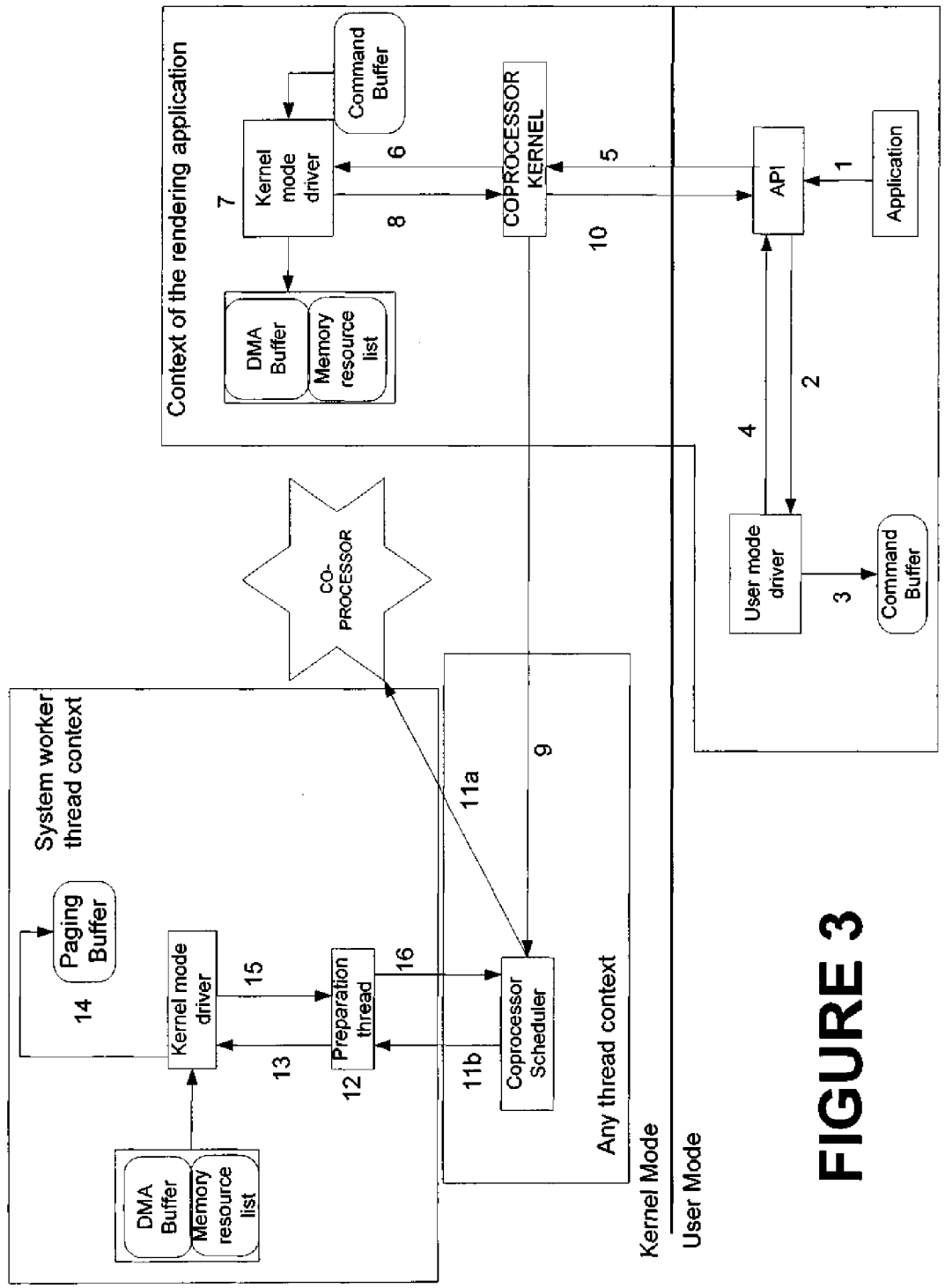
FIG. 3 is a more detailed illustration of the computing components involved in providing the scheduling improvement illustrated conceptually in FIG. 2.

A more detailed view of various embodiments of the invention may be found in FIG. 3. FIG. 3 provides a schematic diagram of the various software and hardware objects that may be combined to provide the function demonstrated conceptually in FIG. 2. FIG. 3 presents a series of sequential steps that will be described below. The steps are presented sequentially for the purpose of clearly explaining and enabling the invention, and should not be construed as presenting a required sequence for practicing the invention. The order may be varied in accordance with known or future developed practices in the art. The following discussion will begin with an overview of the systems and methods of FIG. 3, and proceeds to a more detailed discussion of some aspects of FIG. 3.

FIG. 3, step 1 represents an application call to an Application Program Interface ("API"). An application can be any set of files that make up software for the user. An API is typically a language and message format used by an application to communicate with an operating system kernel, but also refers to such a format for communication with other control programs such as database management systems (DBMS) or communications protocols. One exemplary API for use in conjunction with the present invention is the Direct3D Runtime API developed by MICROSOFT®.

Step 2 represents a call from an API to a user mode driver. The user mode driver, generally, is a program routine (or hardware) that can link a software system (often an operating system) to a peripheral subroutine, which can be either software or hardware. Here, the user mode driver receives calls from the API that can contain API parameters corresponding to the original call from step 1. Step 3 represents the accumulation of rendering commands, as generated by a user mode driver, in a command buffer. A buffer is a region of memory reserved for use as an intermediate repository. Data can be temporarily held in a buffer while waiting to be transferred between two locations, such as a data area and a processor or coprocessor for processing. The particulars of command buffer content, as generated by the user mode driver, can be chosen to facilitate translation into a hardware specific DMA buffer, as described further below. Also, it may be useful, in defining a command buffer, to omit direct memory references to memory resources, such as "texture" or "vertex buffer." Instead, Independent Hardware Vendors ("IHVs") may define command buffers that optionally contain handles, such that a kernel interface may provide memory references to a command buffer at the time such memory resources are created.

Step 4 represents the flushing of the command buffer. "Flushing" simply refers to emptying it of the accumulated rendering commands. The rendering commands may be sent back to the API, as illustrated, for the purpose of delivering them to a coprocessor kernel as demonstrated in FIG. 3. Flushing may occur for any reason, including but not limited to flushing because the command buffer is full and requires more space for incoming rendering commands, and existence of high priority rendering commands in the command buffer that require immediate processing.

Step 5 represents flushing accumulated command buffers by the API to the coprocessor kernel. A kernel is generally known as the core part of an operating system, the portion that optionally manages memory, files, and peripheral devices, and may also launch applications and allocate system resources. It will be appreciated that a coprocessor kernel can be any type of kernel, including the primary system kernel, or a separate, coprocessor specific kernel, or, for example, a specific type of kernel such as a MICROSOFT® DirectX Kernel ("DXG").

Step 6 represents the submission of the command buffer to a kernel mode driver. coprocessor kernel. The coprocessor kernel can direct the command buffer to a kernel mode driver. The kernel mode driver may generally be a driver, as described above with reference to the user mode driver, except that the kernel mode driver can operate in kernel mode, as its name suggests. In this regard, a kernel mode driver can be responsible for translating a command buffer into a DMA buffer. IHVs may consider providing the appropriate mechanisms to ensure proper validation and copying of command buffers into kernel mode allocated DMA buffers. DMA buffers may be hardware-specific, in that they are collections of commands ultimately destined for a coprocessor and therefore should properly interface with the coprocessor and supporting hardware.

Notice the horizontal line across FIG. 3 that separates user mode and kernel mode. As the line suggests, the invention can operate within the traditional layout of computer memory allocation, which is implemented for security of the system. The user mode is non-privileged memory, and can be accessed by applications. The kernel mode, on the other hand, is privileged and cannot be accessed by applications. While a kernel mode allocated DMA buffer can theoretically be mapped into any memory space, but it should be kept in mind that mapping into the private process space of applications can lead to security risks. This is because the content of any virtual address referred to by threads in an application's private process space can be modified; in other words the content of the DMA buffer could be modified between the time it is validated and the time it is processed by the hardware.

As step 7 indicates, the kernel mode driver may also build a list of the memory resources to be used by the DMA buffer. This may be accomplished as part of the validation of the command buffer. The list could contain, for example, a kernel handle for the various memory resources on the list, and a buffer location where memory resources are referenced. This list may also include an expected context state for the listed memory resources. This allows the memory resources that are part of any current hardware state (e.g., "current render target," "current z-buffer," and the like) to be part of the list to be reprogrammed at the beginning of the DMA buffer, since they may have changed location since the last DMA buffer that was submitted to a coprocessor.

Step 8 represents sending a DMA buffer, along with any memory resources list, to a coprocessor kernel. The coprocessor kernel may then submit the DMA buffer to a coprocessor scheduler, as shown in step 9, and return to user mode, as in step 10.

A coprocessor scheduler is generally responsible for scheduling the flow of tasks for the coprocessor (as embodied in various DMA buffers and other work sent to the coprocessor). The functionality of the coprocessor scheduler is potentially very broad, and this description contains many potential functions that the coprocessor scheduler may perform. The coprocessor scheduler may be referred to as either a coprocessor scheduler or simply as a scheduler. In various embodiments, as shown in FIG. 3, the scheduler may perform one or more functions prior to submitting the DMA buffer to a coprocessor. Step 11a dynamically illustrates that one function of the scheduler is to submit DMA buffers that are ready for processing.

Step 11b represents selection of a DMA buffer that the scheduler determines either to add to a list of prepared DMA buffers or to run next. In this regard, the scheduler can pass the DMA buffer to a preparation thread. A preparation thread, as the term is used here, generally provides the function of ensuring that the proper memory resources are on hand for processing the DMA buffer. First, the preparation thread may call a supplemental memory manager process (not shown) to determine a sufficient location in which to page all required memory objects (in the graphics context, "surfaces") that are not currently in supplemental memory (this is step 12). Note that the term "supplemental memory" refers to memory that is allocated for use by the coprocessor; in the case of a GPU coprocessor, supplemental memory is often referred to as "video memory."

It is possible that not all the memory resources required by a DMA buffer will fit into available supplemental memory at once. The supplemental memory manager can fail to bring all the surfaces in supplemental memory at this point for diverse reasons. If this should occur, some further processing may be done to make more room in supplemental memory, or, alternatively or in combination with making more room, the DMA buffer can be split into multiple fragments. In this case, the preparation thread can use a driver pre-defined split point to split the buffer and attempt to locate the subset of memory resources needed by this smaller DMA buffer.

Once sufficient supplemental memory has been located for the DMA buffer, the preparation thread can call a kernel mode driver, as illustrated by step 13. This may be the kernel mode driver mentioned in conjunction with steps 6, 7, and 8, or it can be a separate kernel mode driver, as will be appreciated by those of skill in the art.

Step 14 illustrates that the kernel mode driver can build a paging buffer for the DMA buffer awaiting processing. The kernel mode driver may build this paging buffer based on processing commands from the preparation thread. A paging buffer is a buffer, as defined above, for the purpose of paging memory resources. "Paging" refers to changing the physical address of a block of memory (a page) using mapping hardware. A paging buffer, generally speaking, is a DMA buffer that contains coprocessor instructions to move memory resources to their assigned location. The paging buffer serves the function of bringing any memory resources required by a DMA buffer to a correct memory location, from which those resources can be accessed by the coprocessor when needed. If a paging buffer is properly generated, the location of any requisite memory resources for a particular coprocessor task (i.e., a DMA buffer) is known.

Step 15 represents notification to a preparation thread that a paging buffer has been generated. Step 16 represents a signal to the scheduler that a paging buffer is ready. The scheduler may at this point assume that a next DMA buffer is ready for processing, or it may go on to conduct further preparation operations on a DMA buffer prior to sending it to a coprocessor for processing. For example, since memory locations may have changed since the creation of the original DMA buffer, the scheduler may at this point call into the kernel mode driver once again to allow it to patch the DMA buffer with the actual location of memory resources. Finally, the scheduler may submit both the paging buffer (if it exists) and the DMA buffer to the coprocessor (and any other auxiliary hardware) to be processed.

Figure 4:
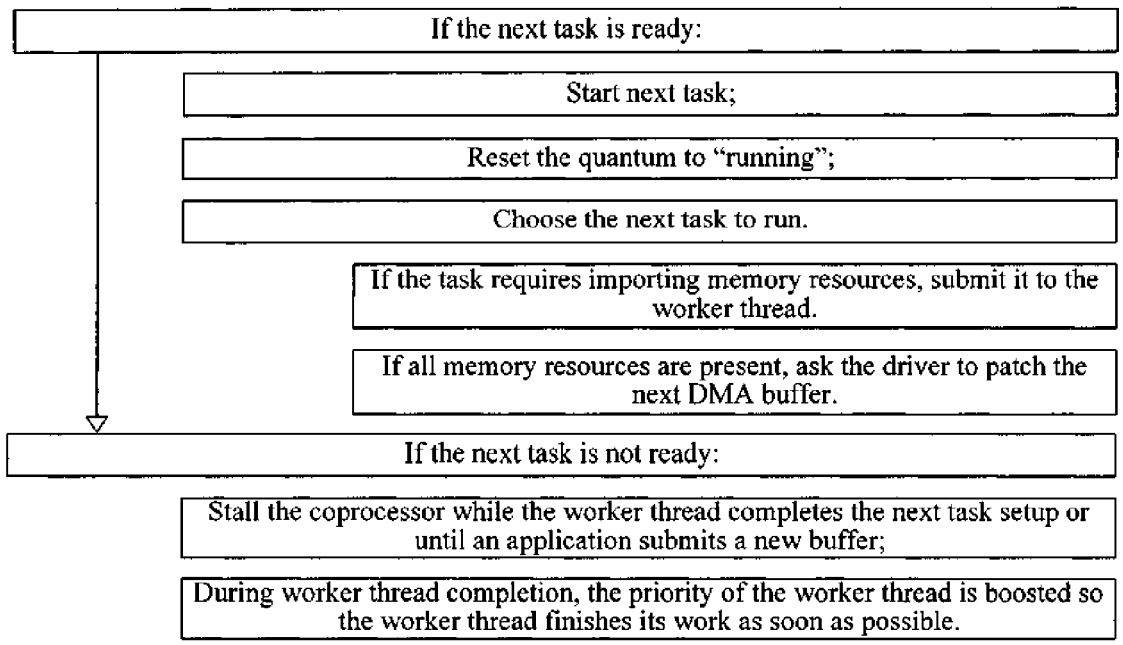
FIG. 4(A) and FIG. 4(B) are pseudocode algorithms that demonstrate various non-limiting possible ways to combine the steps of FIG. 3 into a functional sequence.

Steps 1 through 16 as described above can be implemented through hardware, software, and a combination thereof. In this regard, FIGS. 4(A) and 4(B) generally illustrate the steps of FIG. 3 in the form of a pseudo algorithm. FIGS. 4(A) and 4(B) are not an exhaustive list of the potential pseudo algorithm steps that may be practiced in connection with this invention, and it should not be construed that each and every step in FIGS. 4(A) and 4(B) are necessary to practice the invention. Instead, FIGS. 4(A) and 4(B) are a suggestive list for the purposes of teaching the invention.

The above discussion provided in connection with FIG. 3 is a description of various embodiments of the invention. Multiple advancements have been discovered, however, in connection with the implementation of the invention as described above. The remainder of this description is for the purpose of enabling the various improvements and overcoming difficulties that may arise in practicing the invention.

A Scheduling Consideration

Some or all of the operations defined previously (see steps 1-16, above) may occur before a DMA buffer is submitted to the hardware. However, some of these operations may be difficult to perform until the DMA buffer is submitted to the hardware. For example, the location of memory resources may be difficult to determine until the instant before a DMA buffer is to be submitted to the coprocessor. This is because supplemental memory resources could be moved with each DMA buffer as it is run on the coprocessor.

Some of the operations encompassed by steps 1-16, above, may be time consuming and thus can not be done at an interrupt time, for example after the scheduler picks which task to run next. Similarly, precisely because they are time consuming, it would be beneficial to execute them on the central processing unit ("CPU") while the coprocessor is busy doing other things. This is to minimize coprocessor starvation. Coprocessor starvation merely refers to time spent in which the coprocessor is not performing processing functions. In response to this problem, it may be beneficial to utilize a "worker thread" in conjunction with the scheduler. A worker thread can perform the function of helping to handle some of the time consuming setup work. A worker thread was added into to pseudo algorithm of FIG. 4(B) for and example of its operation in connection with the other processes of the invention.

Further to this scheduling consideration, note that at any given time in the system of FIG. 3, there may be a running DMA buffer (i.e., a DMA buffer currently being processed by the coprocessor), a DMA buffer being prepared, and a list of DMA buffers that are ready to be prepared. New DMA buffers, on submission to the scheduler, can be inserted in the ready queue and ordered appropriately depending on their priority. However, various embodiments of the invention may increase functionality if a new DMA buffer, on submission to the scheduler, can not preempt the DMA buffer that was selected as next task for the coprocessor. The reason for this is that preparing a DMA buffer might involve paging memory resources in and out of supplemental memory. Therefore preemption of the next DMA buffer selected for processing could result in changes to the persistent state of the supplemental memory manager. If the task being prepared could be preempted, it could result in undoing changes that were made to the persistent state of the supplemental memory manager, due to the preparation of the newly elected DMA buffer. Undoing changes to supplemental memory halfway through operation on a DMA buffer task may not be trivial, and can lead to potentially more frequent coprocessor starvation.

Splitting a DMA Buffer

When a command buffer is submitted to a coprocessor kernel by an API, the kernel mode driver may then be charged with generating a hardware specific DMA buffer and a list of memory resources that is needed to run that DMA buffer. While particular DMA buffer formats may be defined by the IHVs, software providers may find themselves with the task of defining the format of the resources list for the kernel mode driver.

The memory resources list can provide timeline information about the different memory resources that may be used by the DMA buffer. The scheduler, in turn, can use the memory resources list to page in any required memory resources before the DMA buffer is run on the coprocessor, and if necessary to split the DMA buffer, such as when a DMA buffer uses too many resources at once.

If DMA buffers are to be split by a scheduler, the kernel mode driver may facilitate this by providing timeline information in the memory resources list. This can be done by allowing the driver to specify an "offset" within a DMA buffer. An offset may be set when a memory resource is being programmed by inserting a memory resource identifier specifying the usage of the memory resource at the offset. Since memory resources can appear more than once in a DMA buffer, the same memory resources may appear multiple times in a memory resource list. Each reference to a memory resource in a DMA buffer will add one entry to the resource list.

In itself, that handle/offset list may not be enough to give a scheduler sufficient information about the memory resources that it needs to split a DMA buffer. In order to know precisely when a particular memory resource is needed in a DMA buffer, the scheduler may also require information regarding when a memory resource is replaced by another resource. For example, a first texture, texture A, could be involved at the beginning of a DMA buffer in a first texture stage, replaced by a second texture, texture B, in the middle, and then returning to texture A at the end of the DMA buffer. The scheduler can use this additional information to split the DMA buffer in chunks that will use less memory resources. However, in the scenario described above, texture B could also have been programmed in the first texture stage, in which case it would have been used at the same time as texture A, and should not be split into a separate subset of the DMA buffer.

To achieve the "finer grain" temporal information needed to split DMA buffers in the sophisticated way described above, a scheduler may utilize information about the usage of memory resources throughout the DMA buffer. This can be achieved, in one embodiment, when the kernel mode driver provides a resource identifier for each entry in the memory resource list. A resource identifier is simply an integer value that represents how a particular memory resource is going to be used. For example, a value of 0 could indicate that a memory resource is being used as a render target while a value of 1 would indicate that a resource is being used as a z-buffer. With this information, the scheduler can determine if texture B is replacing texture A (e.g., if both have the same resource identifier) or being if texture B is to be used at the same time as texture A (e.g., A and B have different resource identifiers). The actual value for the resource identifier and their meaning can be defined by an IHV, or provided in the software architecture. It could be useful to ensure that the values used as resource identifiers are zero based, and for the driver to specify the maximum recourse identifier value it will use at driver initialization time.

Figure 5:
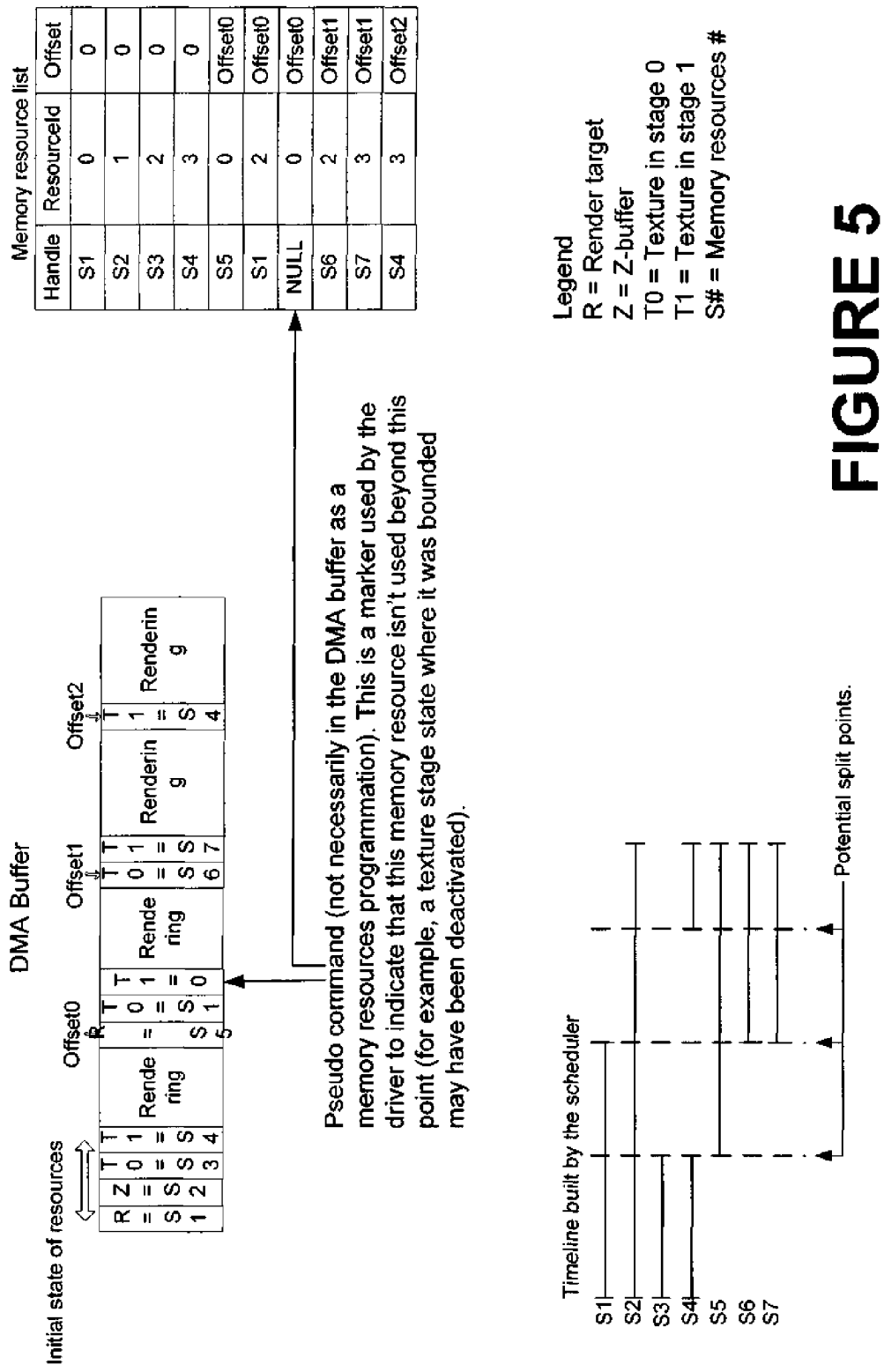
FIG. 5 illustrates how a scheduler may use provided information to define a timeline for memory resources used in a Direct Memory Access (DMA) buffer in accordance with the invention.

FIG. 5 illustrates how a scheduler may use provided information to define a timeline for the memory resources being used in a DMA buffer. The scheduler can proceed to use the timeline to define buffer split points. It may be important to note that, in general, DMA buffers should start with a "setup," or identification process, of current memory resources (i.e., those that were current at the end of the previous DMA buffer). The reason for this is that memory resources may have moved since a previous DMA buffer was executed and thus might need to be reprogrammed. Memory resources may need to be reprogrammed up until the moment the DMA buffer is scheduled for processing.

The memory resource list, as illustrated in FIG. 5, may contain any number of fields. The following table provides a nonexhaustive list of useful fields:

| Handle | Handle of a memory resource |
| --- | --- |
| ResourceId | Resource identifier optionally specifying how a resource is to be used. |
| Offset | Offset within the DMA buffer where memory resources can be programmed. The scheduler can ask the driver to run the DMA buffer up to that point if it needs to split the buffer because of memory constraints. Thus this offset can provide a valid split point for the DMA buffer. |
| SegmentHint | Specifies a segment the driver would like to use for a particular allocation to provide optimal performance. This can replace the current driver preference for the allocation. |
| BankHint | Specifies a bank within a hinted segment where the kernel mode driver can page an allocation. This can replace a current driver preference for the allocation. |
| SegmentId | Specifies a segment identifier of a segment holding memory resources. This can be filled during paging. |
| PhysicalAddress | Specifies the physical address of a memory resource within a segment. This will be filled during paging. |

Paging

Figure 6:
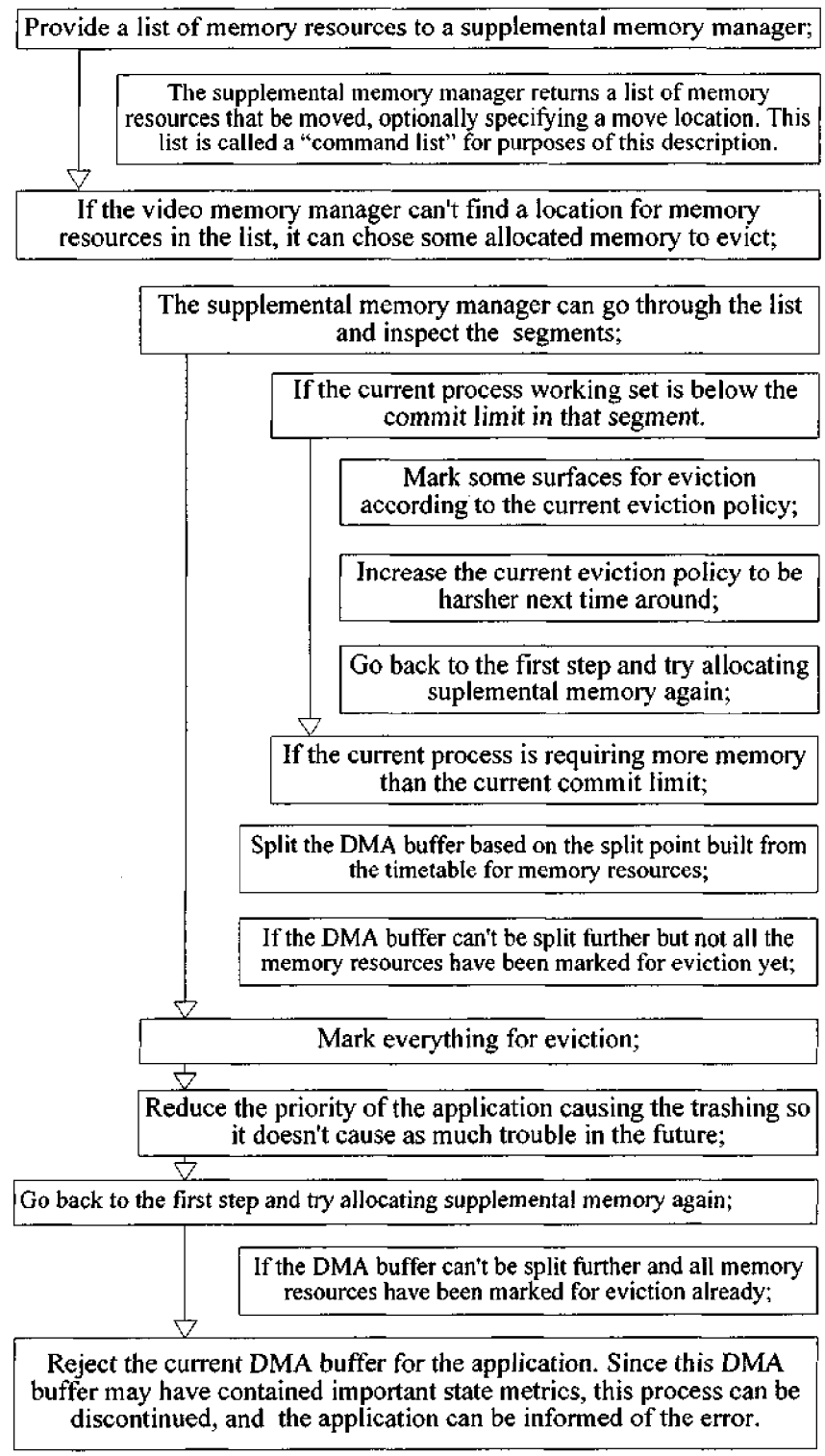
FIG. 6 is an algorithm illustrating the dynamic between a preparation worker thread and a supplemental memory manager in accordance with the invention.

In general, the memory resources referenced by a DMA buffer are brought into memory before a DMA buffer is submitted to be executed by the coprocessor. Bringing referenced memory resources into memory is called paging the resources. Paging can involve interaction between a preparation worker thread, as described above, and a driver, such as a kernel mode driver. Refer to FIG. 6 for a pseudo algorithm illustrating the dynamic between the preparation worker thread and the supplemental memory manager.

The paging step will typically occur when a DMA buffer has been selected for processing, and a list of resources for the particular DMA buffer has been generated. Paging is conducted to determine how to get memory resources into supplemental memory and where in supplemental memory to put them.

The paging process can be handled by a supplemental memory manager. The supplemental memory manager can use a hint that is optionally provided by the kernel mode driver on creation of a particular allocation. The hint was created to find an appropriate location in memory for a memory resource.

There are several problems associated with paging memory resources. There might not be enough free supplemental memory available to bring all the resources in, in which case some resources currently in memory can be evicted. Even after evicting other objects in supplemental memory, there may be insufficient memory for the DMA buffer. In that case the DMA buffer can be split in multiple smaller pieces, requiring fewer memory resources.

During paging, a supplemental memory manager can build a list of commands that are may be used to place the memory resources at appropriate locations. That list of commands can be built, for example, from the following operation:

1) Evict: Move a particular memory resource out of its current segment and to system memory in order to make room for another resource;
2) Page in: Bring a particular memory resource from system memory to a free location in supplemental memory.

3) Relocate: Move a particular memory resource from one supplemental memory location to another.

The supplemental memory manager may be allowed to use any of these operations to resolve the memory placement problem. This nonexhaustive command list can be generated by the supplemental memory manager during a paging operation and used later by the scheduler to generate a paging buffer. The supplemental memory manager can generate an entry in a command list for any memory resource that is relocated, evicted, or paged in, or otherwise moved or altered in any way. In this regard, various embodiments of the invention may provide for the following fields in a command list:

| Handle | Handle of a memory resource to relocate. |
| --- | --- |
| SegmentId | Segment identifier for the segment into which a memory resource is currently located. |
| PhysAddress | Current physical address within the current segment of the memory resources. |
| NewSegmentId | Segment identifier for the segment where the resources may be moved to. |
| NewPhysAddress | New physical address within a new segment where the resources may be moved. |

Paging Buffer Generation

Using a command list as described above, a scheduler may generate a paging buffer to execute the commands. Various embodiments of a paging buffer for use in connection with the present invention can be implemented as illustrated in FIG. 7.

Figure 7:
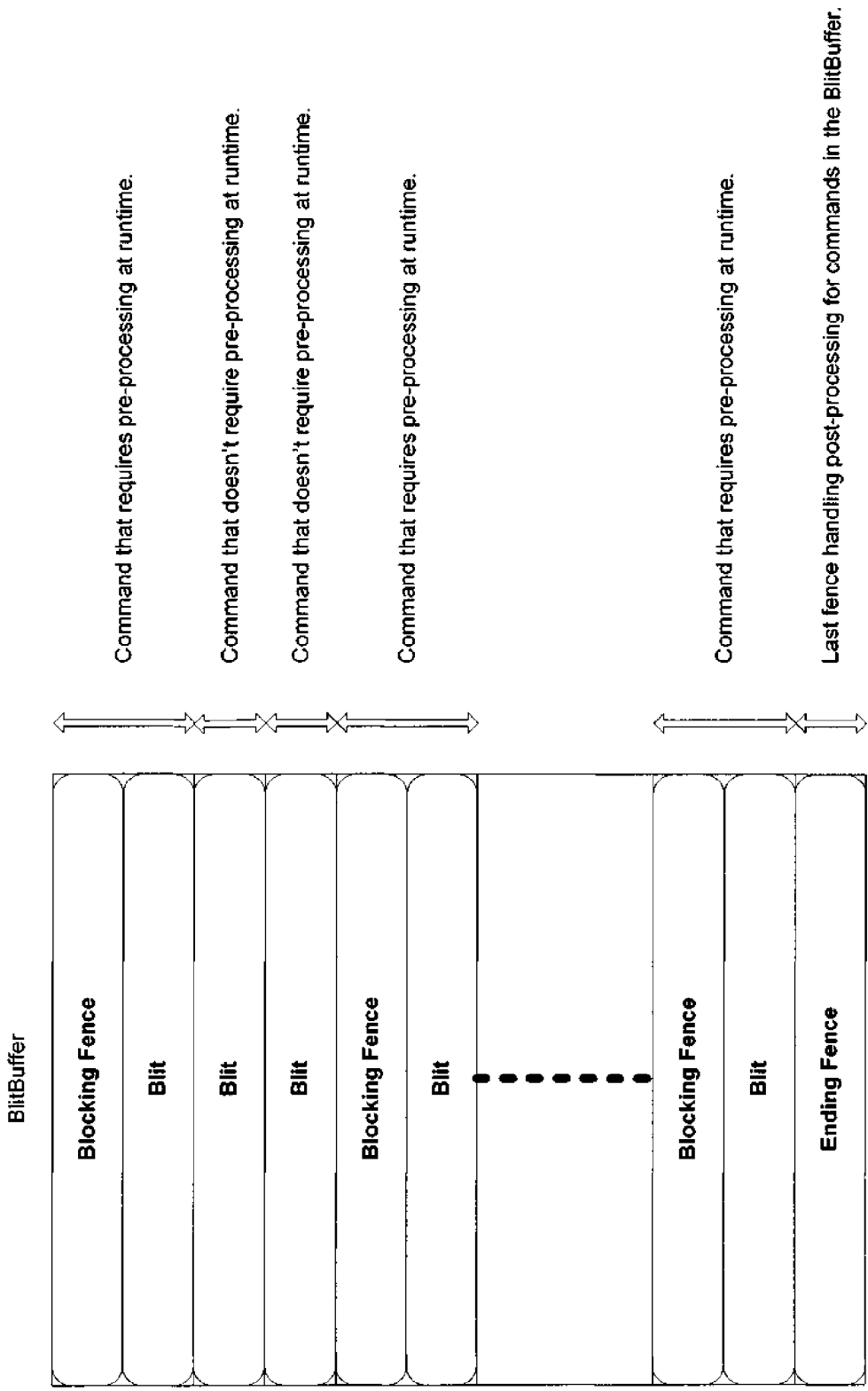
FIG. 7 is an exemplary illustration of the preparation of a paging buffer that shows a worker thread preparing the paging buffer and handling CPU preprocessing for the paging buffer in accordance with the invention.

As illustrated in FIG. 7, some commands may need pre-processing before they can be executed, while other commands may be handled without preprocessing. Pre-processing can be done in any number of ways, including in a worker thread. Note that it may be necessary to wait, in pre-processing commands, until part of the paging buffer has been processed. In the model illustrated by FIG. 7, a worker thread prepares the paging buffer and handles CPU preprocessing for the paging buffer. When CPU preprocessing is needed before an operation in a paging buffer, the worker thread blocks operations on the paging buffer in the coprocessor. It then submits a CPU request before restarting the paging buffer again to complete the operation.

Thus for each command in the command list, the following actions may be appropriate:

Pre-processing at the time of paging buffer generation;
CPU processing at a sync point in the paging buffer;
"Blit" command to move memory resources;
Post-processing CPU work once the paging buffer is completed.

With reference to the above list of possible actions, a paging buffer itself can contain commands that will ask a coprocessor to stop while a CPU handles some work. Such a command that generates an interrupt and stalls a coprocessor will be referred to here as a "blocking fence." Any command in a paging buffer can be prefixed or post-fixed with a blocking fence. Because interruptions are not desirable, the number of times the CPU may interrupt the coprocessor can be reduced by aggregating post operation fences to the end of a buffer. Cases where post operation fences (or "post-fences") are needed before the end of the buffer will be detected by the scheduler and be merged with the pre-operation fence (or "pre-fence") of the command that would require the post fence to have been executed.

Note that to maintain coherency of supplemental memory, it may be advantageous not to allow outside interruptions in the processing of the paging buffer. Thus, if a quantum expires before a paging buffer is completely executed; the paging buffer may be allowed to remain in control of the coprocessor until it is completed.

Figure 8:
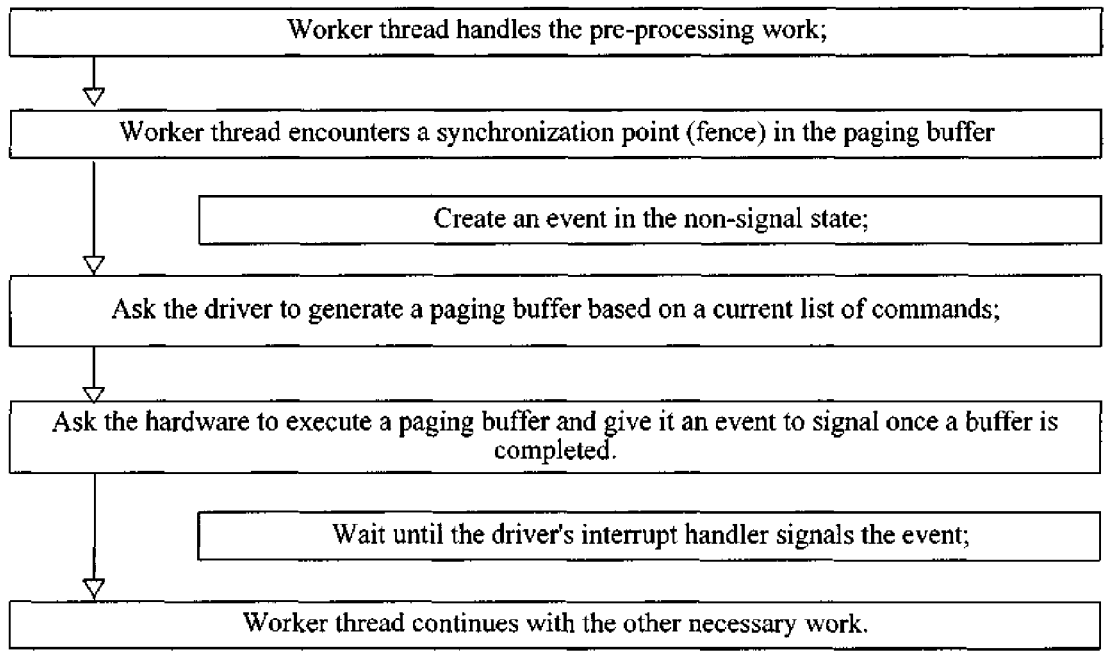
FIG. 8 is an algorithm representing a chain of events that may take place in a worker thread including the handling of a fence in a paging buffer in accordance with the invention.

Refer to FIG. 8 for a pseudo algorithm representing a chain of events that may take place in a worker thread including the handling of a fence in a paging buffer. In connection with FIG. 8, the following table provides a list of generalized commands that may occur in a command list, and the likely ramifications of that type of command in terms of preprocessing, paging buffer generation, and any termination fence that may be generated. The following table is provided as a helpful example only, and is not intended as an exhaustive list of either the types of possible commands or the actions that may occur in connection with those commands.

| | |
| --- | --- |
| Move from supplemental memory to another supplemental memory location | Pre-Processing:<br>None.<br>In the paging buffer:<br>    If the transfer is to be done in hardware<br>        The driver can add a blit in the paging buffer.<br>    If the transfer is to be done in software.<br>        Flush the current paging buffer. Once it is flushed,<br>        proceed with a transfer on the CPU.<br>In the termination fence of the paging buffer:<br>    None. |
| Move from supplemental memory to aperture | Pre-processing:<br>Attach to the process owning the supplemental memory resources being moved;<br>MmProbeAndLock the system memory buffer and get an MDL for the locked pages;<br>If MmProbeAndLock pages fails<br>    Handle the blit in software;<br>Unattached from the process;<br>If the aperture location that was allocated isn't currently busy and no command is in the command list before the current command, manipulate that aperture range.<br>    Program the aperture with the MDL we generated.<br>    Note that the aperture was programmed.<br>In the paging buffer:<br>If the aperture hasn't been programmed in the preprocessing stage.<br>    Flush the current paging buffer. After flush, program MDL into an aperture. Continue processing the paging buffer.<br>If the transfer is to be done in hardware<br>    The driver will add a blit in the paging buffer.<br>If the transfer is to be done in software;<br>    Flush the current paging buffer. After flush, transfer the memory using the CPU. Continue processing the paging buffer.<br>In the termination fence of the paging buffer:<br>    None. |
| Move from aperture to supplemental memory | Pre-processing:<br>Attach to the process owning the supplemental memory resources being moved;<br>MmProbeAndLock the system memory buffer and get an MDL for the locked pages;<br>If MmProbeAndLock pages fails<br>    Handle the blit in software;<br>Unattached from the process;<br>If the aperture location that was allocated is not currently busy and no command is in the command list before the current command, manipulate that aperture range.<br>    Program the aperture with the MDL we generated.<br>    Note that the aperture was programmed.<br>In the paging buffer:<br>If the aperture hasn't been programmed in the preprocessing stage.<br>    Flush the current paging buffer. After flush, program an MDL into the aperture. Continue processing the paging buffer.<br>If the transfer is to be done in hardware<br>    The driver will add a blit in the paging buffer.<br>If the transfer is to be done in software;<br>    Flush the current paging buffer. After flush, transfer the memory using the CPU. Continue processing the paging buffer. |

|              | -continued |
|--------------|-----------|
|              | In the termination fence of the paging buffer: |
|              | If the aperture range was not already reclaimed by |
|              | another operation in the buffer. |
|              |     Unmap the aperture range; |
|              |     Attach from the process owning the surface; |
|              |     MmUnlock the system memory buffer; |
|              |     Unattach from the process. |
| Eviction from supplemental memory | Same process as move from video to aperture. Except that on the termination fence of the paging buffer the aperture range is unmapped. |
| Eviction from aperture | Pre-processing: |
|              | If the aperture range isn't busy. |
|              |     Unmap the aperture range; |
|              |     Attach to the process owning the surface; |
|              |     MmUnlock the system memory buffer; |
|              |     Unattached from the process. |
|              | In the paging buffer: |
|              | None. |
|              | In the termination fence for the paging buffer: |
|              | If the aperture range hasn't been unmapped yet by any previous operation. |
|              |     Unmap the aperture range; |
|              |     Attach to the process owning the surface; |
|              |     MmUnlock the system memory buffer; |
|              |     Unattach from the process. |

Note that the scheduling model presented here may require significant amounts of non-trivial CPU processing to keep a coprocessor busy. This work is, at least in part, necessitated by of the capabilities of the coprocessor hardware that exists today. Future graphics hardware may be designed having more powerful memory virtualization and coprocessor scheduling. In this regard, several advancements have been arrived at and will also be disclosed in connection with the present invention. For each hardware capability, we explain the motivation for the improvement and the impact on the scheduling model described above. Certain improvements are presented based on particular implementation approaches. Note that while not all of these approaches would necessarily be supported in any future model, the various improvements are described here in such a way as to provide a basis for adapting improvements to implementation approaches if and when the particular approaches are practiced.

Interruptible Hardware

To increase the reliability of coprocessor scheduling, a coprocessor can support being interrupted at a finer granularity than that of an entire DMA buffer. For example, a coprocessor and supporting hardware may support interruption within processing of a triangle, instead of only prior to or after processing a triangle.

In various embodiments of such interruptible hardware, a preferred design approach may be to provide for potentially complete virtualization of the coprocessor through an automatic save and restore of coprocessor contexts to supplemental memory. Each coprocessor context could have, by way of example and not limitation, a private address space, a private ring buffer where DMA buffers are accumulated, and a private piece of memory where the state of the hardware is saved when the coprocessor context isn't running. To support a context switch in this setting, a scheduler could provide a physical address in the supplemental memory of a saved context to a coprocessor through a memory-mapped register. The coprocessor would then load that coprocessor context, verify that all memory resources are valid, and then execute the DMA buffers that have accumulated in the ring buffer, faulting needed resources as they are encountered.

In connection with the above, it can further be possible for a kernel-mode driver to query the state of coprocessor contexts that are not running. This can be done by inspecting a saved context, by using a "run list" event trace (described below), or by any querying means. In this regard, the driver can determine useful information, such as (1) the reason why the coprocessor most recently switched away from a particular context (for example empty, new run list, page fault); (2) the list of memory resources in use by the hardware (if surface-level faulting is supported); (3) the faulting address (if page-level faulting is supported); and (4) the number of coprocessor clock cycles that a particular context has been running.

Furthermore, the kernel-mode driver can be able to insert new DMA buffers into a ring of a context that is not currently running. It can also be able to modify, in a saved context, the location of the ring, the page table or any other physical memory references stored in that context. Such modifications might be required, for example, following a move of those resources in memory.

Per-Coprocessor Context Virtual Address Space

Some complexity of the basic scheduling model described above is due to the fact that coprocessor contexts may be sharing a common coprocessor address space. Virtualizing this address space can provide for a sleeker system. In virtualizing the address space, a supplemental memory manager can move memory around and even evict resources out of supplemental memory entirely. That means the actual coprocessor-visible address for a resource may change during its lifetime. Thus, a command buffer that is built in user mode cannot reference an allocation directly by its address because that address may be unknown until the command buffer is scheduled for execution.

For example, the following elements of the basic scheduling model described above can be eliminated through the user of a per-coprocessor-context address space:
1) Patching command buffers by replacing handles with actual memory locations
2) Validating command buffers for memory access
3) Building memory resource lists in kernel mode
4) Creating separate command and DMA buffers
5) Bringing resources for interrupted DMA buffers back a pre-interruption location In providing a per-coprocessor context virtual address space, allocations within a particular coprocessor context can get their own unique address within that context's address space. The address would not be required to change during the allocation's lifetime. Thus, command buffers could reference those addresses directly and would not require patching. The need to have a command buffers validated and copied into a DMA buffer would also disappear. Since memory references in a DMA buffer would be in the virtual address space of the coprocessor, and that address space would actually be private to any coprocessor context, there would be no need to validate memory references for validity and thus no need to hide the validated content of a command buffer in a DMA buffer that is not visible to applications. Address spaces (either handles or actual addresses) that aren't occupied by an allocation or by an evicted allocation can be redirected by the hardware to a dummy page or cause an access fault. This will preserve security of the kernel mode memory because contexts will not have access to memory they are not supposed to access.

Some of the advantages of per-coprocessor context virtual address spaces are the following: Each allocation would get a coprocessor-visible address (or handle) at allocation time. There would be no command buffers; DMA buffers would be directly visible to the user-mode driver and filled by the user-mode driver. A DMA buffer would refer directly to the addresses (or handles) of the allocations it uses. Resource lists used for paging would be built by the user-mode driver.

Recall the model for various embodiments of the invention as set forth in FIG. 3 and the corresponding description. This model can be further improved using interruptible hardware and/or per-coprocessor context virtual address spaces. In this regard, the following sections describe similar concepts to those of FIG. 3, except further improved by the additional advancements of this invention.

Surface Allocation and Deallocation

Figure 9:
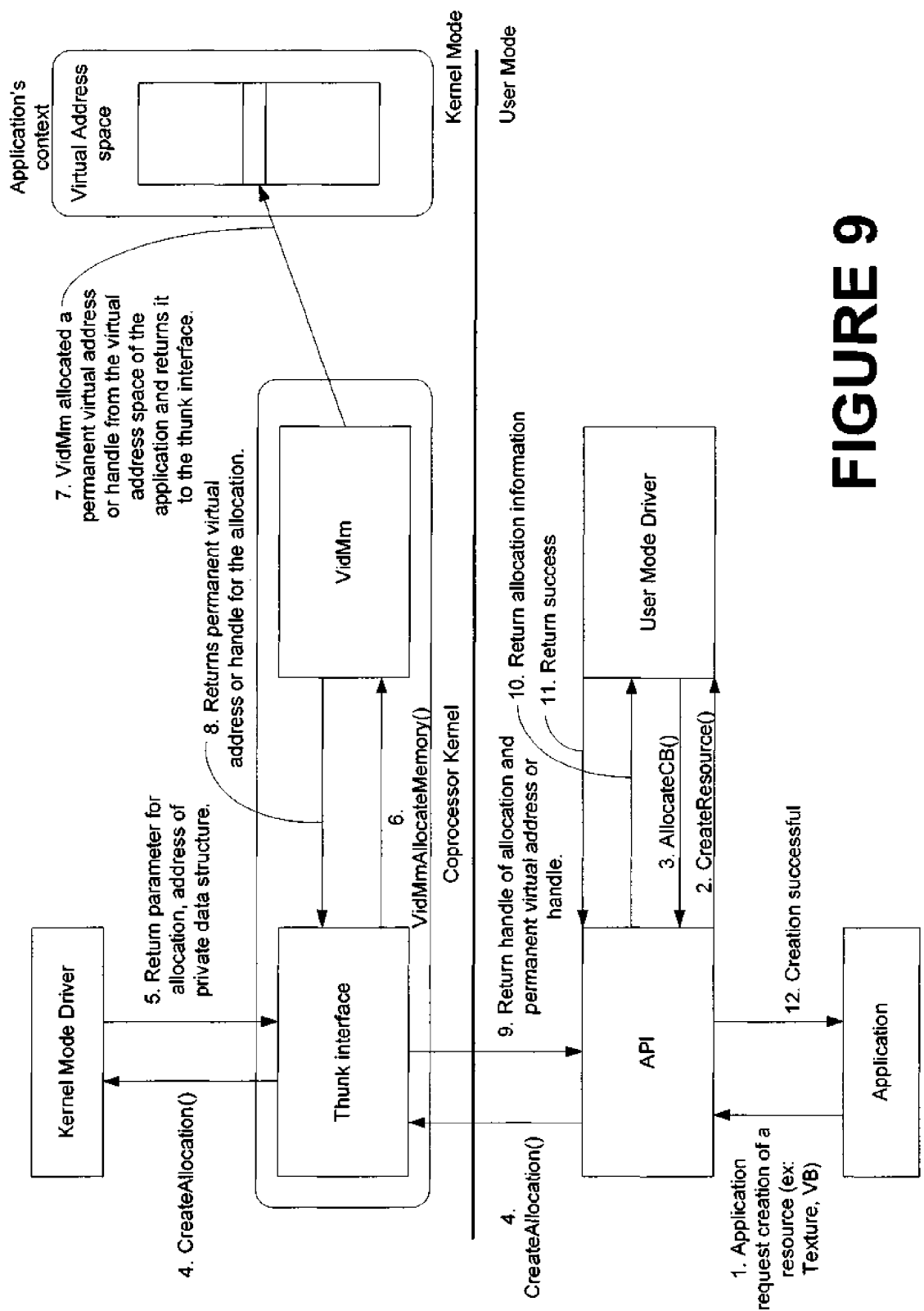
FIG. 9 illustrates a supplemental memory manager "VidMm" in kernel mode that can provide a virtual address space for coprocessor contexts, and can manage physical memory among various coprocessor contexts so they can get their fair share of memory.

In the advanced model, a supplemental memory manager, such as a video memory manager "VidMm" in kernel mode can provide a virtual address space for coprocessor contexts, and can manage the physical memory among the various coprocessor contexts so they can get their fair share of memory. Various embodiments of this improvement on the allocation scheme of the basic model is depicted in FIG. 9. FIG. 9 illustrates an embodiment of the invention using terminology that will be familiar to those skilled in the art because it corresponds to recognized concepts in the art. For example "VidMm" is a video memory manager, and "Thunk interface" is a thunk interface. Note, however, that while this terminology is used to more clearly explain the invention, it should not be taken as a manifestation of intent to limit the invention. Thus "VidMm" can be a memory manager for any supplemental memory, and "Thunk interface" can be any appropriate interface, etc.

In connection with FIG. 9, the advanced model allows the DMA buffers to be mapped directly into an address space of an application, which optionally makes them directly accessible by a user-mode driver. The user-mode driver batches the rendering primitives directly to the DMA buffer using the permanent virtual address or handle of each memory resource it needs to access (so no patching is required). The user-mode driver also builds a list of the memory resources the DMA buffer is using so the supplemental memory manager can bring those into supplemental memory before the DMA buffer is scheduled. If a malicious application modifies the resource list, the correct set of resources will not be properly paged-in. Note that this does not necessarily break the memory protection model because the range of the address space that isn't referencing valid memory can be required to either reference a dummy memory page or cause the hardware to fault and stop execution of the specified coprocessor context. In either case, a corrupt resource list need not result in a coprocessor context being able to access another context's memory.

In the advanced model, the user-mode driver submits a DMA buffer to the kernel-mode driver, which submits the DMA buffer to the scheduler. After asking the memory manager to page the resources in the resource list, the scheduler sends the DMA buffer to the hardware as is.

Scheduling in the Advanced Model

Scheduling in the advanced model is very similar to scheduling in the basic model. There is still a worker thread preparing a DMA buffer before the DMA buffer is submitted to a coprocessor. However the work that can be accomplished by the worker thread in the advanced model need only be limited to paging operation.

Figure 10:
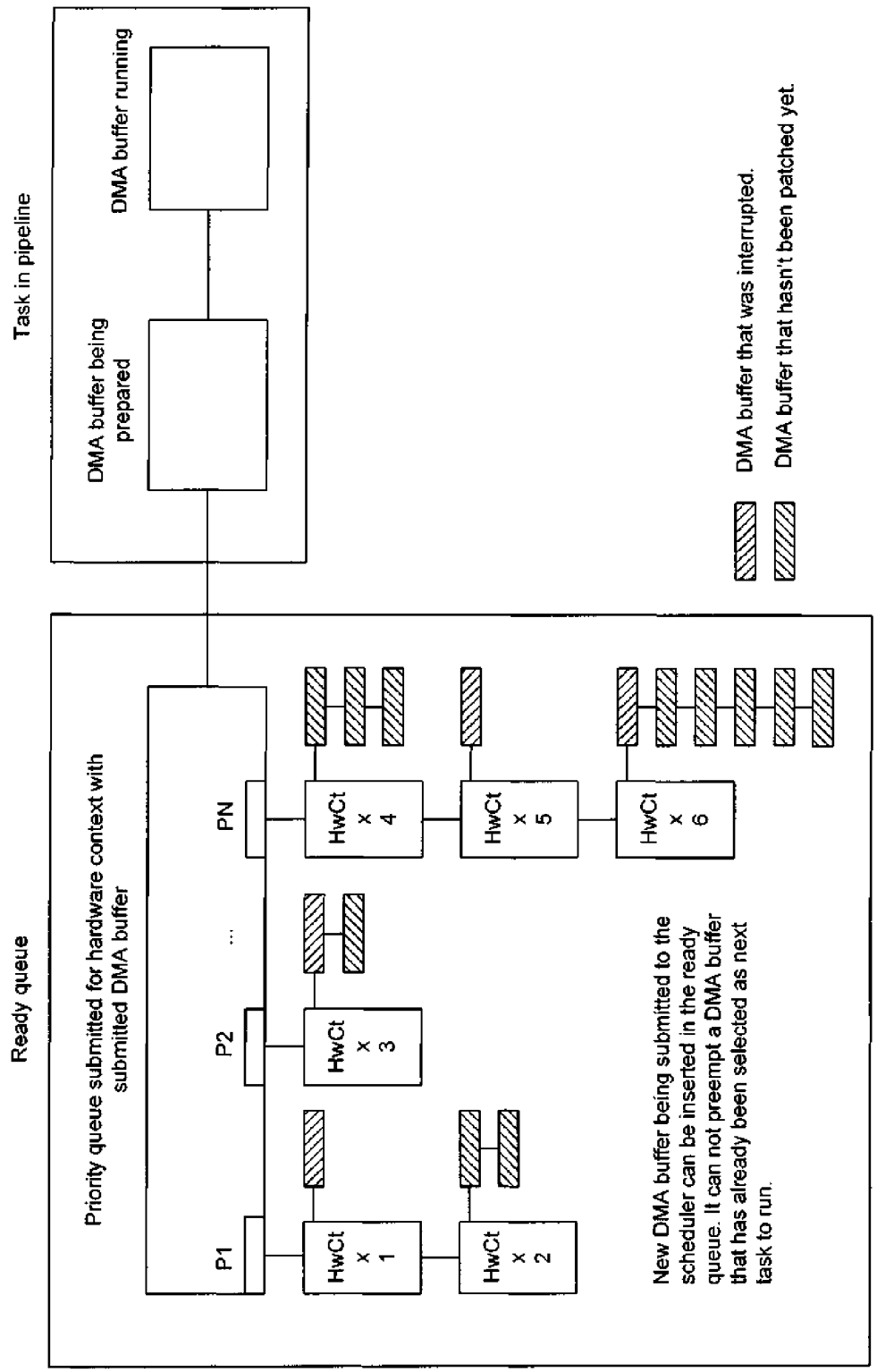
FIG. 10 illustrates a basic scheduling model in accordance with the present invention.
Figure 11:
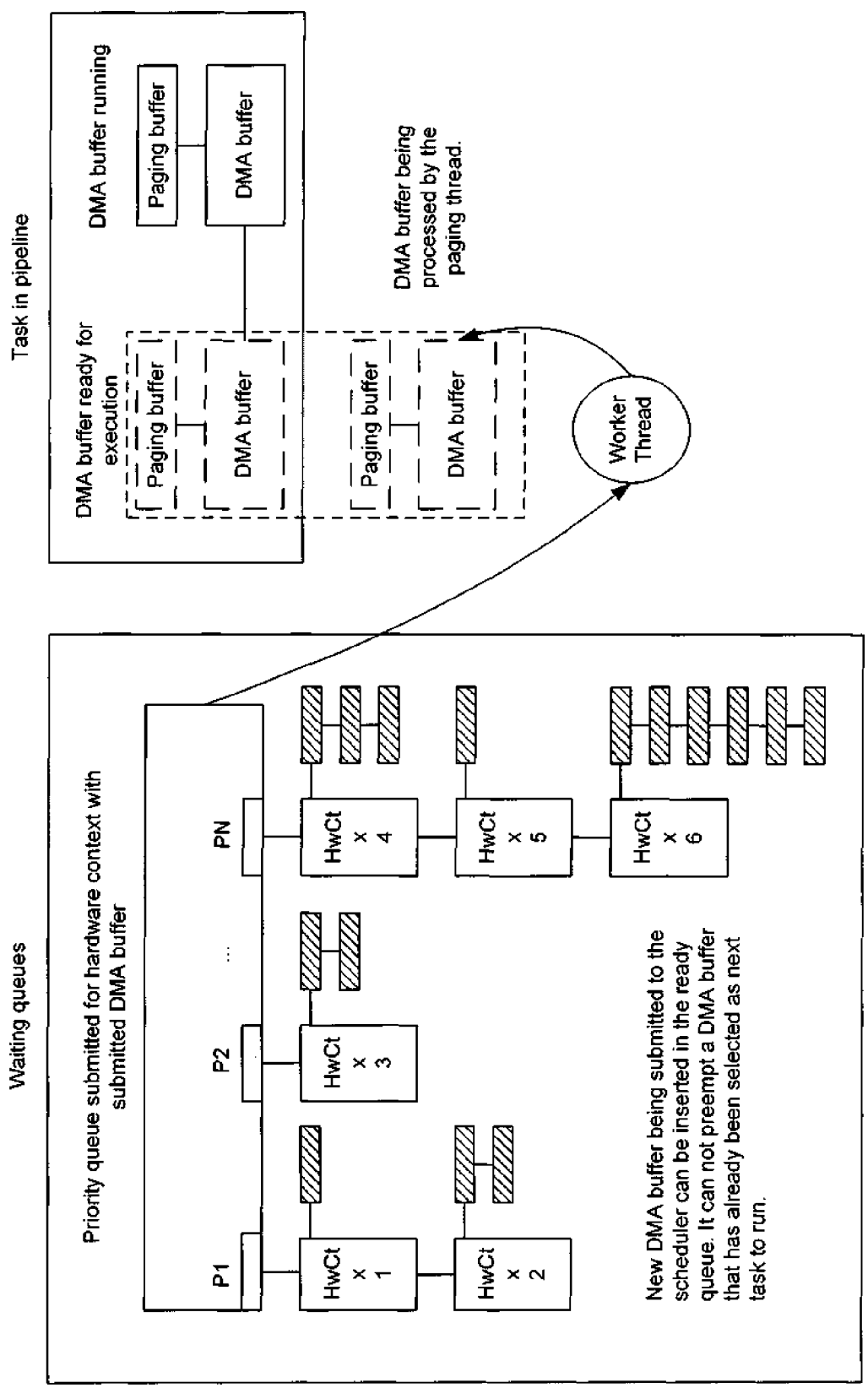
FIG. 11 illustrates an advanced scheduling model in accordance with the present invention.

Refer to FIG. 10 and FIG. 11 for embodiments of scheduling in the basic model and scheduling in the advanced model. As will become clear, the advanced model has two scheduling options. When scheduling without demand faulting, a preparation phase can be implemented. When the advanced model uses demand faulting, however, no preparation phase is necessary.

In addition, FIGS. 12(A), 12(B), and 12(C) provide a flowchart demonstrating pseudocode capable of implementing the advanced scheduling model.

Paging in the Advanced Model

Paging in the advanced model is different from paging in the basic model. In the advanced model, the address of an allocation being paged is already known, and the memory manager simply needs to make it valid. To make an allocation in the resource list valid, the memory manager needs to find a range of physical supplemental memory that is free and ask the driver to map the page table or handle to that range. If necessary, the range of physical memory can be required to be a contiguous set of pages.

If there isn't enough physical video memory available to make the allocation valid, a supplemental memory manager, here referred to as VidMm, could mark some currently valid allocation for eviction. When an allocation is evicted, its content is transferred to system memory (assuming it wasn't already in system memory), and then its virtual address or handle is made invalid.

Virtual Address Space

Any technique known in the art or developed in the future for providing virtual address space may be used in conjunction with the present invention. To demonstrate the ways in which such an address space can be used, two examples using common virtual address space techniques are provided herein. It should be understood that there are multiple ways to create a virtual address space for a coprocessor, and those skilled in the art will be able to extrapolate from the examples provided here. In this regard, virtual address space using a variable length flat page table and a multi-level page table is described herein.

Figure 13:
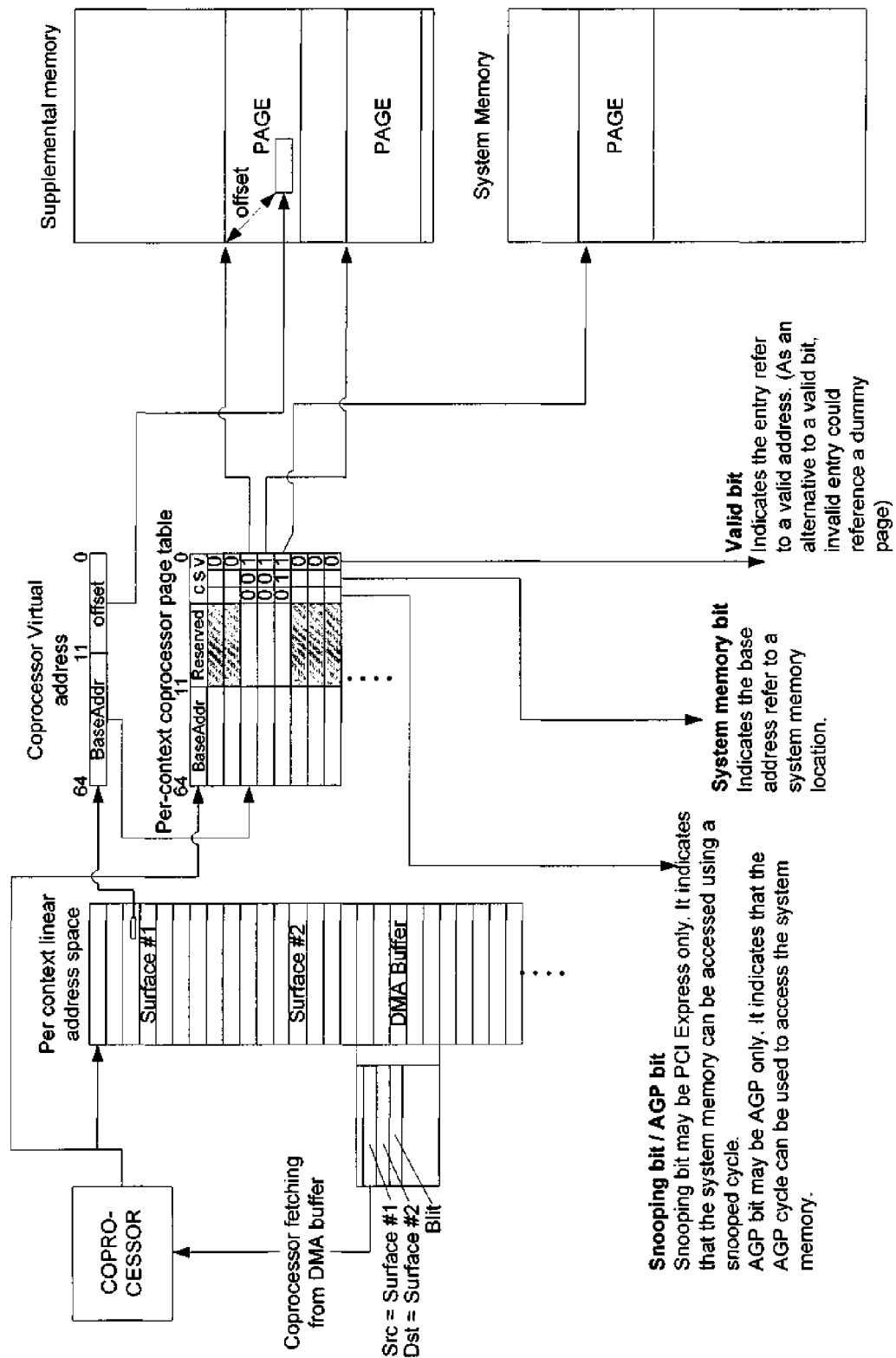
FIG. 13 illustrates the use of the present invention in conjunction with a variable length flat pate table.

The variable length flat page table. The use of the present invention in conjunction with a variable length flat pate table is illustrated in FIG. 13. In this method, the address space of the coprocessor is virtualized through the use of a flat page table. The virtual address space can be divided into pages of a predefined memory amount, for example 4 KB. For each page in the virtual address space, a page table is provided that contains identifiers, for example 64-bit entries, for specifying a physical address and location (e.g., Accelerated Graphics Port (AGP), Peripheral Component Interconnect (PCI), or Video) of associated physical memory. In one embodiment, the page size supported by the coprocessor is not arbitrary and must be 4 KB in order to allow the coprocessor page table to reference system memory pages. Furthermore in this embodiment, the coprocessor page table must be able to address both local video memory and system memory from the same address space. The coprocessor can require that all pages belonging to a single surface be mapped to a single type of memory. For example, the coprocessor can require that all pages belonging to a particular render target be mapped into local video memory. However, page table entries that map surfaces to a variety of physical memory types (AGP, local video, etc.) can coexist in the page table.

For PCI and AGP adapters, an exemplary embodiment of each page table entry can contain 32 bits, allowing a full 4 GB physical address space to be visible by the coprocessor. For an embodiment using a PCI-Express type adapter, the coprocessor may support a 64-bit addressing cycle. Each page table entry can contain 40 or more bits to address each terabyte of memory. An embodiment implementing a 64 bit system that makes use of more than 40 bits of physical address line on the mother board may experience a performance penalty if a corresponding video adapter is not capable of addressing the entire address space. Thus it is recommended to support the full 64 bits.

The flat page table method is similar to the virtualization mechanism that is currently available on INTEL® 8086 (x86) family CPUs, except that there is no page directory, only a huge page table.

Virtual addresses that are not associated with a valid allocation can be redirected to a dummy page to prevent a malicious DMA buffer from forcing the coprocessor to access memory it should not. The hardware can implement a valid bit in each of the page table entries that specifies whether the entry is valid.

The page table can be relocatable when an associated coprocessor context is not currently running on the coprocessor. When the context is not running, VidMm could evict the page table to system memory. When the context is ready to run again, the page table may be brought back to video memory, but at a potentially different location. The driver may be able to update the location of the page table in a saved coprocessor context.

In this embodiment, all memory access may occur through a coprocessor virtual address. However, it should not be implied that the invention requires such access. Certain elements may be accessed in other ways, and may even provide increased functionality if accessed in other ways. Some examples of items that may be left out of the virtual address scheme are:
1) The page table itself may be referenced through a physical address.
2) The Cathode Rat Tube (CRT) may be programmed to a physical address for a contiguous memory range.
3) Virtual Print Engine (VPE) can perform DMA directly to a physical address.
4) Overlay can read directly from a physical address.
5) The coprocessor context can be referenced through a physical address.
6) The primary ring buffer can be referenced through a physical address.

Note that during a context switch, a coprocessor can retranslate virtual address in use by the context being restored. This will ensure that memory resources are located in the proper place, instead of allowing the coprocessor to make a potentially false assumption that those addresses are referencing the same physical pages as before the context switch. Note also that in conjunction with various embodiments of the invention, it will be beneficial to allow multiple entries in a single page table or across multiple page tables to refer to the same physical pages.

In various embodiments, a coprocessor may implement a limit register giving the current size of a page table. Any memory reference past the end of the page table can be considered an invalid access by the coprocessor and treated as such. The page table can be expandable by powers of 2 and can support, in one embodiment, at least 2 GB of address space (2 MB of page table).

If the virtual address space associated with a coprocessor context becomes fragmented, an API, for example MICROSOFT® Direct3D runtime, can perform garbage collection to reduce the size of the address space and the associated page table. Allocations at high virtual addresses will be deleted and reallocated to lower addresses.

The advantages and disadvantages of implementing a virtual address space using a variable length flat page table in conjunction with the present invention should be apparent to those skilled in the art. To summarize, one advantage of using the flat page table is there is only one level of indirection to physical memory. Another advantage is that paging can be resolved with a discontinuous set of pages. There are disadvantages too, however. For example, an entire page table will generally need to be present in memory when the coprocessor is running. Also, a page table can consume a large amount of memory. A page table may be awkward to locate because it generally requires a contiguous set of pages in memory.

Figure 14:
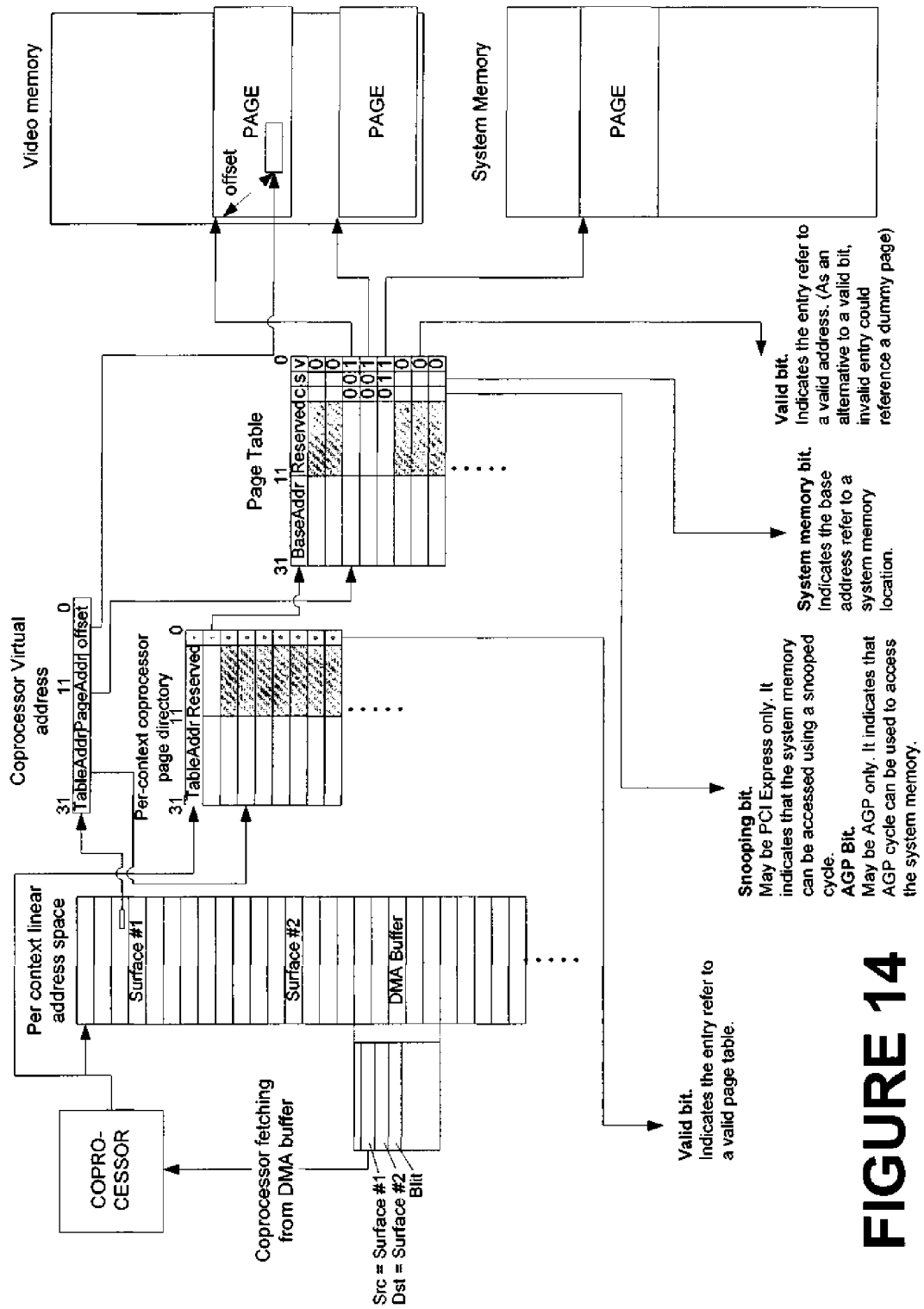
FIG. 14 illustrates the use of the present invention in conjunction with a multi-level page table.

The multi-level page table. The use of the present invention in conjunction with a multi-level page table is illustrated in FIG. 14. A multi-level page table may be generally similar to a variable length flat page table, however in a multi-level page table, the index part of the virtual address is broken up across multiple tables. For example, various embodiments may utilize a 32-bit address space. In this situation, the hardware may be required to have a two-level indirection. The first level of indirection is referred to as a page directory and the second level as a page table. When the coprocessor is running a particular context, only the page directory for that context and the page table needed by the allocations in the resource list need to be present in memory.

It will be appreciated that one of the advantages of providing a multiple level page table in conjunction with the present invention is paging can be resolved with a discontinuous set of pages. Also, an allocation can mix pages from system and local video memory, only the page directory and the page tables in use need to be present in memory, and the page directory and page table require only one page each (no multiple-page contiguous allocation is required). Despite these advantages, however, the disadvantage remains that access to memory requires two indirections.

Surface Level Faulting

With the addition of a per-coprocessor-context virtual address space, the advanced scheduling model works reasonably well and generally does not require much CPU overhead, especially when there is little or no memory pressure. Most of the time, when a DMA buffer can be submitted to a scheduler, the resources it references are already present in memory and thus the DMA buffer does not require any paging by the paging thread. However, in terms of scheduling, the model can be further improved by increasing the accuracy of time keeping.

One problem encountered in implementing the invention was that it may not be possible to know up front how long a particular DMA buffer will take to execute. This can result in a potentially bad choice by a scheduler for the next DMA buffer to prepare. If no other contexts are at the same or higher priority as a current context, or if all other contexts at that priority are empty, the scheduler may pick the next DMA buffer from the current context. Otherwise, the scheduler may pick the next DMA buffer from the next context that has same or higher priority as the current context. However that choice isn't guaranteed to be accurate. When choosing a DMA buffer from the next highest priority context, the scheduler can assume that the DMA buffer for the current context will run for longer than one quantum. If that is not the case, then the scheduler may switch away from that hardware context too soon. In the case where the current DMA buffer runs for less than one quantum, the scheduler should have chosen the next DMA buffer from the current context (because this would have maximized efficient use of the coprocessor).

When there is little or no memory pressure, in general both potential candidates for the next DMA buffer already may have all their resources present in memory, so it is likely that neither buffer requires paging. In that scenario, the scheduler can realize its mistake when the quantum of the first DMA buffer ends, change its mind immediately, and give the correct DMA buffer to the coprocessor.

However, under memory pressure, the model may become less stable. The "sizing" of a next DMA buffer may become an advantageous step in ensuring smooth operation. Under memory pressure, chances are that in the previously described scenario, one of the two potential candidates for the next DMA buffer required some paging and therefore was sent to the preparation thread. In that case, it would not generally be advisable for the scheduler to "change its mind" at the last minute and swap the two DMA buffers. Note however that such a change can be made, and such a practice does not fall outside the description of this invention. For example, in the scenario where the preparation of the next DMA buffer is completed and the other potential DMA buffer candidate does not require paging, a DMA buffer could be swapped. This may imply some special support for shareable allocation by a supplemental memory manager.

The potential time keeping error described above, by itself isn't very bad and can be worked around by giving a context the processing time it missed during a subsequent quantum. Also, in most cases, a DMA buffer contains enough commands to run for multiple coprocessor quanta, so each context can get its full quantum. However, under memory pressure, a supplemental memory manager may be forced to split DMA buffers (as described above) into smaller buffers, to reduce the working set of each context. Such splitting of DMA buffers reduces the size of DMA buffers and correspondingly increases the quantization problem described above.

Another problem that may arise under memory pressure is that the model can artificially create extra pressure because there is potentially more memory getting paged in than is actually used by the DMA buffer. All that extra memory that was paged in will potentially get evicted before the next quantum and will need to be paged in again. This can lead to increased paging activity when paging activity is already high. In the basic and advanced models, the supplemental memory manager can address the problem of increased paging by choosing an appropriate eviction policy. For example, under mild memory pressure, each context may be likely to have a reasonable amount of memory in its working set. Before evicting memory from other contexts, the supplemental memory manager may attempt to evict memory from a current context first, and split its DMA buffer to make it fit in the available working set. Once the DMA buffer of a particular context is split to its minimal size, the supplemental memory manager may be left no choice but to evict memory from another context.

One preferred approach to solve these issues is to allow demand faulting of memory needed by a coprocessor. That way we could ensure that only the subset of memory needed by the coprocessor is present in memory.

The level of faulting proposed for the advanced model is at a surface granularity. However, it should be understood that any level of faulting may be appropriate for use in conjunction with the present invention. Also, note that in the case of page table hardware, the hardware could only look at the state of the first page of an allocation to determine if an allocation is valid since the supplemental memory manager could bring an entire allocation at once in memory.

In various embodiments, hardware could generate a page fault when either:

1) A context switch occurs to a context that is referencing an invalid ring buffer or DMA buffer.

2) A primitive is about to be drawn and some of the required memory resources aren't present (for example vertex shader code, vertex buffer, texture).

Note that in the second situation, hardware may be required to resample its current memory resources before rendering every triangle. It would be possible for the supplemental memory manager to invalidate a virtual address or a handle at any time, including when the coprocessor is running. It is also expected that the hardware may allow a query of all the memory resources it is currently using. The supplemental memory manager may use that information to determine when a particular allocation might be in use by the hardware. The supplemental memory manager may assume that if an allocation doesn't appear in the list of resources currently in use by the coprocessor, after having its virtual address or handle invalidated, then it is safe to evict that allocation because the coprocessor cannot access that allocation. Attempts to do so could cause a page fault.

Further explanation of the use of surface level faulting in connection with the present invention is provided by the following more detailed explanation of a surface level faulting model. The following model is an example of some embodiments, and should not be construed as a limitation on the potential uses of the invention or of the concept of surface level faulting in conjunction with other applications outside the context of the scheduling model provided herein.

First, an allocation scheme for memory resources could be the same as described in the per-coprocessor context virtual address space section of this document. See that section for details.

Second, the rendering command scheme for the DMA buffer and resource list is also the same as explained in the per-coprocessor context virtual address space section of this document. In this model, the resource list is still required, even if the graphics hardware supports surface-level faulting. The supplemental memory manager (here, "VidMm") uses the resource list to acquire usage information about memory allocations. That usage information allows VidMm to determine candidates for eviction when it needs to make room in memory.

With the addition of surface level faulting, there is no security concern regarding the resource list, so it can be built in user mode. If a malicious application puts invalid data in the resource list, the worst that could happen is that the performance of the malicious application will suffer. VidMm could make an illogical choice about candidates for eviction, which would result in extra paging activity for that application.

The scheduling model with demand faulting of surfaces may be different in many respects from models not employing surface level faulting. In general, processes in the ready list may be submitted directly to the coprocessor, no preparation phase is needed. The scheduler can maintain a dedicated list and a paging thread for contexts requiring that a page fault be resolved. There is a VidMm-specific coprocessor context used for paging operations. Finally, DMA buffers submitted to a context are concatenated to form a single work item.

In this model, the preparation phase may be eliminated. The scheduler can ask the coprocessor to switch from one context to another directly, and it may be assumed that all contexts are ready for execution at any time. If a context being switched to doesn't have all of its memory resources present in memory, the hardware can fault, and the context will get added to a list (such as an inpage list, see FIG. 15) so the paging thread can start working on resolving the fault.

Figure 15:
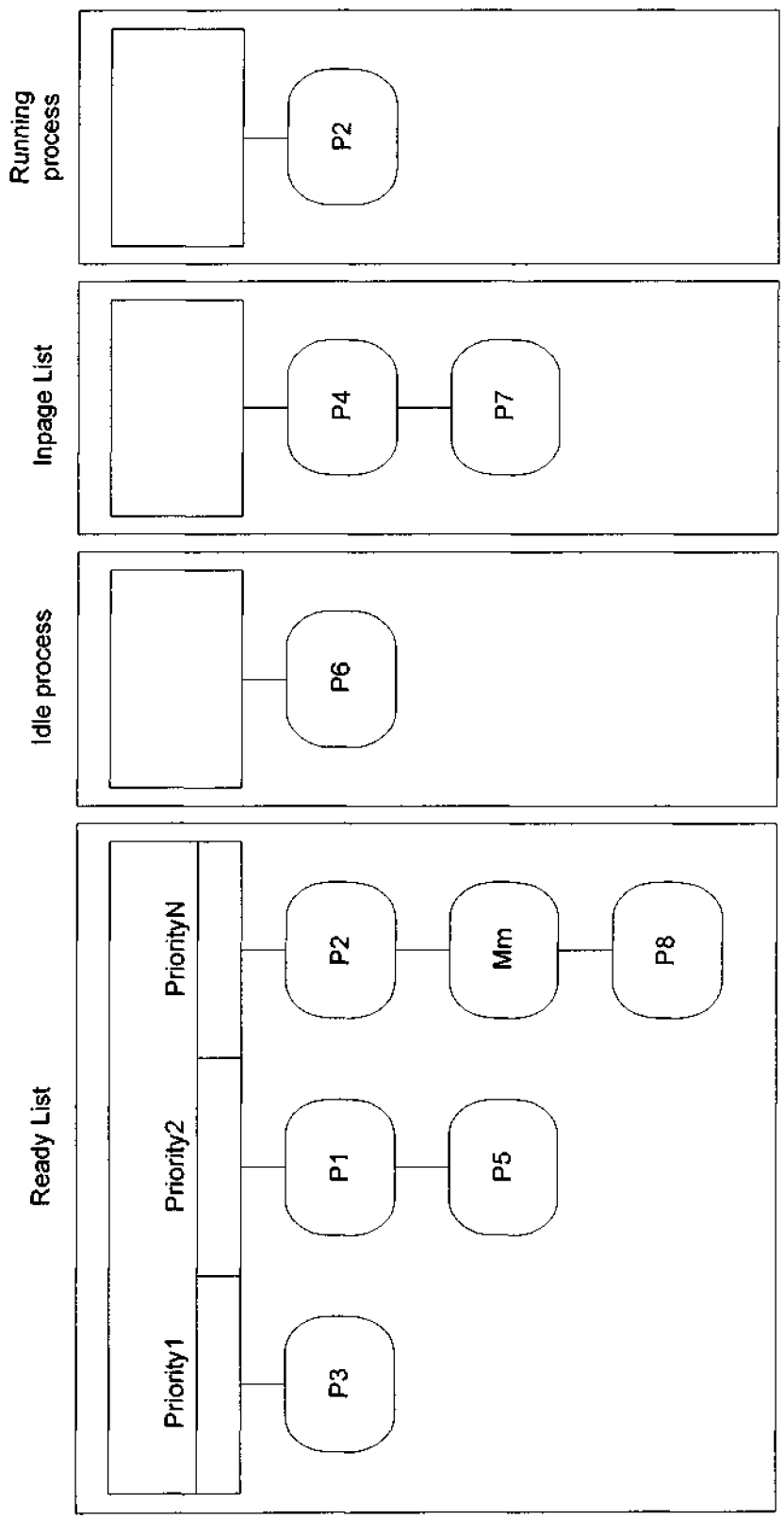
FIG. 15 is an illustration of exemplary processes maintained by the scheduler in connection with an advanced scheduling model that supports surface-level faulting.

A list of exemplary processes maintained by the scheduler in connection with this model is illustrated in FIG. 15. Referring to FIG. 15, when a fault occurs, the context causing the fault can be added to the inpage list. A paging thread may then resolve the fault. The paging thread can chose the highest priority context that faulted to resolve first. A periodic priority boost may be employed to ensure that low priority contexts will eventually get a high enough priority to have their faults resolved. While faults are being resolved by the inpage worker thread, the scheduler may schedule more contexts that are ready for execution on the coprocessor. While the coprocessor is working, the inpage worker thread can manipulate video memory by calling the driver to map or unmap allocations from addresses.

It is possible that allocations currently in use by the coprocessor will get invalidated. The next time the coprocessor tries to access such an allocation, it should fault. However, since the coprocessor is not able to fault immediately at an arbitrary time (for example some coprocessors will only resample the state of the current allocations between triangles), there is the potential that the coprocessor will need to use an allocation for some time after it has been made invalid.

To prevent that from happening, VidMm may ensure that the memory for the allocation will remain valid until the next context switch, even though its virtual address or handle has been invalidated. This can be accomplished by having memory transfers due to paging done in a VidMm-dedicated coprocessor context. Since the memory transfer is done in a separate context, we can be sure that there will be a context switch before the content of the memory is changed. For a virtual address or handle that references system memory, there is no memory transfer during eviction. In that case VidMm may ensure that the system memory stays valid by keeping it pinned down until the coprocessor context switches to VidMm's dedicated context.

The VidMm-dedicated coprocessor context is a regular coprocessor context that is used by VidMm to do the memory transfer between system memory and video memory. The VidMm context is a variable-priority context that takes the priority of the highest priority item in the inpage list. Having all the paging operations serialized in a single context simplifies the synchronization model for VidMm.

Another interesting difference in this model is the way all the DMA buffers submitted for a particular context can be concatenated to form a single task. In the previous models, each DMA buffer formed a work item and each context would maintain a list of those work items. The scheduler would not necessarily schedule the context; it would schedule (and initiate preparation for) a particular work item associated with a context. Before that work item had a chance to complete, the scheduler would have to choose the next work item. Each work item had to be prepared before it could be submitted, so the scheduler had to know up front what the next work item should be, which is not always possible.

With surface level faulting, DMA buffers do not require preparation. Because of this, the scheduler need not see a context as a collection of work items. Instead, the scheduler really schedules contexts, and once a context gets control of the coprocessor, it can retain control of the coprocessor. Some events may be allowed to halt context control of the processor, for example:

1) The coprocessor finishes all commands that have currently been queued
2) The coprocessor generates a page fault caused by an invalid memory access
3) The scheduler requests a switch to a different context
4) The coprocessor generates an invalid operation interrupt following an invalid command in the DMA stream.

FIG. 16 provides a diagram that illustrates various embodiments of the invention in accordance with the above. Referring to FIG. 16, the two sides represent the progression, in the same hardware environment, from the insertion of a first context to the insertion of a second context. On the left hand side, the scheduler asks the kernel driver to insert a particular DMA buffer to the ring of coprocessor context #1. The ring is modified by the driver and the tail of the coprocessor is updated to reference the new location. The insertion of the DMA buffer in coprocessor context #1 occurs under the protection of a coprocessor context #1 specific lock. Thus other threads can insert DMA buffers into the ring of other coprocessor contexts.

On the right hand side, the scheduler asks the kernel mode driver to insert a particular DMA buffer to the ring of coprocessor context #2. However, the ring is already full, thus thread B will be blocked until some room is freed in the ring. Note that the fact of thread B waiting does not block thread A from inserting a new DMA buffer in its own ring.

In this model, each context has its own DMA ring that can contain redirections to portions of DMA buffers to execute. At submission time, the scheduler may try to add the submitted DMA buffer to the ring of that context. If the ring is already full, the scheduler can wait until there is enough space in the ring for another submission. Note that this wait will only block further submissions to the particular context being submitted to. It will not block submissions to other contexts. In other words, multiple threads can be adding work items to their own contexts in parallel.

Since new DMA buffer can be added to the queue of a running context, the coprocessor may resample the queue's tail before generating an interrupt to report that a context is empty. Of course, it is possible that a DMA buffer be added to the queue immediately after the coprocessor sampled its queue. However, sampling the queue's tail just before generating the interrupt reduces the probably of this happening and increases the accuracy of the scheduling. When the scheduler is notified that a context is empty, it will query the driver to see if that is really the case or not. It should be possible for the driver to access a saved coprocessor context in order to determine if there is currently a queued command in it that has not been processed. FIG. 17 provides a pseudocode algorithm describing this model.

As will be detailed later, the concept of limited versus privileged DMA buffers is introduced to allow DMA buffers to be built directly in user mode without compromising system security, while allowing the kernel-mode driver to build DMA buffers containing privileged commands.

The various embodiments represented by this model may be used in conjunction with a concept of limited versus privileged memory that will be described in later sections of this document. For now, note that a problem can arise in this model because, in the memory virtualization model presented previously, no distinction is made between memory that can be accessed by a limited DMA buffer versus a privileged DMA buffer; all virtual memory is accessible. This means that some memory resources, like a page table or a ring buffer, may not be appropriately visible through the coprocessor virtual address space because that would allow a malicious application to write over the page table or the ring buffer. Because of this, the hardware can be designed to support physical addressing for some types of resources and virtual addressing for other types of resources.

A different approach to the problem is to add the concept of privileged memory. In various embodiments, privileged memory can only be accessed from a privileged DMA buffer, and the coprocessor can cause a page fault if a limited DMA buffer tries to access a privileged memory location. A privileged DMA buffer, on the other hand, can access both privileged memory and non-privileged memory indiscriminately. In order to support privileged memory, the hardware must have a mechanism to specify on a per-handle basis (in the case of handle-based virtualization) or per-page basis (in the case of page-table based virtualization) whether the memory is privileged.

Note that in order to support privileged memory, a coprocessor supporting surface level faulting with a page table can no longer fault only on the base address of a memory resource. The coprocessor must look at all the page table entries covered by the current resource and make sure all of them have the correct protection bit set. Inspecting only the first page of a memory resource would potentially allow a malicious application access to privileged memory following the limited memory base address it specified in the limited DMA buffer.

The Run List

The demand faulting model presented previously can make heavy use of interrupts to signal multiple events. Some of these events, like page faults, can occur at high frequency under memory pressure. Between the time an interrupt is hit and the time the coprocessor is given a new task by the CPU, the coprocessor could be starving. In order to hide the interrupt latency and keep the coprocessor busy, we introduce the concept of a run list.

A run list is simply a list of coprocessor contexts that can be run by the coprocessor without CPU intervention. The contexts may be run in the order given or in any other order that proves convenient for those practicing the present invention. The coprocessor can switch from one context to the next on the run list for any of a wide variety of reasons that can be implemented in conjunction with the invention, for example:

1) The current context is empty, i.e., doesn't have anything left to do.

2) The current context generated a page fault.

3) The current context generated a general protection fault (if supported by coprocessor)

4) The coprocessor was asked to switch to a new Run List

In various embodiments, when the coprocessor switches from one item in the run list to the next, it interrupts the CPU, but does not stall and can context switch to the next item in the list and start executing it. The head of the run list may be the context the scheduler can attempt to run first, and the other elements of the run list may be there in part to keep the coprocessor busy during interrupt latency. As soon as the CPU receives the interrupt signaling that the coprocessor switched away from the head of the list, the CPU can build a new run list and send it to the coprocessor.

When the coprocessor switches away from the head of the list, it may start executing the next context in the run list while the interrupt it generated makes its way to the CPU. The head of the new run list the CPU will generate might be different than the context the coprocessor just switched to. In that case the coprocessor will need to switch again and may not have time to do much useful work on that context.

However, the head context of the new run list built by the CPU can be the same context as the second element of the previous run list because context priority will not have changed since the last run list was built. In that case, the coprocessor will already have started processing the correct context ahead of time.

A diagram representing the concept of the run list is provided in FIG. 18. When a run list is included in various embodiments of the invention, the scheduler's running context can be replaced by a current run list. A second run list, called a pending run list, is introduced to simplify synchronization of run list switching. The current run list is a list of contexts that the scheduler can assume the hardware is currently executing, while the pending run list is a transitive run list used when the scheduler wants to change the hardware from one run list to another. When the scheduler wants to change to a new run list, it builds a pending run list and asks the coprocessor to switch to it. Once the scheduler receives confirmation from the coprocessor (through an interrupt) that the coprocessor has started executing the new run list, the pending run list becomes the new current run list, and the pending run list can be emptied.

When the pending run list is empty, the hardware may be running a context in the current run list or it may be idle. When the pending run list is not empty, the scheduler may not know which run list the hardware is currently executing until it receives confirmation from the coprocessor that the transition occurred.

Certain events may require the scheduler to reprioritize the run list. For example, a page fault might have been resolved making a high priority coprocessor context ready for execution. To simplify the synchronization of such an event, the general rule that may be followed by the scheduler is that it will submit a new run list (pending run list) only if there is not already a pending run list submitted by a previous event. Trying to replace one pending list with another may be hard to synchronize, since the list has already been given to the coprocessor, thus the transition can occur at any time, and the scheduler will be notified only after the fact.

In the latter case, the reprioritization of the run list can be delegated to the context switch handler. At some point in the future, the handler can then be called to signal the transition from the pending list to the running list, and at that time the handler can generate a new run list to send to the hardware if the priorities have changed.

Run List Switching Synchronization.

In one run list model, the graphics hardware can generate an interrupt when it switches contexts. Since interrupt delivery and processing is not instantaneous, it is possible that multiple interrupts could be generated before the CPU actually gets interrupted. If synchronization is not done properly, the scheduler could get confused and make an incorrect scheduling decision.

Two critical events the scheduler may be directed to distinguish are, first, when the coprocessor switches away from the head of a run list and, second, when the coprocessor changes to the pending run list. Differentiating between those events may be difficult with only the information from a simple interrupt at each context switch. To further illustrate this point, consider the following example: The coprocessor is currently running run list A, which is composed of contexts 1-3-5-2, and the scheduler wants to change to run list B, which is composed of contexts 4-1-3-2.

The following two scenarios may occur:

Scenario #1

The coprocessor is currently executing run list A (1-3-5-2).

Commands are submitted regarding context 4, which was idle and is higher priority than context 1. Run list B (4-1-3-2) is generated and the scheduler submits run list B to the coprocessor.

Context #1 runs until the coprocessor transitions to context #4 from run list B.

The coprocessor generates an interrupt signaling the transition.

The coprocessor transitions from context #4 to #1, then #3 before the CPU is interrupted.

The CPU is interrupted, and the context switch handler is called.

A driver samples the current coprocessor context, it is #3.

Scenario #2

The coprocessor is currently executing run list A (1-3-5-2).

Commands are submitted regarding context 4, which was idle and has higher priority than context 1. The scheduler submit run list B to the coprocessor.

While the scheduler was busy building run list B, the coprocessor transitioned to context #3.

The coprocessor generates an interrupt signaling the transition to context #3.

The CPU is interrupted, and the context switch handler is called.

A driver samples the current coprocessor context, it's #3.

In both cases, the currently running context at the time of the context switch interrupt is #3. Note, however, that the scheduler cannot, without additional information, distinguish between the two scenarios. In the first scenario, the coprocessor switched away from the head of run list B, and thus the scheduler needed to generate run list C and ask the coprocessor to change to it. However, in the second scenario the second run list wasn't even started yet and thus the scheduler should simply wait.

The above example shows that a context switch interrupt alone may not be enough to properly support a run list in a scheduling model. Some more information is needed to differentiate between the scenarios. The next sections details some ways this problem can be addressed along with hardware support that can be useful in addressing such problems.

Two-Element Run List.

This synchronization approach requires the coprocessor to support some additional features. Among the features that can be supported in conjunction with implementation of a two element run list are the following:

1) A run list of two elements.
2) Ability to generate an interrupt at each context switch (including a fake context switch from context X to X).
3) A way for VidMm to query the currently running coprocessor context at any time.
4) Saving outgoing coprocessor contexts to memory before interrupting.
5) Saving coprocessor contexts in a way that contexts are readable by the CPU to allow the scheduler to determine the reason behind context switches.

Note that while hardware may be used to support the above functions, such special hardware is not necessary to allow the scheduler to differentiate between a regular context switch and a run list switch. Instead, the scheduler may differentiate between those two events by always respecting a set of simple rules when constructing a run list. While the particular rules may vary for various embodiments of the invention, exemplary rules that provide this function are, one, that a first context of a current run list cannot appear in a new pending run list, and two, if a second context of a current run list is not the head of a new pending run list, it must not be in the new pending run list at all. Below is a table of the assumptions that a scheduler may make during transitions from one context to another when these two exemplary rules are followed. In the table below, a run list A is composed of contexts 1-2; a second run list B is composed of contexts 2-3; and a third run list C is composed of contexts 3-4.

| Transition from A to B Current context # when CPU is interrupted | Meaning/Action to take |
|---|---|
| 1 | Glitch, ignore the interrupt. This glitch was caused by a previous switch of run list (X, 1) to (1*, Y) where we incorrectly interpreted the X to 1 transition as a run list switch. The real transition was X to 1, then 1 to 1*. The current interrupt is for the transition 1 to 1* and can be ignored (coprocessor is required to generate this interrupt so transition from 1 – X to 1 – Y can be detected by the scheduler). |
| 2 | Run list switch occurred. This is not always true and may lead to the previous glitch. If the current transition is really 1*-2*, then the CPU will be interrupted again for a transition 2*-2** or 2*-3**. The pending run list (B) becomes the current run list, and the pending run list is emptied. The scheduler needs to handle the context switch away from context 1* (ex: page fault). |
| 3 | Run list switch occurred, and head of second list is already completed. Run list B is over. The pending run list (B) becomes the current run list. A new pending run list is built by the scheduler and sent to the coprocessor. The scheduler needs to handle the context switch away from context 1* and 2** (ex: page fault). |

| Transition from A to C Current context # when CPU is interrupted. | Meaning/Action to take |
|---|---|
| 1 | Glitch, ignore the interrupt. This glitch was caused by a previous switch of run list (X, 1) to (1*, Y) where we incorrectly interpreted the X to 1 transition as a run list switch. The real transition was X to 1, then 1 to 1*. The current interrupt is for the transition 1 to 1* and can be ignored (coprocessor is required to generate this interrupt so transition from 1 – X to 1 – Y can be detected by the scheduler). |
| 2 | Context switch in the current run list. coprocessor switch to context 2*. The scheduler needs to handle the context switch away from 1* (ex: page fault), but otherwise has nothing to do regarding run list. |
| 3 | Run list switch occurred. The pending run list (C) becomes the current run list, and the pending run list is emptied. The scheduler needs to handle the context switch away from 1* (ex: page fault). It is unknown whether context 2* was ever executed, it will be rescheduled. |
| 4 | Run list switch occurred, and head of second list is already completed. Run list C is over. The pending run list (C) becomes the current run list (hardware is idle though). A new pending run list is built by the scheduler and sent to the coprocessor. It is unknown whether context 2* was ever executed, it will be rescheduled. |

This method of implementing a run list is probably the simplest and does not necessarily require significant additional hardware support. However note that the run lists in the above table are limited in size (extending beyond a size of two may become impractical), and some information, not critical, can get lost during the context switch. For example, the scheduler may not always know in the transition from A to C whether context #2 was ever executed. It could have been executed, caused a page fault, but had its interrupt hidden by another context switch. In that case the scheduler would not know that it ever generated the fault and would reschedule it The Coprocessor Trace of Scheduling Events.

The run list can easily be expanded to a size N when the hardware provides some history information of scheduling events to the scheduler. One problem with a simple interrupt is that multiple interrupts can be squeezed together, and it might not be possible to determine exactly what happened to cause an interrupt. This can be addressed, in conjunction with the methods of this invention, by hardware features. By implementing hardware that can write a context switch history to a specified system memory location readable by the scheduler. To explain this aspect of the invention, consider the following scenario:

1) The scheduler schedules run list A (1-2-3-4-5).
2) A time quantum expires for context #1, and the scheduler sends a new run list B (2-3-4-5-1).
3) While processing the quantum expiration on the CPU, the coprocessor finished with context #1 because it became empty and therefore transitioned to context #2. The coprocessor generated a context switch interrupt for this event.
4) The coprocessor received the notification from the CPU about the new run list, and therefore transitioned to it. The coprocessor generated a context switch interrupt for this event.
5) While processing rendering commands in context #2 of the new run list, the coprocessor encountered a page fault and therefore switched to context #3. The coprocessor generated a context switch interrupt for this event.
6) Context #3 hit a page fault right away and therefore the coprocessor switched to context #4. The coprocessor generated a context switch interrupt for this event.
7) The CPU is finally interrupted for a context switch. Four context switches have actually happened since the original interrupt was raised.

Figure 19:
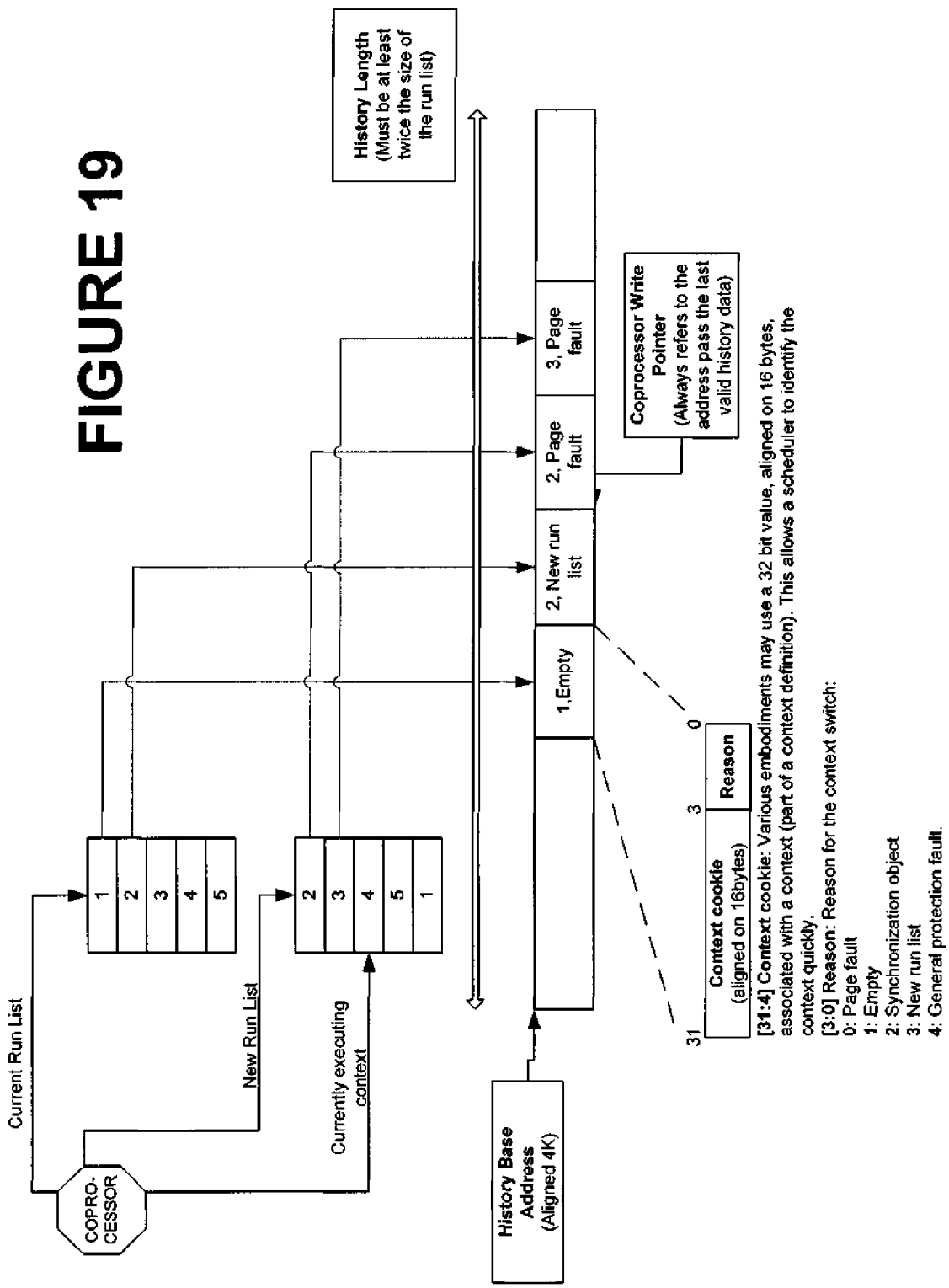
FIG. 19 illustrates the operation of hardware that can write a context switch history to a specified system memory location readable by the scheduler for use in conjunction with the present invention.

FIG. 19 illustrates the operation of a hardware history mechanism in the above scenario. In order to support such history mechanism, the hardware can be configured to be able to do carry out the following tasks. These tasks are provided by way of example but not limitation:

1) Specify a base address for the history buffer. There may a single history buffer per coprocessor. In a preferred embodiment, this could be a system memory location in either PCI or AGP memory. This could be aligned on a 4 KB boundary by the operating system. For a PCI express system, access to this buffer may preferably be implemented with a snoop cycle so the system memory buffer can be cacheable for more efficient CPU reads.
2) Specify the size of the history buffer. The history buffer may be at least twice as long as the size of a run list. This is to insure there is enough space in the buffer to handle the worst case scenario where both the current run list and the pending run list get completed before the interrupt occurs.
3) Specify a coprocessor write pointer, which may be an address immediately past the last event that was written to the history buffer. VidMm may be able to query this pointer at all times, including when the coprocessor is running. The data in the history buffer can be properly flushed to memory before the pointer is updated to insure that the scheduler always gets coherent data.

Various embodiments may configure the history buffer so it is not visible to DMA buffers, which are built in user mode. If the history buffer was visible to a limited DMA buffer, a malicious application could write over the history buffer, breaking the scheduler and possibly resulting in a system crash or worse. Because of this, the history buffer in these embodiments can either be referenced by the hardware through a physical address or through a virtual address that is only visible in a privileged DMA buffer. In these embodiments, the coprocessor may be required to wrap around the end of the history buffer without CPU intervention.

Note that run lists in accordance with the embodiments described immediately do not eliminate all need for the coprocessor to be able to fault multiple times on the same context for the same reason. One reason for this is that the scheduler generally builds a new run list while the coprocessor is busy executing a current run list. Since the scheduler may need to include some contexts in the new run list that are already present in the previous run list, it's possible that the state of the context being repeated could change between the time it was put in the run list being constructed and the time the run list is submitted to the coprocessor.

Limited vs. Privileged DMA

With the introduction of memory protection in the advanced scheduling model, DMA buffers sent to the coprocessor may be mostly built by the user-mode driver inside the process of the running application. Those DMA buffers may be mapped in the process of the application, the user-mode driver can write directly to them, and the kernel driver cannot be validating them. DMA buffers might be scribbled on by an application accidentally accessing their virtual addresses or on purpose by a malicious application. In order to allow the driver model to remain secure, i.e., not allow an application to have access to resources it shouldn't have, DMA buffers built in user mode can be limited in what they are allowed to do. In particular, DMA buffers built in can have limited functionality in the following exemplary ways:

1) They can contain only references to virtual address, no reference to physical address at all (including fences).
2) They can not be allowed to contain instructions that would affect the current display (for example CRT, Discretionary Access Control (DAC), Technical Document Management System (TDMS), Television-Out Port (TV-OUT), Internet2 (I2C) bus).
3) They can not contain instructions that would affect the adapter in general (for example Phase-Locked Loop (PLL).
4) They can have limited power management and/or config space.
5) They can not be allowed to contain instructions that will prevent context switching.

The exact set of registers that can be programmed in a DMA buffer built in user mode will likely vary from hardware to hardware. However, regardless of hardware, registers may follow a general rule, namely that such a DMA buffer should only allow rendering operations using virtual address references to resources and fences. To provide enhanced security, such DMA buffers can be required to not allow an application to use memory the application shouldn't have access to, or that could affect the hardware in some potentially catastrophic and non-recoverable way.

In order to prevent DMA buffers built in user mode from accessing certain functionality, multiple approaches can be implemented in the coprocessor. The approaches can vary depending on the nature of the functionality and whether the functionality needs to be queued in an application's coprocessor context stream. Certain privileged operations generally need to be queued in a coprocessor context stream that contains both DMA buffers built in user mode (for example application rendering) and privileged DMA buffers built in kernel mode (for example queued flip).

Functionality that doesn't need to be queued.

Most of the privileged functionality doesn't need to be queued in an application coprocessor context stream. Functionality such as the following does not need to be queued:

1) Programming CRT timing.
2) Updating the lookup table for the DAC (note that Programming the DAC LUT isn't absolutely required to be a privileged functionality since any application can render to the primary screen if it wants to anyway, and reprogramming the Look-Up Table (LUT) will not allow an application to give a user access to information it wouldn't otherwise already have access to.
3) Programming display output (TDMS, TV-OUT, ... )
4) Communicating with child devices/monitors (I2C, ... )
5) Programming clock (PLL)
6) Changing the power state of the coprocessor
7) Configuring the coprocessor (config space, bios, ... )

This functionality is usually needed following a system event that is completely independent of an application rendering stream. (for example boot, resolution changes, pnp detects, power management). As such, this functionality doesn't need to be queued in a particular application's coprocessor context. This functionality can be used by the kernel-mode driver itself when the specific system event is occurring without any intervention from the user-mode driver.

For such functionality, the IHV can decide to make all the underlying registers accessible through Memory-Mapped Input-Output (MMIO) only. Since registers are generally mapped only into kernel space, it may not be possible for an application or the user-mode driver to access them, and therefore the functionality is effectively protected.

Another approach would be to implement a per-coprocessor context privilege level. With this approach, some contexts would be limited in what they can do while others would not. In that scenario an application's DMA buffer built in user mode would be queued to a limited context. On the other hand, the kernel-mode driver would use a privileged context to submit the privileged functionality.

Functionality that needs to be queued.

Since the commands that can be inserted in a DMA buffer built in user mode are limited, the advanced model can be implemented to require the coprocessor to support both a limited DMA buffer (that is a DMA buffer that respects the previous conditions) and a privileged DMA buffer. Privileged DMA buffers are needed in order to allow the queuing of privileged functionality along the rendering stream of a coprocessor context.

Privileged DMA buffers can contain any of the instructions found in a non-privileged DMA buffer. Various preferred embodiments of the invention may implement privileged DMA buffers that allow at least allow the following (explained in further detail in later sections):

1) Insertion of privilege fences
2) Insertion of flip instructions
3) Insertion of "no context-switch" regions Furthermore, privileged DMA buffers can program any hardware register that the IHV wants and can access both virtual and physical memory if necessary. Privileged DMA buffers may not be constructed or visible in user mode. Only a trusted kernel component can access and build a privileged DMA buffer.

The following section presents three possible ways of implementing privileged DMA buffers, and is intended to elucidate the concept of the implementation of privileged DMA buffers without limiting the various ways that the invention may be practiced:

1. DMA Buffer Built Only in Kernel Mode

One way of supporting privileged DMA buffers that does not require any special hardware support is to require that the actual DMA buffers sent to the hardware be built in kernel mode. In that scenario, the user-mode driver would build a command buffer that closely resembles a DMA buffer and submit it to the kernel mode driver. The kernel-mode driver would validate and copy this command buffer into a DMA buffer that is only visible in kernel mode. During the validation, the kernel-mode driver would verify that no privileged instructions are present. This is similar to the validation that is required by the basic model but doesn't require validation for memory access since memory is virtualized.

2. Inserting Privileged Commands Directly Into the Ring

Figure 20:
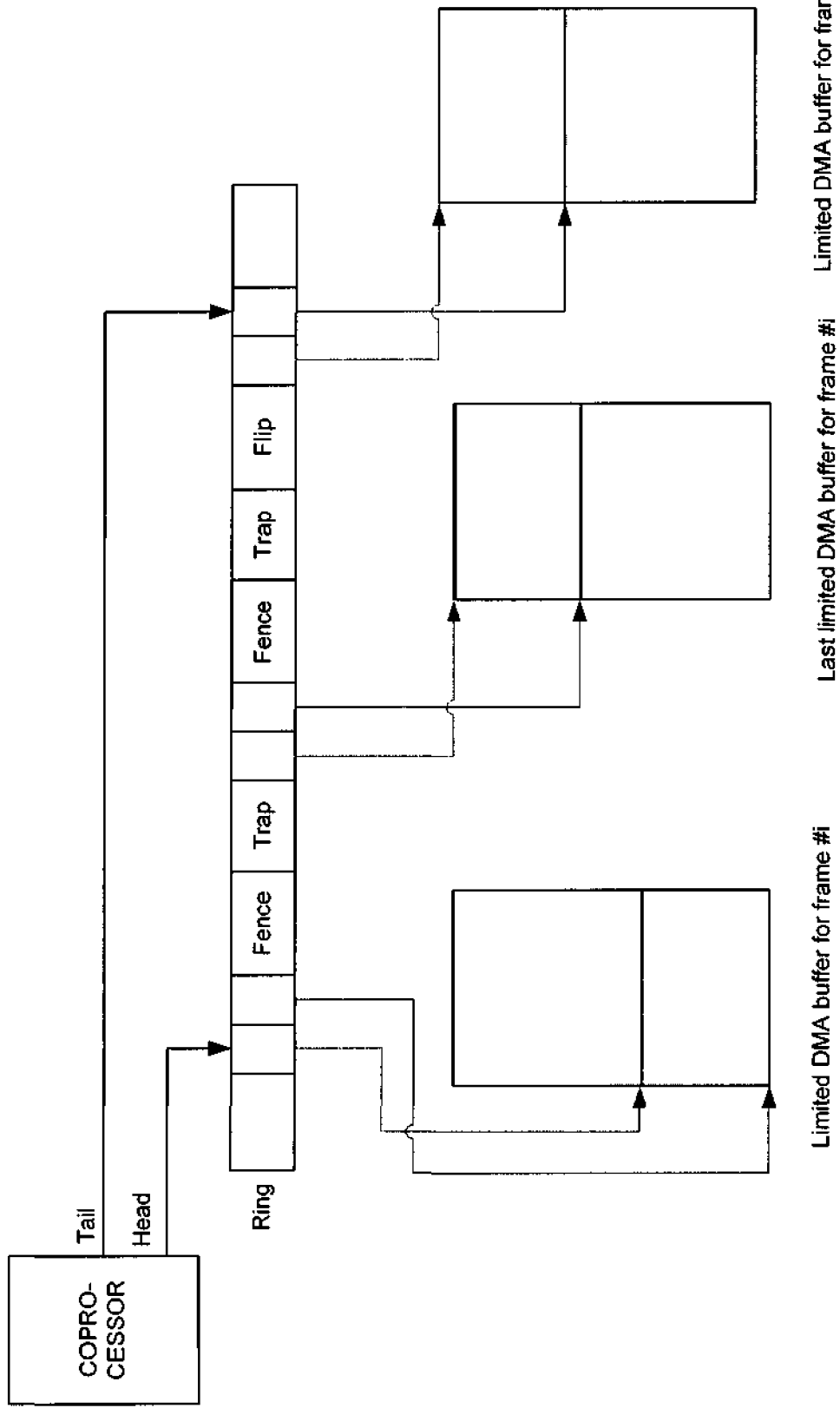
FIG. 20 illustrates a hardware approach to supporting privileged DMA channels by inserting privileged commands directly into a coprocessor context ring.

Probably the easiest hardware approach to supporting a privileged DMA channel is to insert privileged commands directly into a coprocessor context ring. The ring itself is already a privileged channel, accessible only from kernel mode. This is depicted in the diagram of FIG. 20.

3. Specifying Privilege Through Indirection

Figure 21:
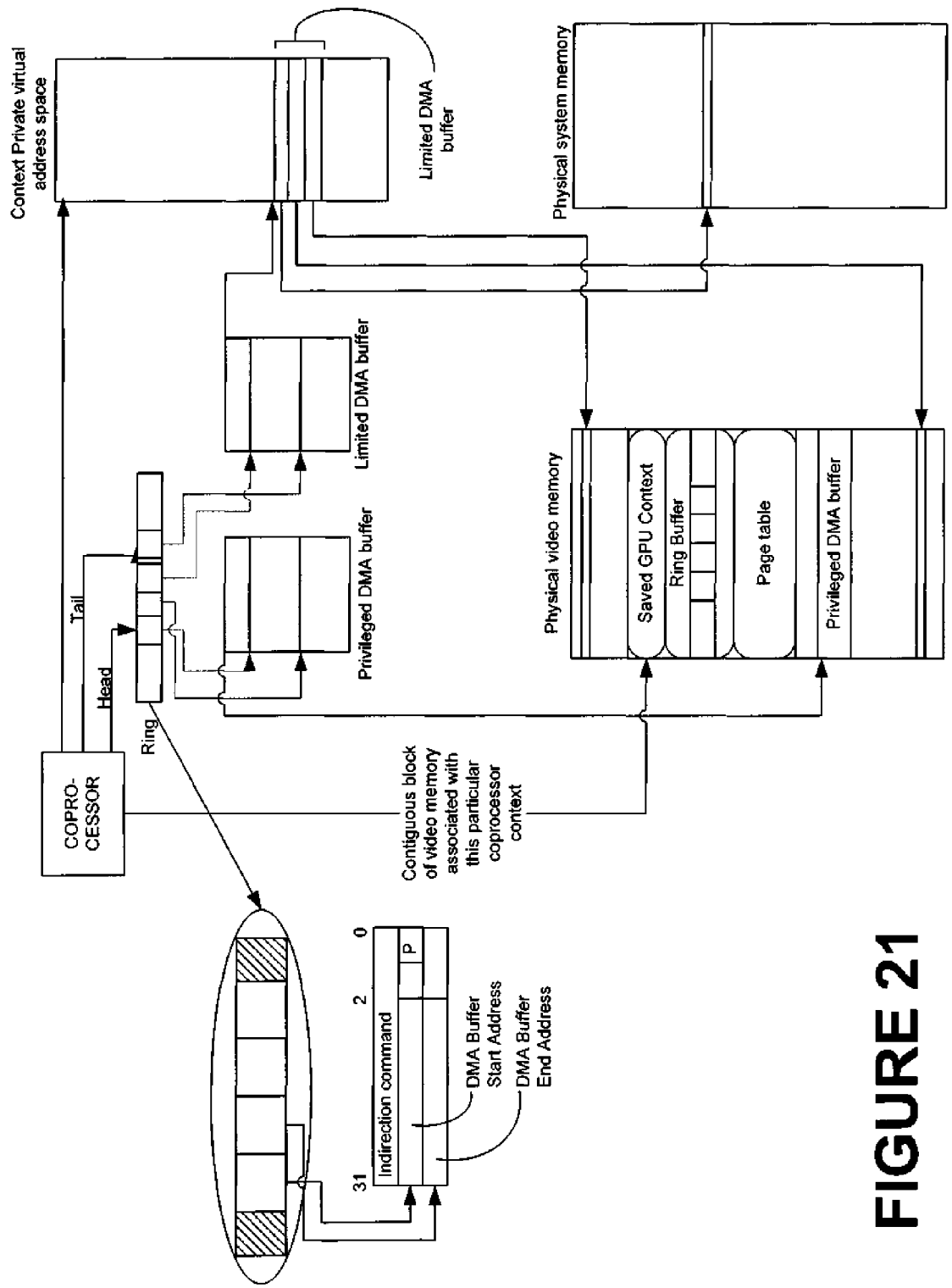
FIG. 21 illustrates an approach for supporting limited versus privileged DMA buffers in the coprocessor wherein a bit in the indirection command is inserted into a ring buffer.

A different approach of supporting limited versus privileged DMA buffers in the coprocessor is illustrated in FIG. 21. Referring thereto, note that both the Start and End addresses can be aligned on a DWORD. The unused bits of the address may be reused to specify flags. The first bits of the start address can specify that a DMA buffer being redirected to is a privileged DMA buffer. To enhance security, privileged DMA buffers can refer to a physical address in supplemental memory. Limited DMA buffers can refer to a virtual address in the coprocessor context virtual address space.

In this approach, a bit in the indirection command may be inserted into the ring buffer. The bit indicates whether the DMA buffer being executed is a privileged DMA buffer or not. This implies that the ring buffer itself may be referenced by the coprocessor using a physical address and may not be visible in the coprocessor virtual address space. Allowing the primary ring buffer to be visible in the coprocessor virtual address space would allow a malicious application to write over the primary ring buffer and allow it to run commands at the privileged level, which would amount to a security violation in most computing environments. In this regard, the privileged DMA buffer can be referenced through a physical address and not a virtual address like a limited DMA buffer.

DMA Control Instructions

For the scheduler and the supplemental memory manager to track the progression of any coprocessor context and control the flow of instructions in the DMA stream of that context, the coprocessor may be configured to support the following exemplary instructions in its DMA stream:

1) Fence (both limited and privileged)
2) Trap
3) Enable/Disable context switching Fence.

A fence can be an instruction containing both a piece of data (e.g., a 64 bit piece of data) and an address that can be inserted in the DMA stream. When the instruction is read by the coprocessor from the stream, it will cause the coprocessor to write the piece of data associated with the fence at the specified address. Before the coprocessor can write the data of the fence in memory, it must ensure that the pixels from the primitives preceding the fence instruction have been retired and been properly written to memory already. Note that this does not mean the coprocessor needs to stall the entire pipeline. The primitives following the fence instruction can be executed while the coprocessor is waiting on the last pixel of the instruction before the fence to be retired.

While any fence fitting the description above may be used in conjunction with the present invention, two types of fences in particular will be further described here: regular fences and privileged fences.

Regular fences are fences that can be inserted in a DMA buffer created by a user-mode driver. Since the content of a DMA buffer comes from user mode, it is not trusted. Thus fences within such a DMA buffer can refer to a virtual address in that coprocessor context's address space and not a physical address. It goes without saying that access to such a virtual address is bound by the same memory validation mechanism as any other virtual address accessed by the coprocessor.

Privileged fences are fences that can only be inserted in a DMA buffer created (and only visible) in kernel mode. Such a fence can refer to a physical address in memory to enhance security of the system. If the fence target address is visible in the coprocessor context's address space, a malicious application could do a graphics operation over that memory location, thus overriding the content of what the kernel-mode code is expecting to receive. Another solution to the potential security problem would be to have a privilege bit in the PTE indicating if a virtual address can be accessed from a non privileged DMA buffer. However, the first approach, above, is seen as simpler for early hardware generation.

Note that a privileged DMA buffer can contain both regular and privileged fences. However, when a privileged DMA buffer contains a regular fence, it is known to the kernel component that generated the DMA buffer that the fence it inserted might never be visible.

IHVs may decide to support extra types of fences in order to minimize the number of internal buffers that need to be flushed. The following types of fences are exemplary of fences that may be supported for this purpose (note that both privileged and non-privileged should be supported for all types):

1. Write Fences
A write fences can be the type of fence described previously and is the only required fence type. A write fence guarantees that all the memory writes before the fence instruction is processed are globally visible (i.e., they have been flushed out of the caches, and acknowledgments have been received from the memory controller).

2. Read Fences
A read fence is a lighter type of fence similar to a write fence. A read fence guarantees that all the memory reads for rendering operations before the fence are finished, but some writes may still be outstanding. If read fences are supported, the scheduler will use them to control the lifetime of non-render-target allocations.

3. Top of Pipe Fences
A top-of-pipe fence is a very light weight fence. Support for top-of-pipe fences is optional. A top-of-pipe fence guarantees only that the last byte before the fence instruction in the DMA buffer was read by the coprocessor (but not necessarily processed yet). The coprocessor may not re-read any portion of the DMA buffer preceding a top-of-pipe fence after that fence as been processed (since the content of that DMA buffer may no longer be valid). If supported, this type of fence will be used by the scheduler to control the lifetime of DMA buffer.

Trap.
A trap may be implemented in various embodiments of the present invention. A Trap can be an instruction inserted in a DMA buffer that is capable of generating a CPU interrupt when it is processed by the coprocessor. Before the coprocessor can interrupt the CPU, it is advisable to ensure that all the pixels from the primitives preceding the trap instruction have been retired and properly written to memory (an operation that may include a memory write from a fence instruction). Note that this does not mean the coprocessor needs to stall the entire pipeline. The primitives following the trap instruction can be executed while the coprocessor is waiting on the last pixel of the instruction before the trap to be retired.

The trap instruction need not be a privileged instruction and can be inserted in any DMA buffer, including those built directly by a user-mode driver.

Enable/Disable Context Switching.

For hardware that supports sub-triangle interruption, an instruction can be provided to enable and disable context switching. While context switching is disabled, the coprocessor generally should not switch away from a current coprocessor context. While the coprocessor may be required to update its current run list information if the CPU provides a new run list, the coprocessor can postpone context switching to that new run list until context switching is re-enabled. The OS can ensure that the following rules remain true when context switching is disabled:

1) Only privileged DMA buffers will be processed.
2) No context switching instructions will be present in the DMA stream.
3) The DMA stream will not run out of instruction.
4) No page faults will occur (if page level faulting is supported).

In many computer systems, disabling and enabling context switching are privileged instructions that may only be present in privileged DMA buffers. The usage scenario for these instructions is to allow the scheduler to schedule an operation that will appear on the screen (i.e., a presentation blit) without the possibility of it being interrupted. Being interrupted in such an operation could lead to a artifact visible on the screen for a noticeable period of time.

Note that if the coprocessor encounters an unforeseen error in the DMA buffer, it can context switch away from this DMA buffer even though context switching is disabled. Since only DMA buffers built in kernel mode may contain uninterruptible portions, unforeseen errors would be the result of a driver bug or a hardware bug. If the coprocessor doesn't context switch away in those scenarios, the display watchdog will catch the hang and reset the coprocessor in order to recover the system.

Optional Control Instructions.

While the scheduler can build high level synchronization primitives with the simple control instructions described above, the result can be made even more efficient. In many computer systems, a coprocessor context is interrupted by the CPU before it can take ownership of a synchronization object. If synchronization objects are being taken and released at a high frequency, this can become problematic. In order to have more efficient synchronization primitives, the scheduler can receive a special instruction from the coprocessor. In particular, the coprocessor can be configured to send out a "wait" instruction and a "signal" instruction at the proper time.

A wait instruction is inserted in a DMA stream to inform the coprocessor that it may inspect the value of a specified counter. If the counter is non-zero, the coprocessor can decrease the counter and continue executing the current coprocessor context. If the counter is zero, the coprocessor can reset the instruction pointer of the current coprocessor context before the wait instruction and switch to the next context in the run list. When a coprocessor context needs to stop on a wait instruction and is later rescheduled, the coprocessor can re-execute the wait instruction since it is possible that the wait condition still is not satisfied.

The wait instruction need have only one parameter: a virtual address specifying the memory location to be compared/decremented. The counter can be at least 32 bits and can be any valid virtual address. In a preferred embodiment, the wait instruction may be non-interruptible; that is, if a new run list is given to the coprocessor it can switch to the new run list either before the wait instruction or after it is done. Wait instructions can be inserted in both limited and privileged DMA buffers.

A signal instruction may be inserted in a DMA stream to inform the coprocessor it can update the value of a counter. The coprocessor may then increase the value of the counter by one. The coprocessor can ignore the potential overflow during the addition. Alternatively, the coprocessor could report the overflow as an error in the stream to help track software bugs.

The signal instruction need have only one parameter, the virtual address of the counter that should be updated. The counter size can be made to match the counter size of the wait instruction and, in a preferred embodiment, be at least 32 bits. Signal instructions can be inserted in both limited and privileged DMA buffers.

Flip

To allow full-screen applications to run seamlessly without bubbles in the pipeline, the coprocessor can provide an instruction to queue a flip (i.e., a change of the base address of the display). The display surface is generally allocated contiguously from physical memory and referenced by a CRTC using a physical address, not a virtual address. Therefore, the flip instruction can be used to program the CRTC to a new physical address to be displayed. Since this is a physical address and not a virtual address, a rogue application could potentially program the CRTC to display a portion of supplemental memory (which could contain secrets) that belongs to another application or user. For this reason, the flip instruction can be implemented to protect the security of most computer systems by ensuring that it is a privileged instruction that is inserted into a DMA stream only by the kernel mode driver once the destination has been validated.

In various preferred embodiments of the invention that are used in conjunction with a flip function, at least two types of flips can be supported: an immediate flip, and a flip synched with the display refresh. When the coprocessor processes an immediate flip, it can immediately update the base address of the display even though doing so will cause visible tearing. When the coprocessor processes a synched flip, it can latch a new base address, but defer its update until the next vertical synch period. If more than one synched flip is processed by the coprocessor between vertical sync periods, the coprocessor can only latch the latest one and ignore the previous one.

When processing a synched flip, various embodiments may be configured such that the coprocessor may not stall the graphics pipeline. The OS will ensure that it does not queue any rendering commands in the ring buffer that would draw to a surface that is currently visible. Note here that other embodiments may be configured without these requirements, as in the situation of the "optimized flip" that will be further explained below.

To determine which surface is currently visible, the driver may first be able to determine when a particular queued flip has occurred and notify the scheduler of the event, i.e., notify the scheduler after the display base address was changed. For an immediate flip, determining when the flip occurred is easy because reading the flip instruction from the DMA stream can be considered the same event as the display surface being updated. A fence and an interrupt can be inserted in the DMA stream following the flip instruction to notify the scheduler that a particular flip was read.

In the synched flip case, the determination of which surface is currently visible is more difficult. The coprocessor will first read the flip instruction from the DMA stream but will later update the display surface at the next vsync interrupt. In order to eliminate the need to stall the coprocessor during that time, a mechanism can be provided to notify the scheduler when the display surface change becomes effective.

Figure 22:
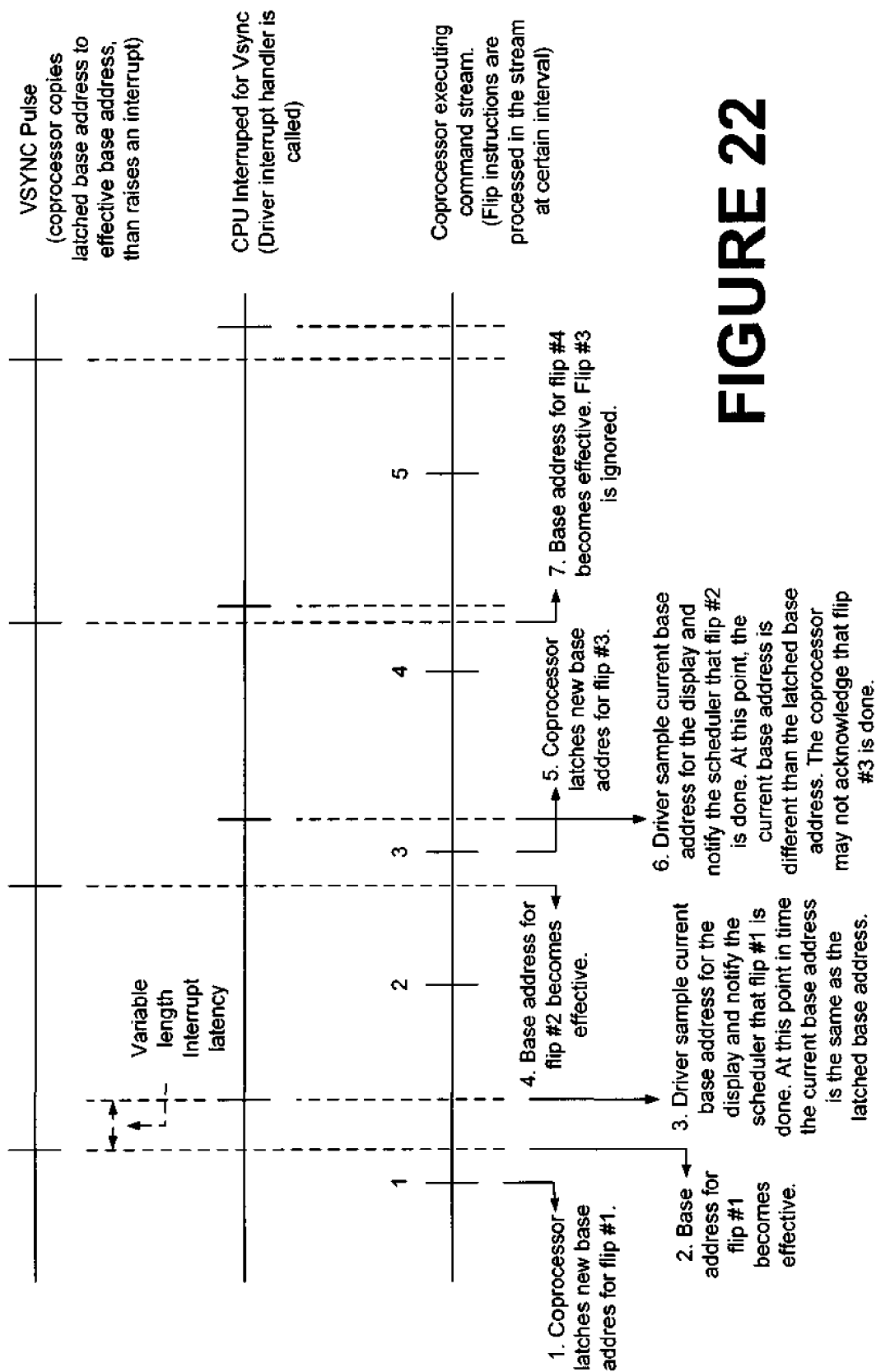
FIG. 22 provides a way to query a coprocessor about a current display surface.

There are many ways to design a mechanism for such notification for use in conjunction with the present invention. One potentially simple approach is illustrated in FIG. 22. FIG. 22 provides a way to query the coprocessor about the current display surface. In the illustrated embodiment this function may be thought of as provided by a MMIO register. The system of FIG. 22 is a design that will lead to greater reliability when the register reads the actual display surface, not the latest "latched display surface". Querying the latest latched display surface could result in a race condition, with the coprocessor processing another queued flip, which could lead to tearing on the screen. A flip instruction can be generated using any appropriate technique. The only general requirement for compatibility with the present invention is that the implemented solution should ensure that a flip will not be acknowledged until it is effective.

Queuing Flip.

To provide maximum performance, the advanced scheduling model can be modified to queue flip operations in the rendering stream of the application owning the monitor. When doing n-buffering, the scheduler may allow up to n−1 flips to be queued in the DMA stream and may block when the $n^{th}$ flip is about to be inserted.

What this means is that in double buffering, the scheduler may allow the application to queue one flip and let it continue preparing the DMA buffer for the following frame while the coprocessor finishes rendering the current frame and processes/acknowledges that flip. It also means that if by the time the application is finished with the preparation of the DMA buffer for the following frame and submits a second flip, it can be blocked until the first flip is acknowledged by the coprocessor.

When immediate flips are used by the scheduler, the mechanics of queuing flips works as described above. However, when using synched flips, the scheduler can also take special care of DMA buffers that are queued past flip n−1. Indeed, a DMA buffer past that flip will generally be rendering to the surface that is currently visible. It is advisable, in most systems, that these DMA buffers not be processed until the number of flips currently queued goes back down to n−2 or below.

The simplest approach to address this problem would be to allow only n−2 flips to be queued instead of n−1. However this solution would also mean that in the double buffering case we could not queue any flips, so we would need to block the application after each frame is completed until the corresponding flip is processed.

Figure 23:
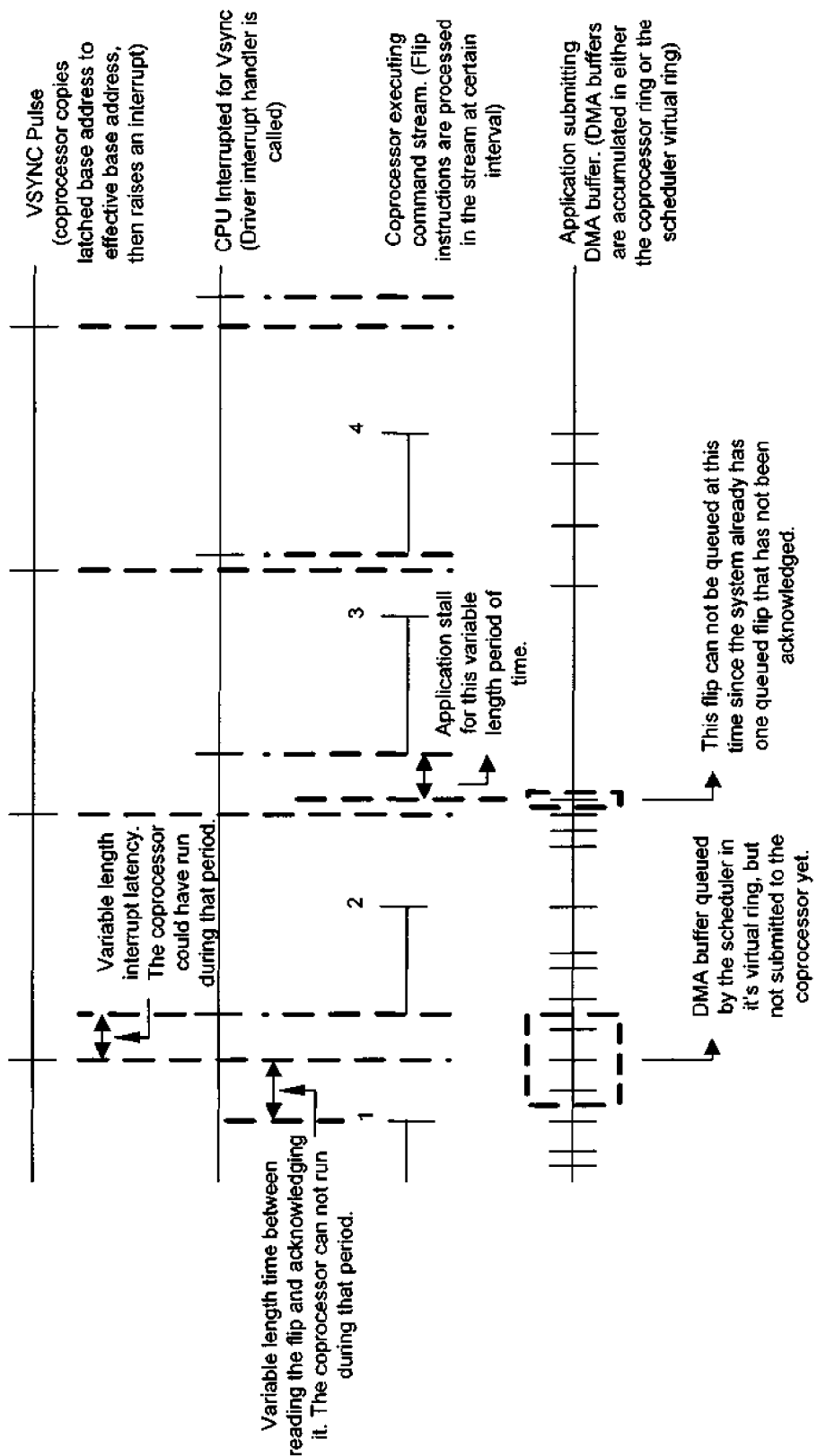
FIG. 23 is a preferred approach for queuing flips when immediate flips are used in conjunction with the present invention.

The preferred approach in this setting is illustrated in FIG. 23. As illustrated, the queuing of n−1 flips is allowed. To prevent the DMA buffer queued after flip n−1 from being executed, the scheduler can accumulate those DMA buffers in a virtual ring buffer for that coprocessor context. The scheduler can wait until the number of currently queued flips goes back down to n−2 to submit those to the actual ring of that coprocessor context.

When multiple applications are running at once, the coprocessor may not have to stall as illustrated in FIG. 23. While the coprocessor generally will stop processing a DMA buffer from a particular coprocessor context, the scheduler can schedule other coprocessor contexts to run, effectively keeping the coprocessor busy. However, when a single application is running, for example when playing a full screen game, the coprocessor can stall during those intervals. The next section describes a mechanism that, if supported, will be used by the scheduler to reduce the stalling time.

Optimized Flip.

Trying to optimize for full screen applications, we would like to reduce the time the coprocessor takes to stall to a minimum. Looking at FIG. 23, observe that the coprocessor can stall for at least two reasons: first, because the frame is completed but the system is waiting on a vsync to flip, and second, because the flip is completed, but the system is waiting on an interrupt to notify the CPU.

To reduce stalling due to the first reason, more buffers can be added to the flipping chain. Going from double buffer to triple buffer, for example, will greatly reduce such stalling. Doing so is not always under the driver's control, however, and may result in unreasonable memory consumption.

To reduce stalling due to the second reason, it is possible to add a coprocessor mechanism to completely remove this need to stall. The coprocessor can provide a wait-on-flip instruction that would stall the coprocessor until the previously queued flip has been processed. When such an instruction is supported, the scheduler can use it for full screen applications in order to queue flips, and the CPU does not have to restart the DMA stream after each flip.

High Level Synchronization Objects

Using the previously defined control instructions, the scheduler can build high level synchronization objects such as critical sections and mutexes. The scheduler can implement such synchronization primitives by protecting a section of a DMA buffer from executing until it is explicitly rescheduled by the CPU, once the condition for a wait is satisfied. Waiting on an object can be implemented, by the scheduler, as a fence. The DMA buffers that would logically follow the fence may be queued by the scheduler but not submitted into the ring of the coprocessor context until the wait condition is satisfied. Once it is waiting for an object, a coprocessor context may then be moved by the scheduler to a wait list on that particular object until it is signaled. Objects can be signaled by inserting a fence followed by an interrupt command in a coprocessor context DMA stream. When receiving such an interrupt, the scheduler may identify which objects are being signaled, and then determine if any waiting coprocessor contexts should be put back in the ready queue. When putting a coprocessor context back in the ready queue, the scheduler inserts the DMA buffers that were held back from the ring.

For example, consider an embodiment of the invention in which an application has a surface that is shared between a producer and a consumer, and the application needs to synchronize access to the resources so that the consumer always uses valid content while rendering. One potential way of synchronizing this scenario is illustrated in the FIG. 24.

Turning to FIG. 24, on the scheduler side, the synchronization can be implemented, for example, through the following kernel thunks, which may be implemented in any combination or in combination with other actions:

1) CreateSynchronizationObject: Creates a kernel tracking structure for the synchronization object. Returns a handle to the object to user mode that can be used in subsequent wait/release/delete calls.
2) DeleteSynchronizationObject: Destroys a previously created object.
3) WaitOnSingleObject/WaitOnMultipleObject: Inserts a wait-on-synchronization event into the DMA stream of the current coprocessor context. Inserts the event into the scheduler event history with a reference to the object being waited on.
4) ReleaseObject/SignalObject: Inserts a signal synchronization event into the DMA stream of the current coprocessor context (fence/interrupt). Inserts the event into the scheduler event history with a reference to the object being released or signaled.

Applying the illustration of FIG. 24 to a mutex, once the coprocessor processes a synchronization event in the DMA stream, the scheduler can perform the following actions, which also may be implemented in any combination or in combination with other actions:

1) On a wait: Check the state of the mutex. If the mutex isn't currently taken, take the mutex and put the coprocessor thread back in the ready queue of the scheduler. If the mutex is already taken, put the coprocessor thread in the wait queue for the mutex.
2) On a signal: Check if some other coprocessor threads are waiting for the mutex. If some other threads are waiting, take the first thread waiting in the list and put it back in the ready list of the scheduler. If no threads are waiting, put the mutex back in the non-taken state.

Using this mechanism, the scheduler can build. For example, consider the following types of synchronization primitives that can be built by the scheduler:

Mutex: Only one coprocessor thread at a time can have access to a shared resource.

Semaphore: A specified number of coprocessor threads can have access to a shared resource at the same time.

Notification event: A number of coprocessor threads can wait on an signal from another coprocessor thread.

In some scenarios, an application may be configured to request notification when the coprocessor has finished processing a rendering instruction. To support this, the scheduler may allow the driver to request a notification for a DMA buffer it is submitting. The driver may then specify a CPU synchronization event at submission time that can be signaled once the coprocessor has finished with the submitted DMA buffer. The scheduler can insert the given DMA buffer in the ring of the given coprocessor context and then add a user-mode coprocessor event notification to the ring (a fence followed by an interrupt). When the coprocessor event gets processed by the coprocessor, the scheduler can signal the associated CPU synchronization event.

Scheduler Event History Buffer

The scheduler may use the synchronization mechanism described above for multiple purposes. Since interrupts do not stall the coprocessor, the CPU need only see a subset of the notifications, and therefore some notifications can be squeezed together. In order to properly respond to every notification in a DMA buffer, the scheduler can maintain a history of the events that were inserted along with any parameters needed to process those events.

The event history buffer may be simply a per-coprocessor context array of event information structures that tracks every event which requires scheduler processing and that get inserted into a DMA stream of that context. Note that scheduler fences are fences use by a scheduler to synchronize an event. There can be one fence per coprocessor context and, to preserve security, the fence can be made to only allow updating through a privileged instruction. In any case, such an event may be inserted into a DMA stream as a fence instruction followed by an interrupt instruction.

Figure 25:
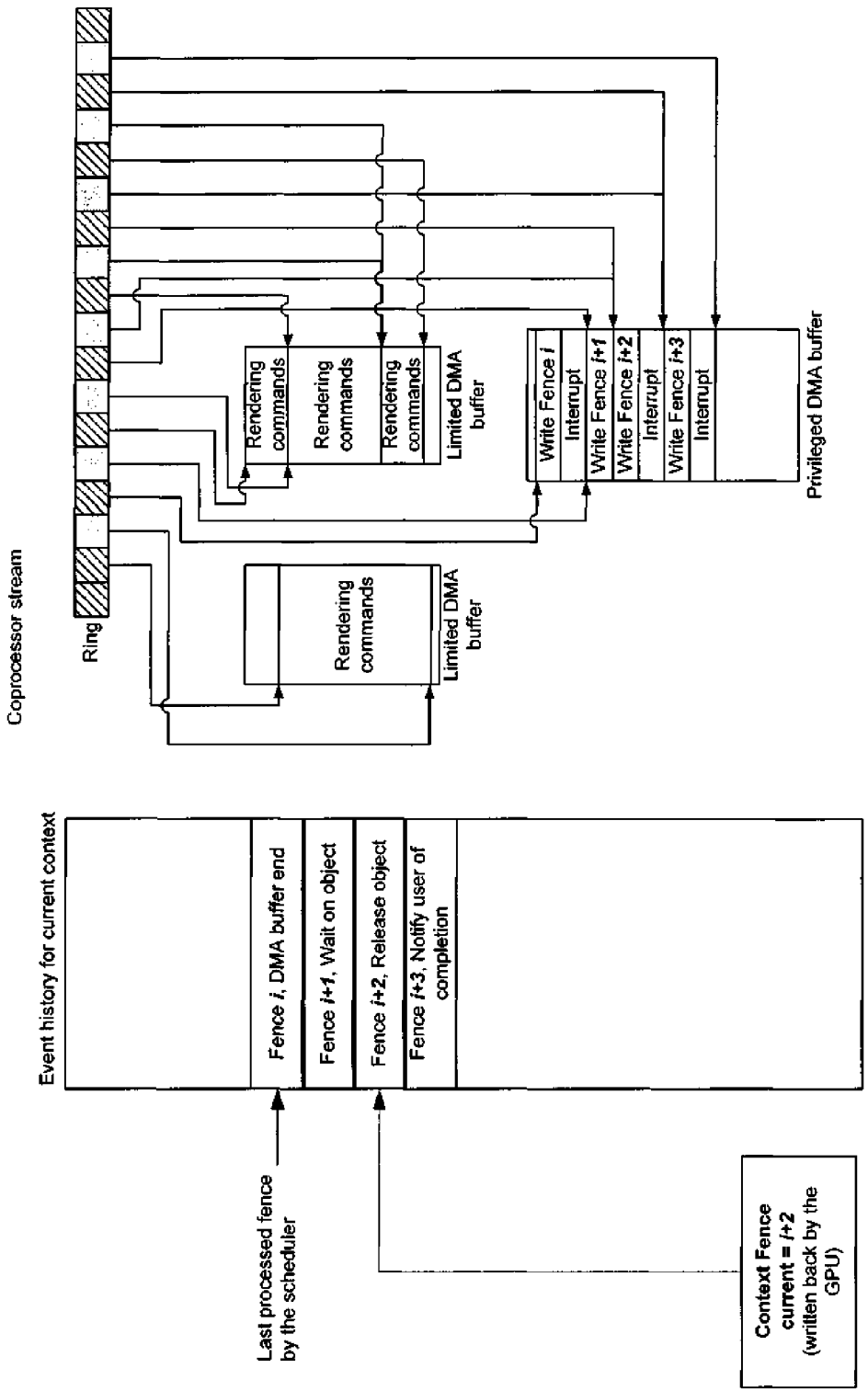
FIG. 25 illustrates various embodiments of an event history buffer.

On each fence interrupt, the scheduler may first determine the current fence, then go through the event history buffer to determine which events have occurred. This determination may be made based on the associated fences. The scheduler may proceed to process the fence interrupt. FIG. 25 illustrates various embodiments of the event history buffer.

Any number of events may be supported. The following table describes some currently supported events, but is not intended to limit the number or types of potentially supported events.

| Type of Event | Description and Parameters |
| --- | --- |
| End of DMA buffer | This event is be inserted at the end of a DMA buffer. When this event is processed by the scheduler, the associated DMA buffer is put back into the DMA buffer pool for that process.<br>Parameters: Handle to the DMA buffer that needs to be released to the pool. |
| Wait on synchronization object | This event is inserted when a coprocessor thread needs to check the status of an event and potentially wait for it. When the scheduler processes this event, it checks whether the wait condition is already satisfied, and if so, reschedules the coprocessor thread that just stopped. If the wait condition isn't satisfied, the coprocessor thread is put in the wait state and added to the wait queue of the synchronization object.<br>Parameters: Handle to the object being waited on. |
| Signal synchronization object | This event is inserted when a coprocessor thread needs to signal a notification object or release a synchronization object. When the scheduler process this event, it changes the status of the object and potentially wakes up some coprocessor threads that were waiting on the event.<br>Parameters: Handle to the object being released. |
| User mode event notification | This event is inserted when the user-mode driver asks for a notification of rendering completion. When the scheduler processes this event, it signals the associated event.<br>Parameters: Event to signal. |

Programmable PCI Aperture

Today's coprocessors are exposing PCI apertures that are very close to the limits allowed by the PCI specs. Future generation coprocessor will have more supplemental memory on board than can be exposed through an aperture. Therefore, in the future we cannot assume that all supplemental memory will be visible through a PCI aperture at the same time.

There are multiple ways this limitation can be worked around. A preferred method for the advanced scheduling model that supports per-coprocessor context virtual address spaces is to use a PCI aperture that can be redirected anywhere in supplemental memory at a 4 KB granularity. This is depicted in FIG. 26.

Figure 26:
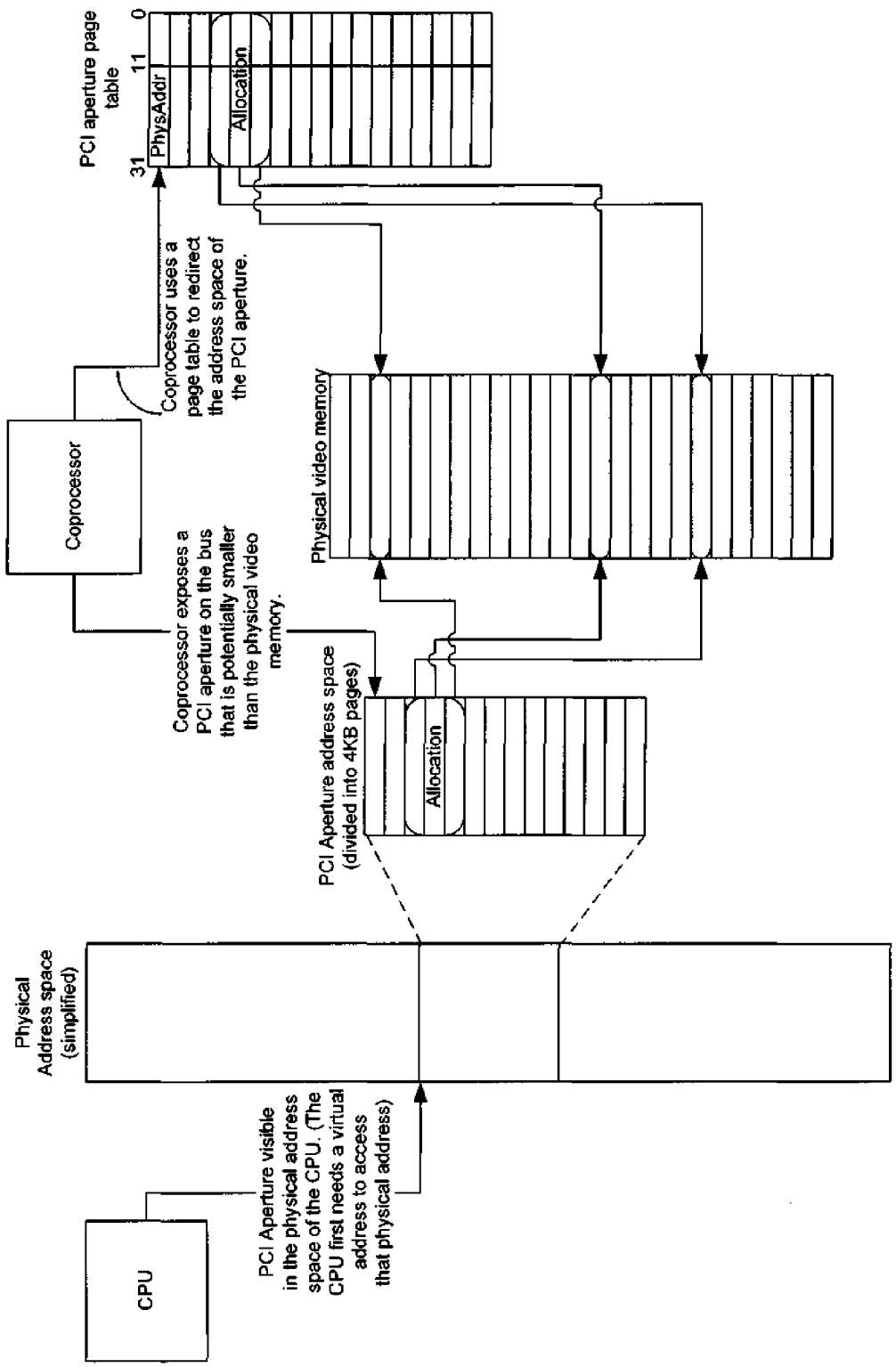
FIG. 26 illustrates a preferred method to support per-coprocessor context virtual address spaces which uses a PCI aperture that can be redirected anywhere in supplemental memory.

The PCI aperture page table, as depicted in FIG. 26, can be independent of the coprocessor page table. There can be multiple CPU processes running and accessing part of the PCI aperture while the coprocessor is itself switching from context to context. The page table for the PCI aperture is a shared resource among all coprocessor contexts and would be allocated from supplemental memory. The driver can provide a Map/Unmap DDI to allow the supplemental memory manager, VidMm, to manage the PCI aperture address space among running applications. The page table for the PCI aperture can be referred to by the coprocessor using a physical address.

Note that the PCI aperture may be configured to only redirect the address space to local supplemental memory. It doesn't need to redirect the address space to system memory as VidMm will always map system memory directly, and not through that aperture.

Page Level Faulting

While surface level faulting, described previously, can work generally well in most cases, there are scenarios where it may be improved upon. For example, using surface level faulting, certain applications using very large data sets may not be able to get an entire data set in memory at once, and therefore may not function properly. A solution for this that can be implemented in the advanced model a page level faulting mechanism.

With page level faulting, the model works similarly to what is described in previous sections. The major difference is in the way page faulting is reported to and handled by VidMm. While surface level faulting may require the coprocessor to specify the entire list of resources it needs to make forward progress (in order to eliminate an infinite loop where paging one resources means evicting another required one), page level faulting does not need the coprocessor to expose a list of virtual address. For page level faulting, the coprocessor needs only report the virtual address that faulted. VidMm can find out which allocation this address is part of and decide if only this particular page needs to be made resident or if some pre-fetching is required. When multiple pages are required by a single pixel, it is possible that multiple faults could be generated for that single pixel. It is also possible that a page needed by that pixel could get evicted when another page is brought in. However as long as the working set of the application is sufficiently larger than the maximum number of pages that might be needed by a pixel, the probability of looping through page faults is very small.

Finally, it should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of a stand-alone computer system, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes. Therefore, the present invention should not be limited to any single embodiment, but rather should be construed in breadth and scope in accordance with the appended claims.

What is claimed is:

1. A method for scheduling coprocessor contexts for processing in a coprocessor, comprising:
   a central processing unit (CPU) generating a run list comprising a list of coprocessor contexts for processing by the coprocessor;
   delivering the run list to a scheduler, the scheduler preparing the contexts on the run list for processing by the coprocessor, the coprocessor beginning to process a first context of the run list based on an order indicated in the run list;
   while processing the first context, determining, by the coprocessor, that a switching event has occurred, the switching event comprising a page fault in the coprocessor processing the first context, a general protection fault in the coprocessor processing the first context, or a determination that there is not another item in the run list;
   switching, by the coprocessor, to a next context in a second run list in response to the coprocessor determining that the switching event has occurred, the coprocessor switching to the next context independently of intervention from the CPU, wherein the scheduler generates the second run list based on one or more rules including: excluding the first context of the run list from appearing in the second run list, and wherein a second context of the run list is a first context of the second run list;
   signaling the CPU with a first interrupt signal based at least upon the coprocessor switching from one context in the run list to a next context in the run list, the CPU building said second run list for the coprocessor in response to the CPU receiving the first interrupt signal from the coprocessor; and
   signaling the CPU with a second interrupt signal based at least upon the processor switching from the run list to the second run list, the CPU building a third run list for the coprocessor in response to the CPU receiving the second interrupt signal from the coprocessor.

2. A method according to claim 1, wherein the coprocessor is a graphics processing unit (GPU).

3. The method of claim 1,
   wherein the second run list has a different order of contexts than the run list, whereby the scheduler can initiate a change in the order of contexts to be processed by the coprocessor based at least upon processing contexts in the second run list.

4. The method of claim 3, wherein the second context of the run list is placed in a location within the second run list such that the second context is not executed first within the second run list, and further comprising:
   determining to include a third context of the run list in the second run list because the third context is in a location within the second run list such that the first context is executed first within the second run list.

5. The method of claim 1, further comprising:
   storing information regarding a history of coprocessor switches from context to context in a specified system memory location readable by the scheduler.

6. The method of claim 5, wherein the system memory location readable by the scheduler is a history buffer available to said coprocessor only.

7. The method of claim 5, wherein the history buffer comprises sufficient memory to store at least twice the amount of information required to store the run list.

8. The method of claim 5, further comprising:
   specifying a coprocessor write pointer, which indicates a location in the history buffer where the coprocessor can write new information.

9. A computer readable device, wherein the computer readable device is not a signal, comprising computer executable instructions that based at least upon execution by a computer, cause the computer to perform operations comprising:
   a central processing unit (CPU) generating a run list comprising a list of coprocessor contexts for processing by a coprocessor;
   delivering the run list to a scheduler, the scheduler preparing the contexts on the run list for processing by the coprocessor, the coprocessor beginning to process a first context of the run list based on an order indicated in the run list;
   while processing the first context, determining, by the coprocessor, that a switching event has occurred, the switching event comprising a page fault in the coprocessor processing the first context, a general protection fault in the coprocessor processing the first context, or a determination that there is not another item in the run list;
   switching, by the coprocessor, to a next context in a second run list in response to the coprocessor determining that the switching event has occurred, the coprocessor switching to the next context independently of intervention from the CPU, wherein the scheduler generates the second run list based on one or more rules including: excluding the first context of the run list from appearing in the second run list, and wherein a second context of the run list is a first context of the second run list;
   signaling the CPU with a first interrupt signal based at least upon the coprocessor switching from one context in the run list to a next context in the run list, the CPU building said second run list for the coprocessor in response to the CPU receiving the first interrupt signal from the coprocessor; and
   signaling the CPU with a second interrupt signal based at least upon the processor switching from the run list to the second run list, the CPU building a third run list for the coprocessor in response to the CPU receiving the second interrupt signal from the coprocessor.

10. The computer-readable device of claim 9, further comprising computer executable instructions that based at least upon execution by the computer, cause the computer to perform operations comprising:
    storing information regarding a history of coprocessor switches from context to context in a specified system memory location readable by the scheduler.

11. The computer-readable device of claim 9, wherein a system memory location readable by the scheduler is a history buffer available to said coprocessor only.

12. The computer-readable device of claim 11, wherein the history buffer comprises sufficient memory to store at least twice the amount of information required to store the run list.

13. The computer-readable device of claim 9, wherein the page fault in the coprocessor processing the first context comprises:
    a page fault that occurs to a context that references an invalid ring buffer or an invalid DMA buffer.

14. A system, comprising:
    a processor;
    a coprocessor;
    a scheduler; and a memory communicatively coupled to the processor, the memory bearing processor-executable instructions that, based at least upon execution by the processor, cause the system at least to:

cause the processor to generate a run list comprising a list of coprocessor contexts for processing by the coprocessor;

deliver the run list to the scheduler, the scheduler preparing the contexts on the run list for processing by the coprocessor, the coprocessor beginning to process a first context of the run list based on an order indicated in the run list;

while processing the first context, determine, by the coprocessor, that a switching event has occurred, the switching event comprising a page fault in the coprocessor processing the first context, a general protection fault in the coprocessor processing the first context, or a determination that there is not another item in the run list;

switch, by the coprocessor, to a next context in a second run list in response to the coprocessor determining that the switching event has occurred, the coprocessor switching to the next context independently of intervention from the processor, wherein the scheduler generates the second run list based on one or more rules including: excluding the first context of the run list from appearing in the second run list, and wherein a second context of the run list is a first context of the second run list;

signaling the processor with a first interrupt signal based at least upon the coprocessor switching from one context in the run list to a next context in the run list, the processor building said second run list for the coprocessor in response to the processor receiving the first interrupt signal from the coprocessor; and signaling the processor with a second interrupt signal based at least upon the processor switching from the run list to the second run list, the processor building a third run list for the coprocessor in response to the processor receiving the second interrupt signal from the coprocessor.

15. The system of claim 14, wherein the second run list has a different order of contexts than the run list, whereby the scheduler can initiate a change in the order of contexts to be processed by the coprocessor based at least upon processing contexts in the second run list.

16. The system of claim 15, wherein the second context of the run list is placed in a location within the second run list such that the second context is not executed first within the second run list, and wherein the memory further bears processor-executable instructions that, based at least upon execution by the processor, cause the system at least to:

determine to include a third context of the run list in the second run list because the third context is in a location within the second run list such that the second context is executed first within the second run list.

* * * * *